United States Patent
Lim

(10) Patent No.: US 11,199,873 B2
(45) Date of Patent: Dec. 14, 2021

(54) PROTECTIVE CASE FOR FOLDABLE IMAGE DISPLAY APPARATUS

(71) Applicant: Gananhandongjidul Inc., Seoul (KR)

(72) Inventor: You Seob Lim, Goyang (KR)

(73) Assignee: GANANHANDONGJIDUL INC., Seoul (KR)

( * ) Notice: Subject to any disclaimer, the term of this patent is extended or adjusted under 35 U.S.C. 154(b) by 0 days.

(21) Appl. No.: 16/428,459

(22) Filed: May 31, 2019

(65) Prior Publication Data

US 2020/0174522 A1   Jun. 4, 2020

(30) Foreign Application Priority Data

Dec. 2, 2018  (KR) ........................ 10-2018-0153212

(51) Int. Cl.
  *G06F 1/16*   (2006.01)
  *G09F 9/30*   (2006.01)
  *A45C 11/00*  (2006.01)

(52) U.S. Cl.
  CPC .......... *G06F 1/1616* (2013.01); *G06F 1/1652* (2013.01); *G09F 9/301* (2013.01); *A45C 2011/002* (2013.01)

(58) Field of Classification Search
  CPC ...... G06F 1/1616; G06F 1/1652; G09F 9/301; A45C 2011/002
  See application file for complete search history.

(56) References Cited

U.S. PATENT DOCUMENTS

| | | | | |
|---|---|---|---|---|
| 5,725,098 A * | 3/1998 | Seifert | .................... | A45C 11/24 206/37 |
| 5,983,073 A * | 11/1999 | Ditzik | .................... | G06F 1/1616 455/11.1 |
| 7,050,293 B2 * | 5/2006 | Arbisi | .................... | H04M 1/022 361/679.3 |
| 7,414,594 B2 * | 8/2008 | Kim | .................... | G02F 1/133526 345/1.3 |
| 7,444,176 B2 * | 10/2008 | Oda | .................... | H04M 1/0216 206/320 |
| 7,822,449 B2 * | 10/2010 | Uramoto | .............. | H04B 1/3888 455/575.8 |
| 8,873,225 B2 | 10/2014 | Huitema et al. | | |
| 9,651,998 B2 * | 5/2017 | Matsueda | .......... | H01L 51/5237 |
| 9,857,832 B2 * | 1/2018 | Kim | .................... | G06F 1/1679 |
| 10,028,395 B2 * | 7/2018 | Chen | .................... | G06F 1/1626 |
| 10,292,285 B2 * | 5/2019 | Cavenagh | ............. | G06F 1/1647 |
| 2002/0104769 A1 * | 8/2002 | Kim | .................... | G06F 1/1637 206/320 |

(Continued)

*Primary Examiner* — Adrian S Wilson
*Assistant Examiner* — Theron S Milliser
(74) *Attorney, Agent, or Firm* — Patent Office of Dr. Chung Park

(57) ABSTRACT

Provided is a protective case for a foldable image display apparatus which prevents the hinge breakage due to an external force action exceeding the allowable range in the folded state of the foldable image display apparatus and prevents scratching, stabbing, and other damages of the screen display surface due to foreign substances introduced into the folding space gap formed inside the folding inner surface. The protective case primarily supports and disperses an external force even when an external force is applied to the hinge part in the folded state, and the protective case occupies and closes the folding space gap which is an empty space area.

9 Claims, 46 Drawing Sheets

(56) References Cited

U.S. PATENT DOCUMENTS

| | | | |
|---|---|---|---|
| 2003/0189759 A1* | 10/2003 | Kim | G06F 1/1647 |
| | | | 359/619 |
| 2004/0036818 A1* | 2/2004 | Kim | G06F 1/1681 |
| | | | 349/58 |
| 2007/0227923 A1* | 10/2007 | Kidakarn | G06F 1/1681 |
| | | | 206/320 |
| 2008/0049389 A1* | 2/2008 | Kim | G06F 1/1641 |
| | | | 361/679.04 |
| 2009/0104949 A1* | 4/2009 | Sato | H04M 1/0214 |
| | | | 455/575.3 |
| 2010/0053858 A1* | 3/2010 | Kim | G06F 3/1446 |
| | | | 361/679.01 |
| 2015/0141091 A1 | 5/2015 | Oh et al. | |
| 2015/0153780 A1* | 6/2015 | Maatta | G06F 1/1656 |
| | | | 361/679.27 |
| 2018/0110306 A1* | 4/2018 | Armstrong | A45C 11/00 |
| 2018/0196468 A1* | 7/2018 | Watamura | G06F 1/1652 |
| 2020/0133338 A1* | 4/2020 | Han | G06F 1/1641 |

* cited by examiner

< SECTION CUT A-A >

< SECTION CUT B-B >

< SECTION CUT V-V >

< SECTION CUT W-W >

< SECTION CUT X-X >

< SECTION CUT AL-AL >

< SECTION CUT AM-AM >

< SECTION CUT AO-AO >

< SECTION CUT AP-AP >

PROTECTIVE CASE FOR FOLDABLE IMAGE DISPLAY APPARATUS

CROSS-REFERENCE TO RELATED APPLICATIONS

This U.S. non-provisional patent application claims priority under 35 U.S.C. § 119 of Korean Patent Application No. 10-2018-0153212, filed on Dec. 2, 2018, the entire contents of which are hereby incorporated by reference.

BACKGROUND OF THE INVENTION

The present invention disclosed herein relates to a protective case for a foldable image display apparatus, where a folding space gap of a cone shape in which a gap of an inner side which is not closely contacted in a folded state is gradually narrowed from a folding axis to the opposite side is formed along the folding axis. Particularly, even if the protective case is applied to a foldable image display apparatus, the protective case supports and disperses an external force without limitation in folding and unfolding such that the hinge components are not damaged even when an external force is applied to a hinge portion in the folded state.

Due to the popularization of the shape-invariant image display apparatuses such as existing plate-shaped smartphones and tablet devices, additional products such as a bumper case (Korean Patent No. 10-1229079) for preventing the breakage of a liquid crystal screen due to a shock, a diary type case (Korean Patent No. 10-1192287 and Korean Utility Model No. 30-0473451) that receives an image display apparatus in an inner space of a diary-shaped cover and store cards, and a bumper-integrated case that combines a bumper case function with a diary case function (Korean Utility Model No. 20-0460260) are widely used, and various patents related thereto are being proposed.

The related-art bumper case, the diary type case and the bumper-integrated case are all proposed so as to be applicable to the shape invariant image display apparatus in the form of a plate, and have a limitation in that they cannot be applied to a foldable display apparatus which changes in circumferential shape due to folding and unfolding of the flexible display apparatus.

SUMMARY OF THE INVENTION

The present invention provides a protective case for a foldable image display apparatus, where a folding space gap of a cone shape is formed along a folding axis, which is applied to a foldable image display apparatus to allow folding and unfolding of the foldable image display apparatus to be free and to prevent damage of hinge components when an external force is applied to a hinge portion in a folded state.

The present invention also provides a protective case for a foldable image display apparatus, which prevents introduction of foreign substances into a folding space gap of a cone shape formed in a folded state.

Embodiments of the present invention provide protective cases for a foldable image display apparatus including a foldable body having a folding axis that becomes a folding reference in a folded state, first folding inner surface and second folding inner surface extending from both ends of an inner circumferential surface and facing each other and first folding outer surface and second folding outer surface extending from both ends of an outer circumferential surface and facing each other; and a single flexible display apparatus applied to the first folding inner surface and the second folding inner surface, the protective case in which a folding space gap of a cone shape formed by the first folding inner surface, the second folding inner surface, and the inner circumferential surface is formed and the folding space gap is gradually narrowed away from the folding axis in the folding state is formed along the folding axis, the protective case including: a first protective case having: a first fixing surface supported while surrounding a first folding outer surface at a certain distance away from the folding axis of the foldable body; and a first folding space protruding circumferential surface having a first folding space inclined surface protruding from the first fixing surface to the folding space gap deviating from the first folding inner surface while a screen display surface of the flexible display apparatus is maintained in an exposed state while surrounding an outer circumferential surface except the folding axis of the foldable body; and a second protective case having: a second fixing surface supported while surrounding a second folding outer surface at a certain distance away from the folding axis; and a second folding space protruding circumferential surface having a second folding space inclined surface protruding from the second fixing surface to the folding space gap deviating from the second folding inner surface while the screen display surface of the flexible display apparatus is maintained in an exposed state while surrounding the foldable body outer circumferential surface except the folding axis of the foldable body, wherein the protruding height of the first folding space protruding circumferential surface and the second folding space protruding circumferential surface is lowered away from the folding axis, the first folding space protruding circumferential surface and the second folding space protruding circumferential surface in a folded state make contact with the first folding space inclined surface and the second folding space inclined surface, thereby partially or entirely occupying the space gap and closing the space gap, and the first folding space inclined surface and the second folding space inclined surface protrude out of the screen display surface of the display apparatus in an unfolded state.

The protective case may include an edge cover having a tunnel-shaped circumferential surface capable of covering the outer circumferential surface not covered by the first protective case and the second protective case when the foldable body is folded and a wall surface capable of covering both ends of the folding axis of the foldable body, wherein the edge cover is separated from the folding axis when the foldable body is unfolded.

The first protective case and the second protective case separated from each other based on the folding axis may be connected by a connection plate covering the outer circumferential surface of the foldable body, and the connection plate may be formed of a material which is foldable and flexible.

A folding space insert may be formed to have one end thereof connected and fixed to the circumferential wall surface of the first folding space protruding circumferential surface or the second folding space protruding circumferential surface and the opposite free end thereof located in the folding space gap by a user when the foldable body is folded, one surface thereof being supported by a first folding inner surface and a second folding inner surface which form the folding space gap, and may be unfolded and maintained in a state where one surface thereof is supported by the screen display surface of the flexible display apparatus or may be moved out of the screen display surface by a user when the foldable body is unfolded.

Backward bending prevention shapes may be formed at the end of the first folding space protruding circumferential surface of the first protective case or the second folding space protruding circumferential surface of the second protective case located at the side of the folding axis, and may extend from the folding axis toward the inner circumferential surface to cover the semicircular circumferential surface of the foldable body by less than half of the thickness of the foldable body, and backward bending prevention vertical surfaces may be formed at end portions of the inner circumferential surface of the backward bending prevention shapes to face and make contact with each other by locating an end portion of the vertical surface at the folding axis when the foldable body is unfolded.

A bezel latching protrusion fixed around the edge portions of the first folding inner surface and the second folding inner surface may be formed on the inner circumference of the protruding end portions of the first folding space inclined surface and the second folding space inclined surface.

A protective case fixing through-hole may be formed at the end portion of the first folding space protruding circumferential surface and the second folding space protruding circumferential surface which are located at the side of the folding axis such that the first protective case and the second protective case is latched or screwed to the protective case fixture formed on the foldable body outer circumferential surface to fix the first protective case and the second protective case.

A display through window or a transmission window for transmitting the screen display surface of the outer display applied to one of the first display surface and the second folding outer surface may be formed on one of the first fixing surface or the second fixing surface.

The folding space insert may have an insert contact surface that is a contact surface which reflects the inclination of a first folding inner surface and a second folding inner surface so as to make close contact with the first folding inner surface and the second folding inner surface forming the folding space gap.

In other embodiments of the present invention, protective cases for a foldable image display apparatus, including a foldable body having a folding axis that becomes a folding reference in a folded state, first folding inner surface and second folding inner surface extending from both ends of an inner circumferential surface and facing each other and first folding outer surface and second folding outer surface extending from both ends of an outer circumferential surface and facing each other; and a single flexible display apparatus applied to the first folding inner surface and the second folding inner surface, the protective case in which a folding space gap of a cone shape formed by the first folding inner surface, the second folding inner surface, and the inner circumferential surface is formed and the folding space gap is gradually narrowed away from the folding axis in the folding state is formed along the folding axis, include: a first protective case having: a third fixing surface partially or entirely supported by a first folding inner surface at a certain distance away from a folding axis of a foldable body; a first protective case circumferential wall surface surrounding a circumferential portion of the foldable body except the folding axis along an edge line of a first folding outer surface and the third fixing surface while a screen display surface of a flexible display apparatus is maintained in an exposed state; and a first folding space protrusion formed with a third folding space inclined surface protruding from the third fixing surface to a folding space gap deviating from the first folding inner surface; and a second protective case having: a fourth fixing surface partially or entirely supported by a second folding inner surface at a certain distance away from the folding axis of the foldable body; a second protective case circumferential wall surface surrounding a circumferential portion of the foldable body except the folding axis along an edge line of a second folding outer surface and the fourth fixing surface while the screen display surface of the flexible display apparatus is maintained in an exposed state; and a second folding space protrusion formed with a fourth folding space inclined surface protruding from the fourth fixing surface to the folding space gap deviating from the second folding inner surface.

The protruding height of the first folding space protrusion and the second folding space protrusion may be lowered away from the folding axis, and the first folding space protrusion and the second folding space protrusion in a folded state may make contact with the third folding space inclined surface and the fourth folding space inclined surface, thereby partially or entirely occupying the space gap. The third folding space inclined surface and the fourth folding space inclined surface may maintain a downwardly protruding inclination state of a V-shape based on the folding axis in an unfolded state.

Folding support circumferential surfaces capable of supporting the inner circumferential surface of the folding space gap may be formed at ends of the third fixing surface and the fourth fixing surface located at the side of the folding axis.

A first unfolding protrusion in which a first unfolding support surface protrudes from the first folding space protrusion to the inner circumferential surface or the second folding inner surface deviating from the third folding space inclined surface while being parallel to the first folding inner surface and a second unfolding support surface is formed by connecting a protruding end of the first unfolding support surface and a certain portion of the third folding space inclined surface at the side of a folding space gap vertex may be formed in a certain area of the first folding space protrusion. A first folding recess in which a first folding support surface is recessed from the first folding space protrusion to the inner circumferential surface or the first folding inner surface deviating from the third folding space inclined surface while being parallel to the second folding inner surface and a second folding support surface may be formed by connecting a recessed end of the first unfolding support surface and a certain portion of the third folding space inclined surface at the side of the folding space gap vertex may be formed in a certain area of the first folding space protrusion where the first unfolding protrusion is not formed. A second unfolding protrusion in which a third unfolding support surface protrudes from the second folding space protrusion to the inner circumferential surface or the first folding inner surface deviating from the fourth folding space inclined surface while being parallel to the second folding inner surface and a fourth unfolding support surface may be formed by connecting a protruding end of the third unfolding support surface and a certain portion of the second folding space inclined surface at the side of the folding space gap vertex may be formed in a certain area of the second folding space protrusion.

A second folding recess in which a third folding support surface is recessed from the second folding space protrusion to the inner circumferential surface or the second folding inner surface deviating from the fourth folding space inclined surface while being parallel to the first folding inner surface and a fourth folding support surface is formed by connecting a recessed end of the third unfolding support surface and a certain portion of the fourth folding space inclined surface at the side of the folding space gap vertex may be formed in a certain area of the second folding space protrusion where the second unfolding protrusion is not formed. When the foldable body is folded, the first unfolding protrusion may be accommodated in a recessed area of the second folding recess and the second unfolding protrusion may be accommodated in a recessed area of the first folding recess, and when the foldable body is unfolded, the first unfolding support surface and the third unfolding support surface may maintain the same plane.

A damage preventing shape including a chamfer or a curved surface for preventing injury of a finger or damage of the inner circumferential surface may be formed at the edge portions where the folding support circumferential surface and the third folding space inclined surface, and the folding support circumferential surface and the fourth folding space inclined surface intersect.

The protective case may include an edge cover having a tunnel-shaped circumferential surface capable of covering the outer circumferential surface not covered by the first protective case and the second protective case when the foldable body is folded and a bezel circumferential surface or a wall surface capable of covering both ends of the folding axis of the foldable body. Here, the edge cover may be separated from the folding axis when the foldable body is unfolded.

A rotating cover for covering one of the flat portions of the display apparatus and the outer circumferential surface may be fixed or assembled to a certain portion of the first protective case circumferential wall surface or the second protective case circumferential wall surface opposite to the folding axis, may have a foldable plate shape that covers the flexible display apparatus by allowing one end thereof to be fixed or rotatable and the opposite free end thereof to be rotated or folded to the folding axis, and may cover any one of plane of the flexible display apparatus and the outer circumferential surface when the foldable body is folded.

Backward bending prevention shapes may be formed at the end of the first protective case circumferential wall surface and the second protective case circumferential wall surface located at the side of the folding axis, and extend from the folding axis toward the inner circumferential surface to cover the semicircular circumferential surface of the foldable body by less than half of the thickness of the foldable body, and backward bending prevention vertical surfaces may be formed at end portions of the inner circumferential surface of the backward bending prevention shapes to face and make contact with each other by locating an end portion of the vertical surface at the folding axis when the foldable body is unfolded.

A protective case fixing through-hole may be formed at the end portion of the first protective case circumferential wall surface and the second protective case circumferential wall surface which are located at the side of the folding axis such that the first protective case and the second protective case can be latched or screwed to the protective case fixture formed on the foldable body outer circumferential surface to fix the first protective case and the second protective case.

A bezel latching protrusion fixed around the edge portion of the first folding outer surface or the second folding outer surface of the foldable body may be formed on the first protective case circumferential wall surface and the second protective case circumferential wall surface.

A weight reduction open space and a cover plate for covering the weight reduction open space may be formed at one of the first folding space protrusion 150 including the first unfolding protrusion and the second folding space protrusion including the second unfolding protrusion.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
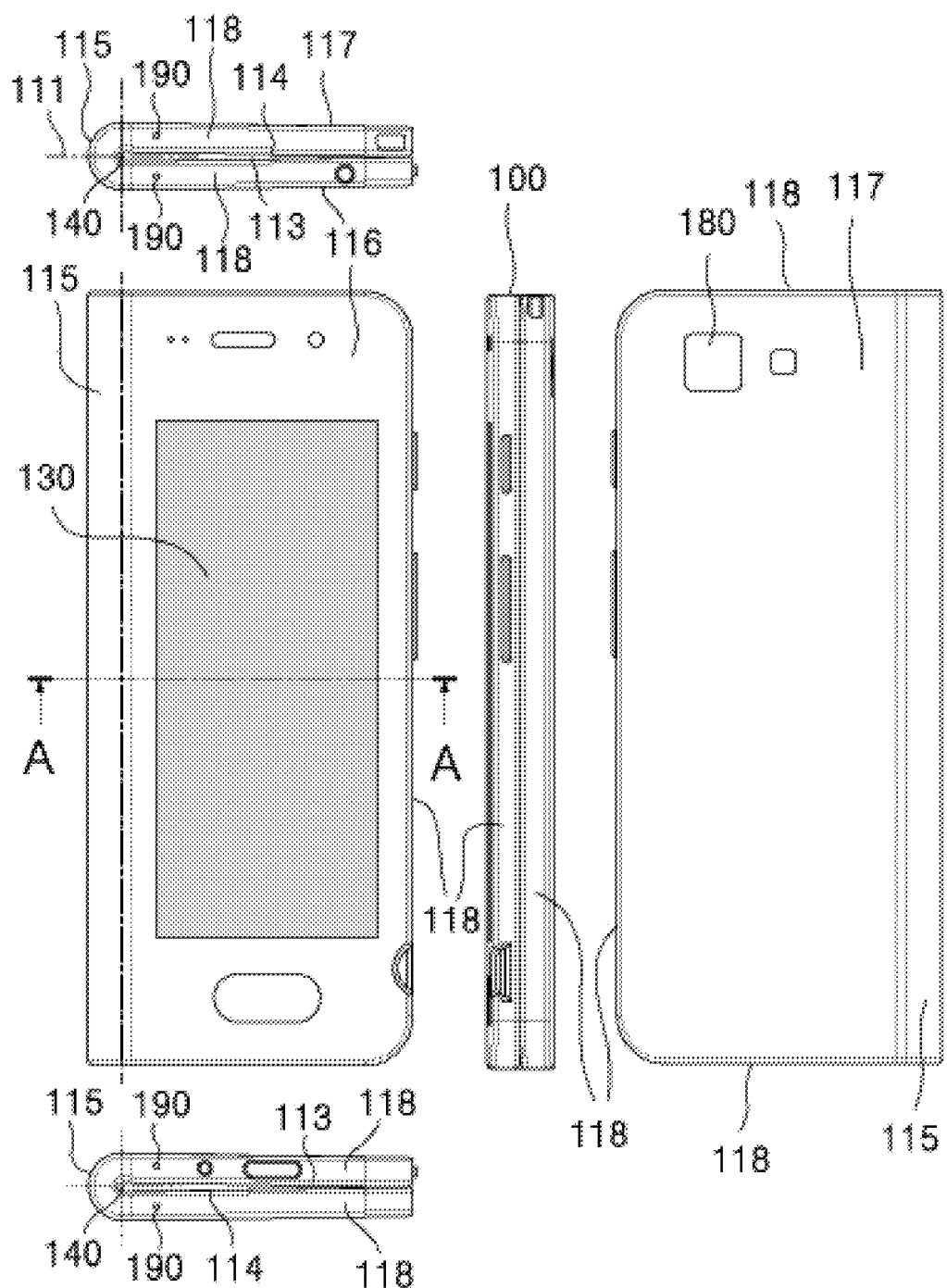
FIG. 1 is a conceptual view illustrating a folded state of an infolding image display apparatus in which a folding space gap is formed along a folding axis.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, exemplary embodiments of the present invention will be described in detail with reference to the accompanying drawings.

The terminology used herein is for the purpose of illustrating embodiments and is not intended to limit the present invention. In this disclosure, the singular form includes plural forms unless otherwise specified. In addition, reference numerals presented in the order of description are not necessarily limited to the order.

Figure 2:
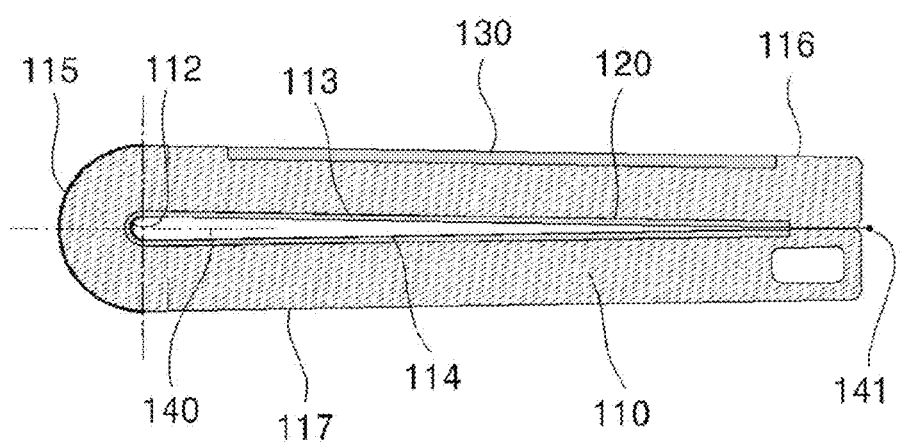
FIG. 2 is a cross-sectional view taken along line A-A of FIG. 1.
Figure 3:
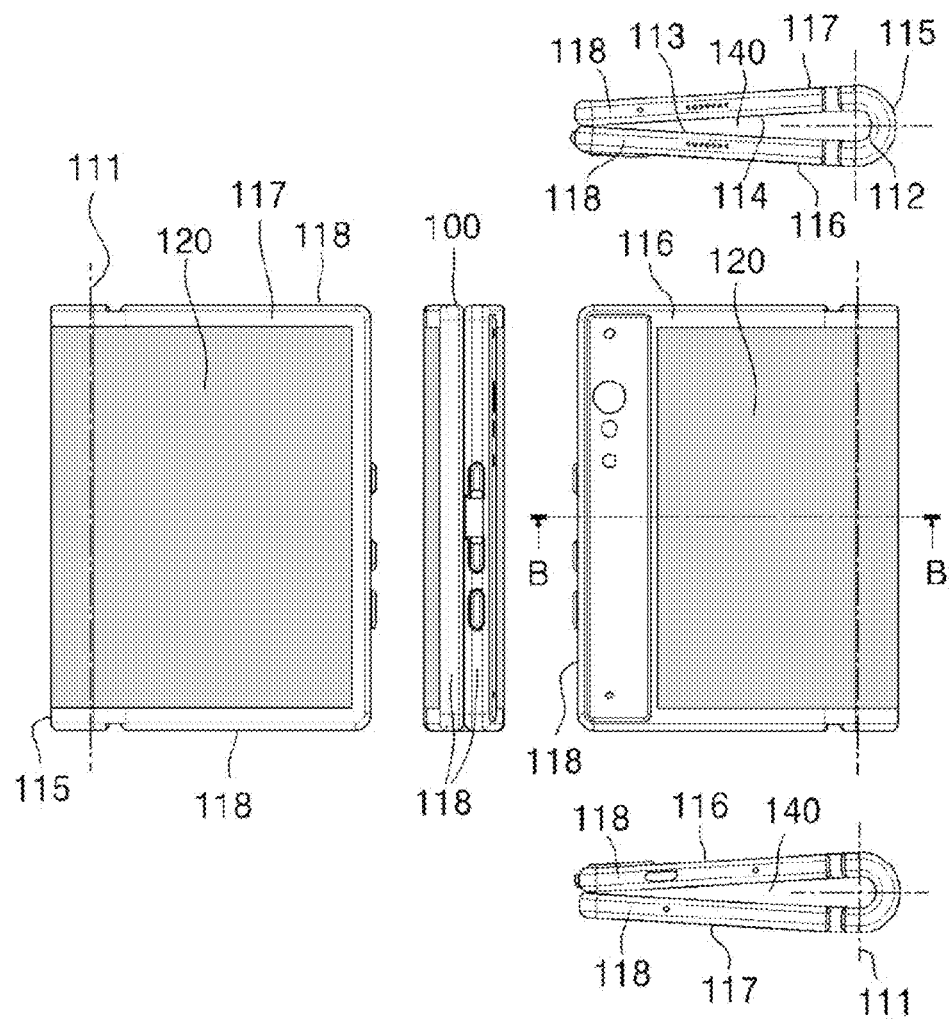
FIG. 3 is a conceptual view illustrating a folded state of an outfolding image display apparatus in which a folding space gap is formed along a folding axis.
Figure 4:
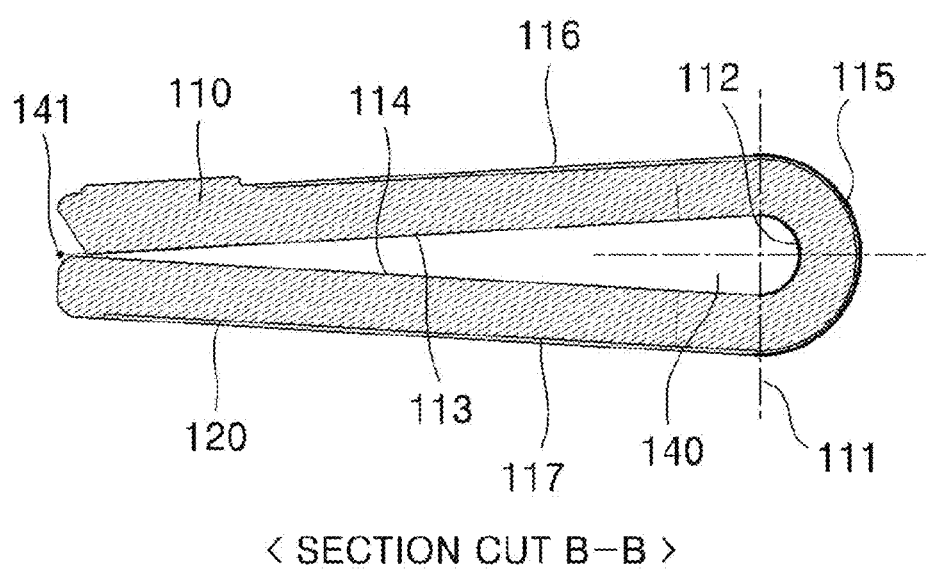
FIG. 4 is a cross-sectional view taken along line B-B of FIG. 2.

FIG. 1 is a conceptual view illustrating a folded state of an infolding image display apparatus in which a folding space gap is formed along a folding axis. FIG. 2 is a cross-sectional view taken along line A-A of FIG. 1. FIG. 3 is a conceptual view illustrating a folded state of an outfolding image display apparatus in which a folding space gap is formed along a folding axis. FIG. 4 is a cross-sectional view taken along line B-B of FIG. 2.

As shown in FIGS. 1 and 2, the infolding image display apparatus may include a foldable body 110 having a folding axis 111 that becomes a folding reference in a folded state, first folding inner surface 113 and the second folding inner surface 114 extending from both ends of an inner circumferential surface 112 located inside a folded side in the folded state and facing each other and first folding outer surface 116 and the second folding outer surface 117 extending from both ends of an outer circumferential surface 115 located at an opposite side of the folded side in the folded state and facing each other, and a single flexible display apparatus 120 applied to the first folding inner surface 113 and the second folding inner surface 114.

Furthermore, an outer surface display 130 as an additional display apparatus may be applied to the first folding outer surface 116 or the second folding outer surface 117.

As shown in FIGS. 3 and 4, the outfolding image display apparatus may include a foldable body 110 having a folding axis 111 that becomes a folding reference in a folded state, first folding inner surface 113 and the second folding inner surface 114 extending from both ends of an inner circumferential surface 112 located inside a folded side in the folded state and facing each other and first folding outer surface 116 and the second folding outer surface 117 extending from both ends of an outer circumferential surface 115 located at an opposite side of the folded side in the folded state and facing each other, and a single flexible display apparatus 120 applied to the first folding outer surface 116 and the second folding outer surface 117.

As shown in FIGS. 1 to 4, a foldable body outer circumferential surface 118 is formed along the circumference of the first folding inner surface 113, the first folding outer surface 116, the second folding inner surface 114 and the second folding outer surface 117. Since a folding axis portion of the foldable body outer circumferential surface 118 is elongated and contracted according to a change in length when the folded and unfolded state is changed, a flexible material such as rubber or cloth is applied to the folding axis portion.

When the infolding image display apparatus of FIG. 1 and the outfolding image display apparatus of FIG. 3 are folded, a folding space gap 140 of a cone shape which is formed by the first folding inner surface 113, the second folding inner surface 114, the inner circumferential surface 112 and is gradually narrowed from the folding axis 111 to the opposite side thereof is formed without a break from one end to the opposite end of the folding axis 111 along the folding axis 111. When the infolding image display apparatus and the outfolding image display apparatus are unfolded, the folding space gap 140 is opened and disappears.

In the folded state as shown in FIGS. 1 and 3, when an external force is applied to a folded state hinge-related portion of the infolding image display apparatus or the outfolding image display apparatus in which the folding space gap 140 is formed, the first folding inner surface 113 and the second folding inner surface 114 or the inner circumferential surface 112 is pushed and deformed toward the folding space gap 140 due to a structure having no load supporting surface or supporting point at the region of the folding space gap 140. When the degree of deformation exceeds the limit that can support the hinge, the damage of the hinge or the irreversible deformation may occur.

Such damage or deformation of the hinge may cause damage or distortion of the flexible display apparatus 120.

In addition, when sharp foreign substances are introduced into the opened folding space gap 140 in the folded state, the screen display surface of the flexible display apparatus 120 may be scratched, or the inner circumferential surface 112 having elastic characteristics may be torn.

In order to solve the above-mentioned limitations of the infolding image display apparatus or the outfolding image display apparatus due to the folding space gap 140, the accessory of the foldable image display apparatus (Korean Patent Application No. 10-2018-0139604) was filed by the present applicant.

The accessory of the foldable image display apparatus proposed by the present applicant includes a folding space insert selectively inserted into a folding space gap region and a folding space support applied to a folding inner surface outside the screen display surface region. In addition, it is proposed that the folding space support can be directly reflected on a foldable body 110.

Figure 5:
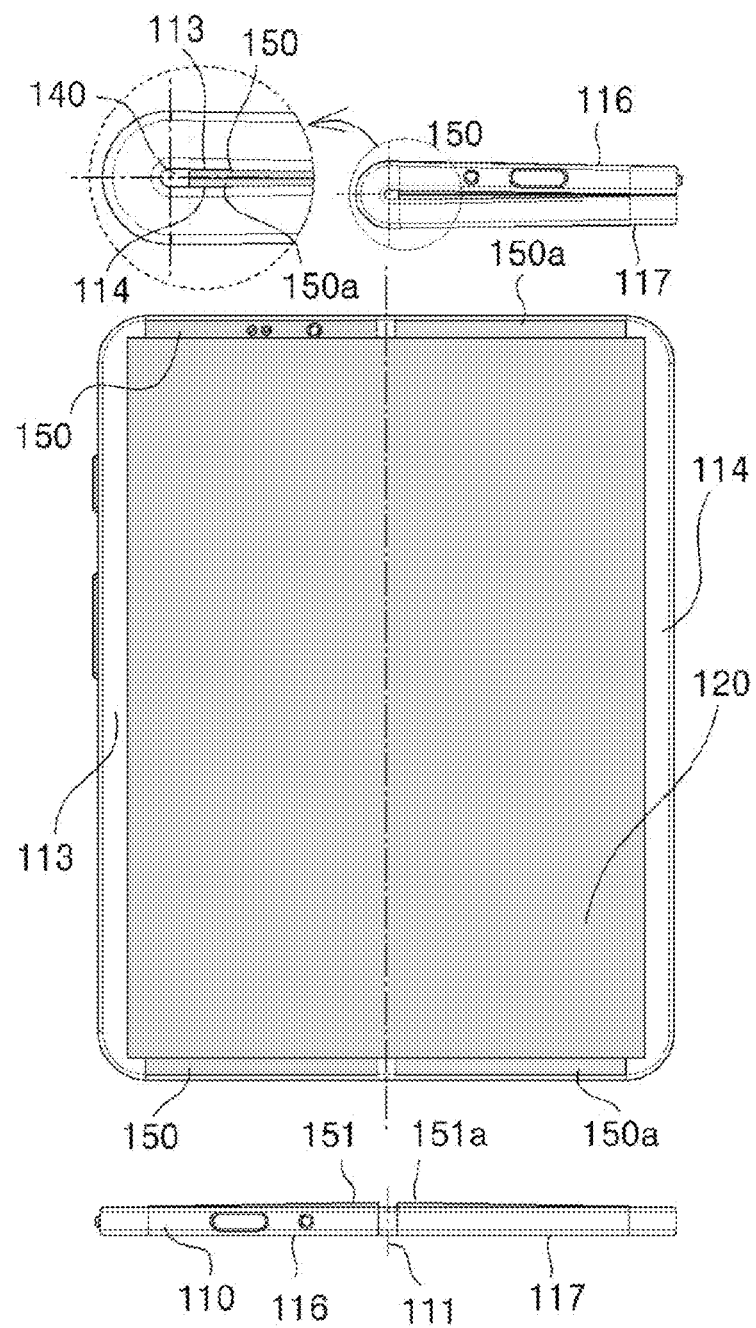
FIG. 5 is a conceptual view illustrating a folding space protrusion applied to the infolding image display apparatus of FIG. 1.
Figure 6:
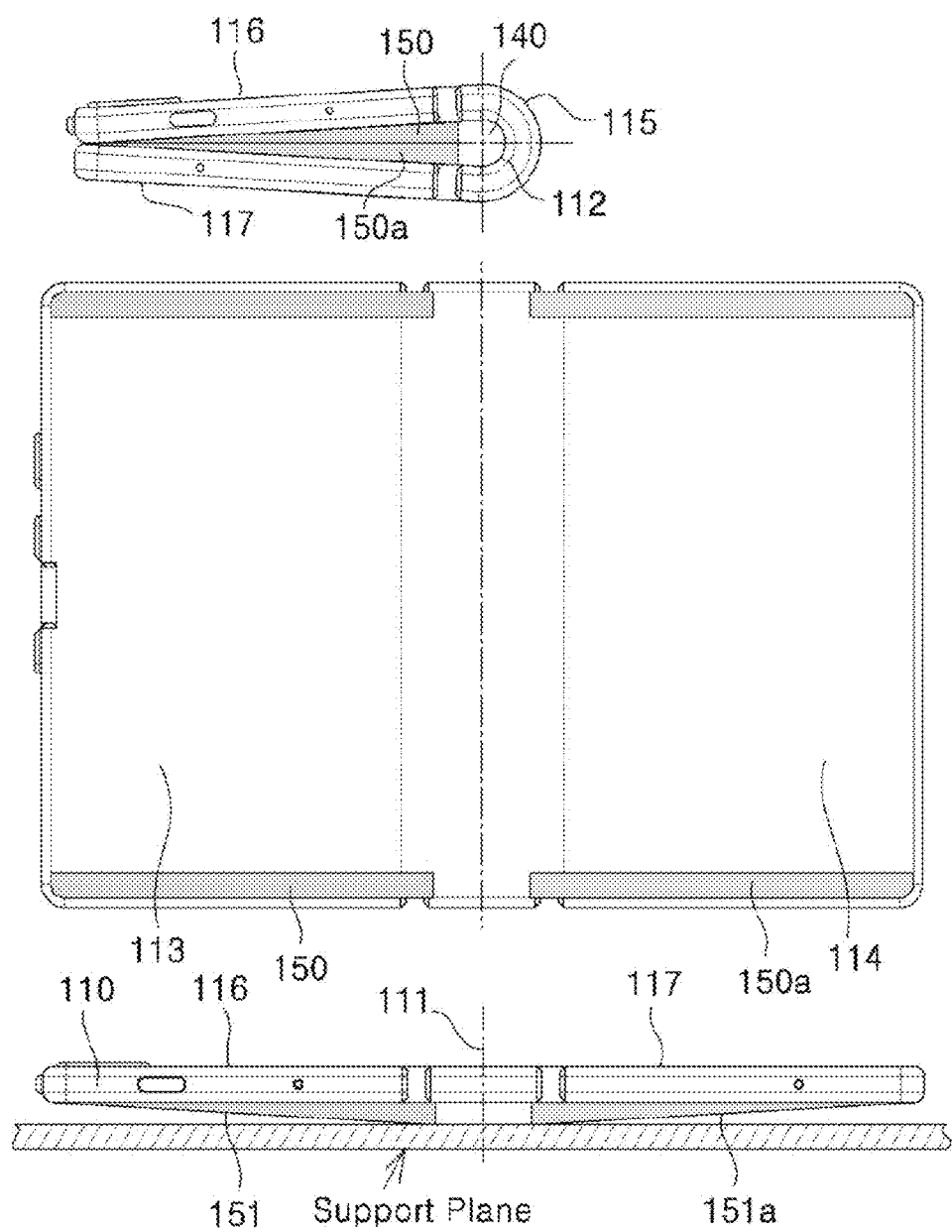
FIG. 6 is a conceptual view illustrating a folding space protrusion applied to the outfolding image display apparatus of FIG. 3.

FIG. 5 is a conceptual view illustrating a folding space protrusion applied to the infolding image display apparatus of FIG. 1, and FIG. 6 is a conceptual view illustrating a folding space protrusion applied to the outfolding image display apparatus of FIG. 3.

As shown in FIG. 5, a folding space support may be directly reflected on the first folding inner surface 113 and the second folding inner surface 114 outside the screen display surface region of the foldable body 110. Also, as shown in FIG. 6, a folding space support may be directly reflected on a certain location of the first folding inner surface 113 and the second folding inner surface 114 of the foldable body 110.

As shown in FIG. 5, when the folding space support is applied to the infolding image display apparatus of FIG. 1, an interference with a camera or a sensor disposed in a bezel portion of the first folding inner surface 113 or the second folding inner surface 114 may occur. Also, there is a limitation that it is difficult to secure the position to which the folding space support is applied when the bezel is not provided.

As shown in FIG. 6, when a folding space support having a shape of a first folding space protrusion 150 or a second folding space protrusion 150a is applied to the first folding inner surface 113 or the second folding inner surface 114 of the outfolding image display apparatus of FIG. 3, some limitations due to the folding space gap 140 occurring in the folded state can be overcome.

However, in the folded state as shown in FIG. 6, the inner circumferential surface 112 around the folding axis 111 of the folding space gap 140 is still held open and there is no load supporting point.

Furthermore, due to the inclination of the first folding space inclined surface 151 of the first folding space protrusion 150 and the second folding space inclined surface 151a of the second folding space protrusion 150a in the unfolded state, the outfolding image display apparatus is not stably maintained, and a seesaw movement occurs during the touch operation of a user.

As shown in FIGS. 5 and 6, since the outer circumferential surface 115 of the foldable body 110 held in a tensioned state in the folded state even when the folding space support is applied, the outer circumferential surface 115 is not protected, and may be torn by an external shock.

In order to overcome the above-mentioned limitations, a foldable image display apparatus and a protective case for a foldable image display apparatus are proposed by the present applicant.

Figure 7:
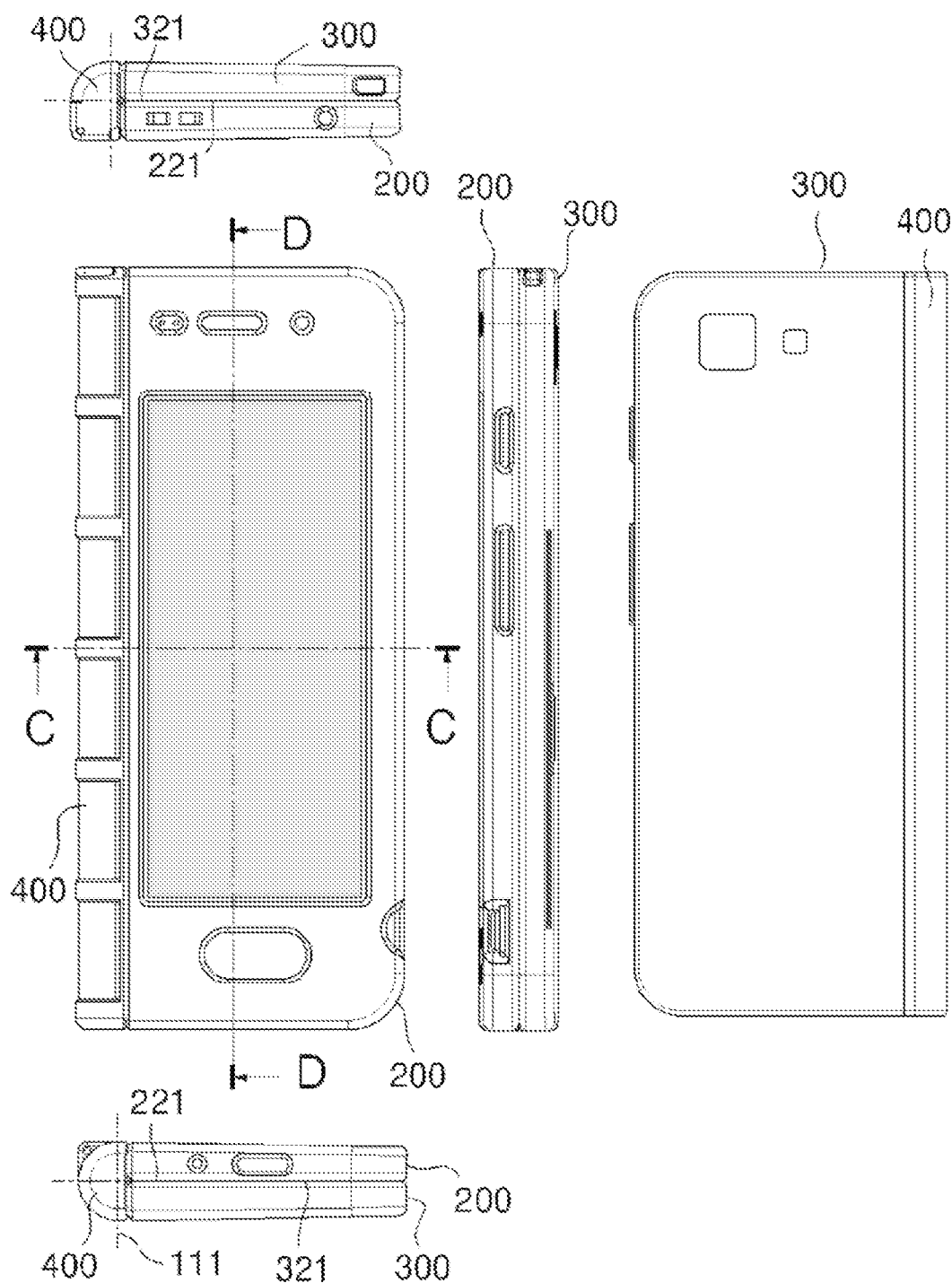
FIG. 7 is a view illustrating a first protective case, a second protective case and an edge cover applied to the image display apparatus of FIG. 1 according to an embodiment of the present invention.
Figure 8:
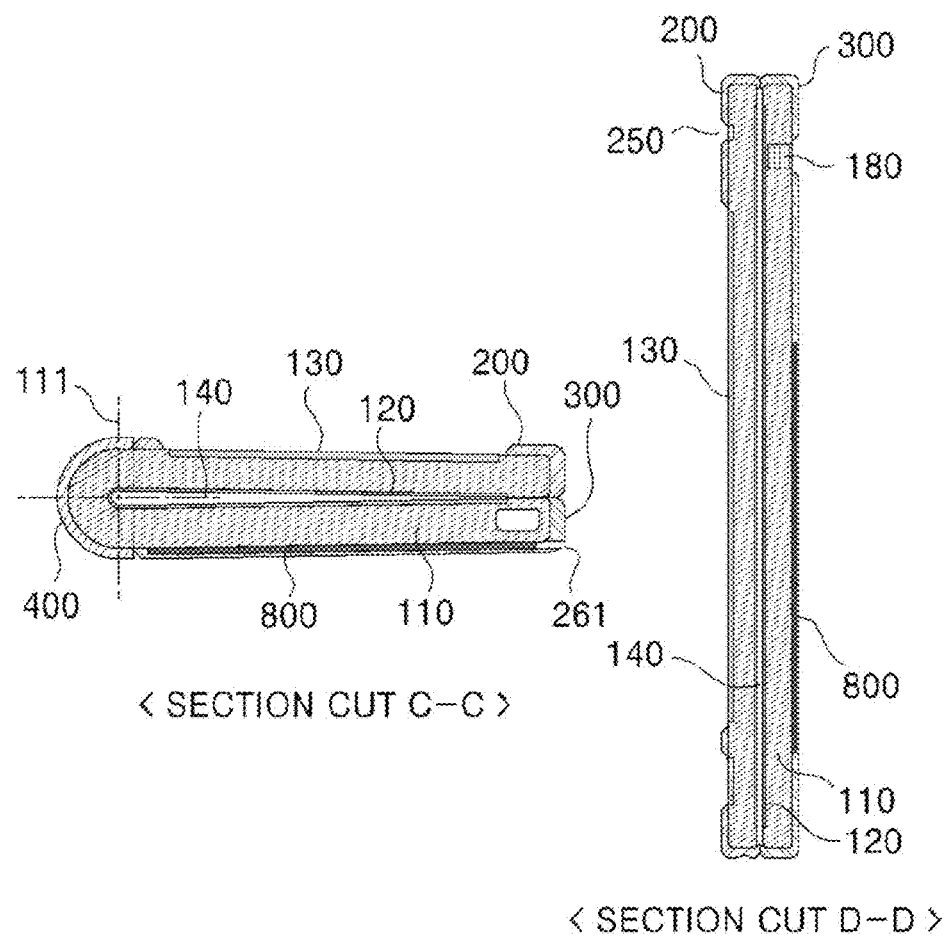
FIG. 8 is a cross-sectional view taken along lines C-C and D-D of FIG. 7.
Figure 9:
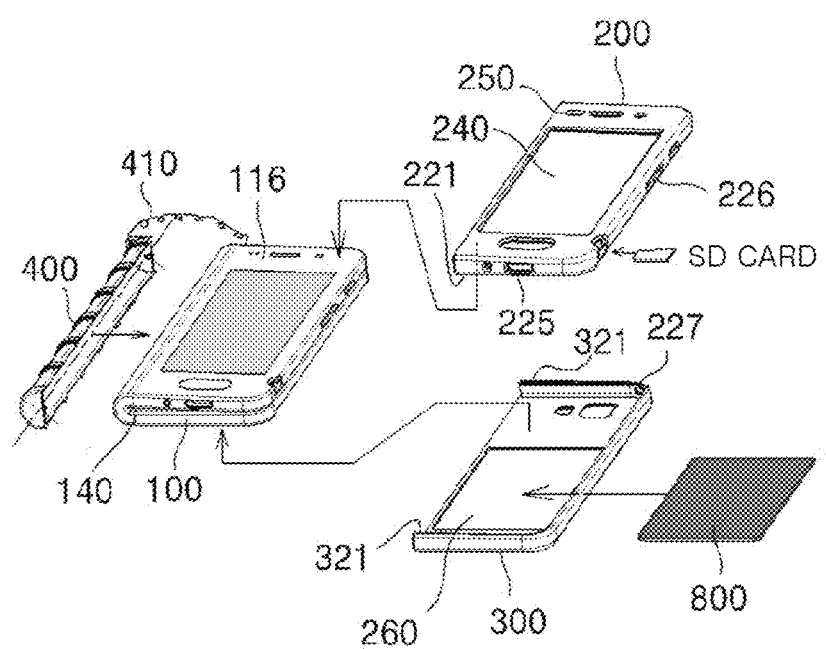
FIG. 9 is an exploded perspective view of FIG. 7.
Figure 10:
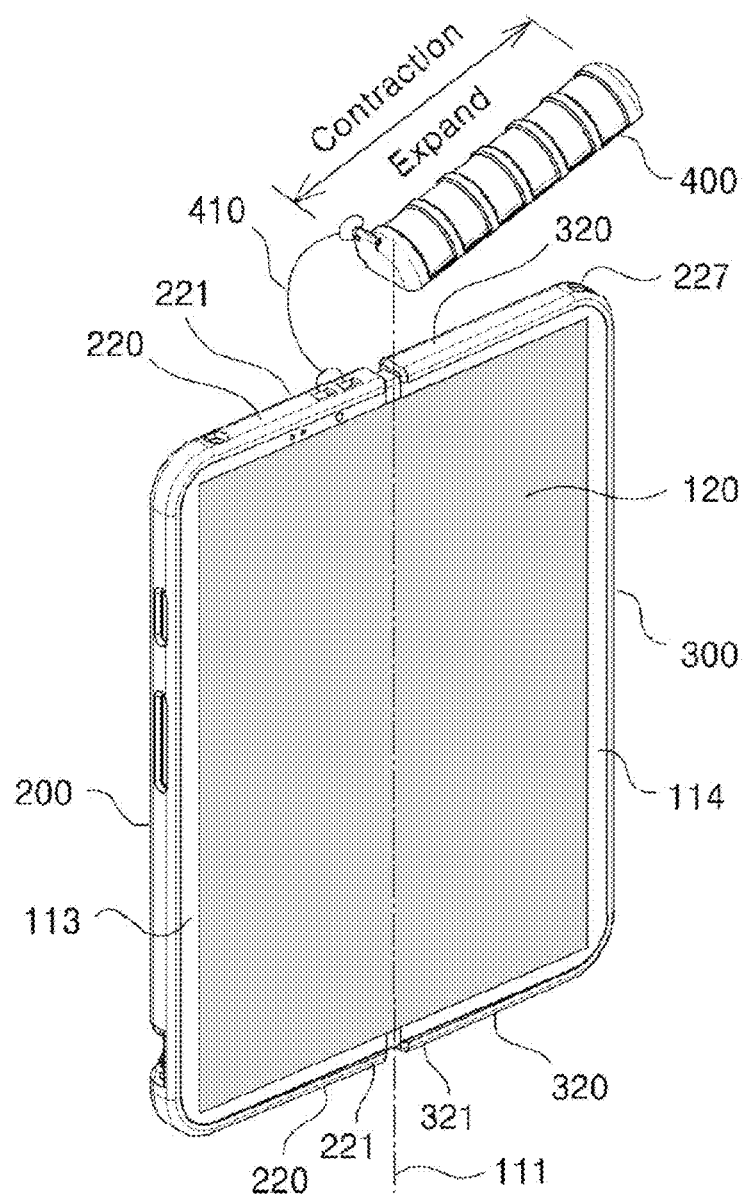
FIG. 10 is a perspective view illustrating a fully flat unfolded state of FIG. 7.
Figure 11:
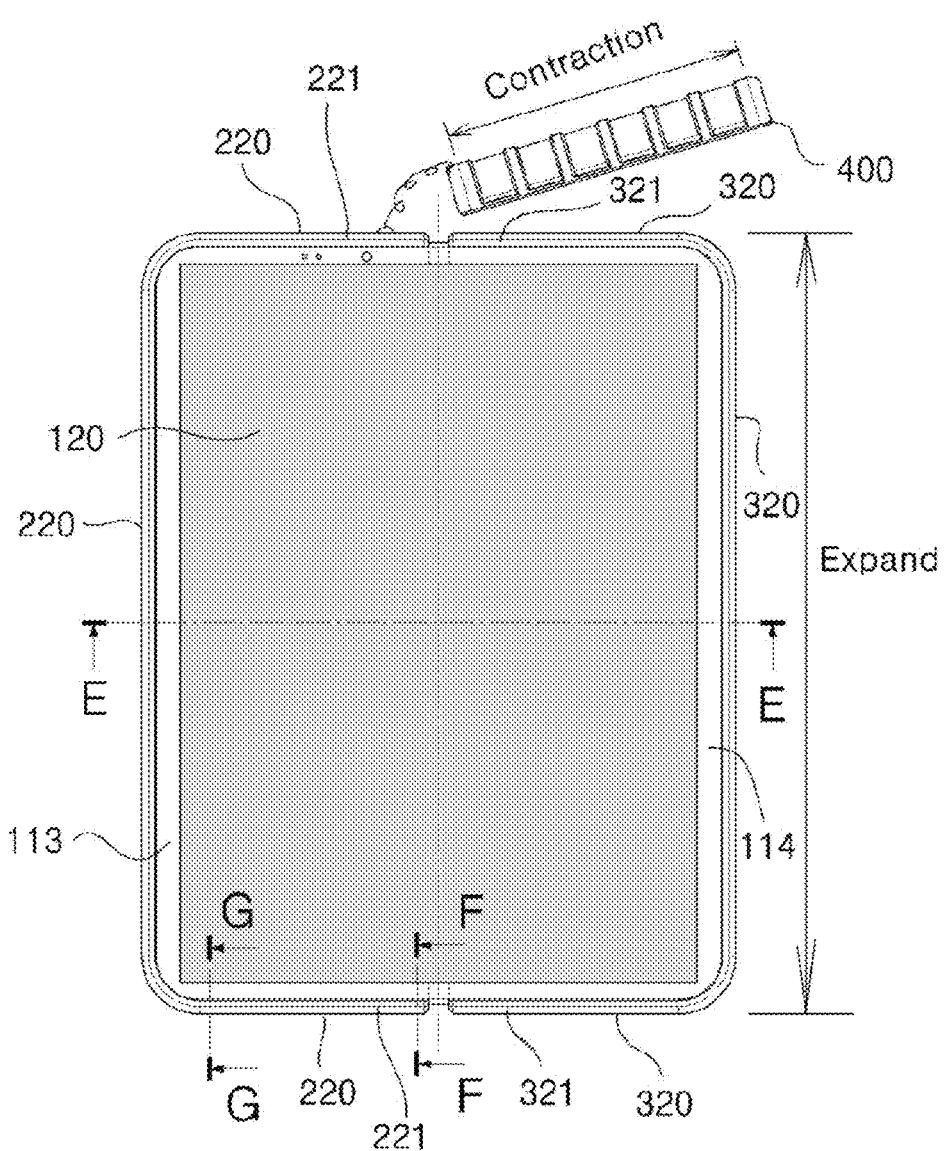
FIG. 11 is a plan view of FIG. 10.
Figure 12:
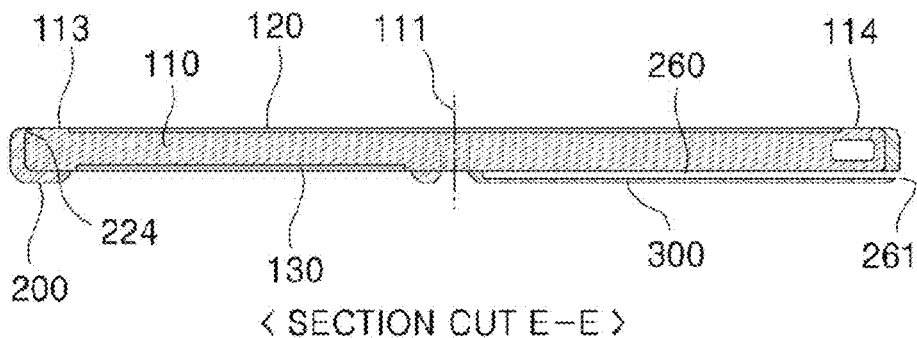
FIG. 12 is a cross-sectional view taken along lines E-E, F-F, and G-G of FIG. 11.
Figure 12:
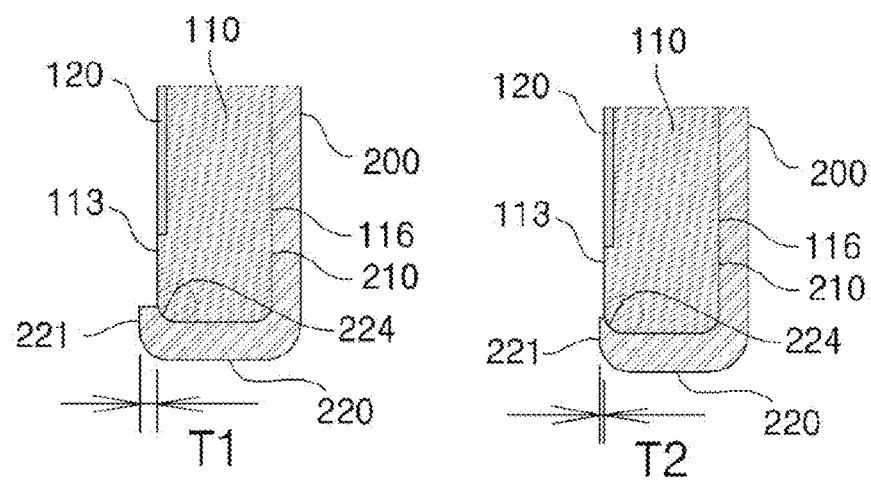
Figure 13:
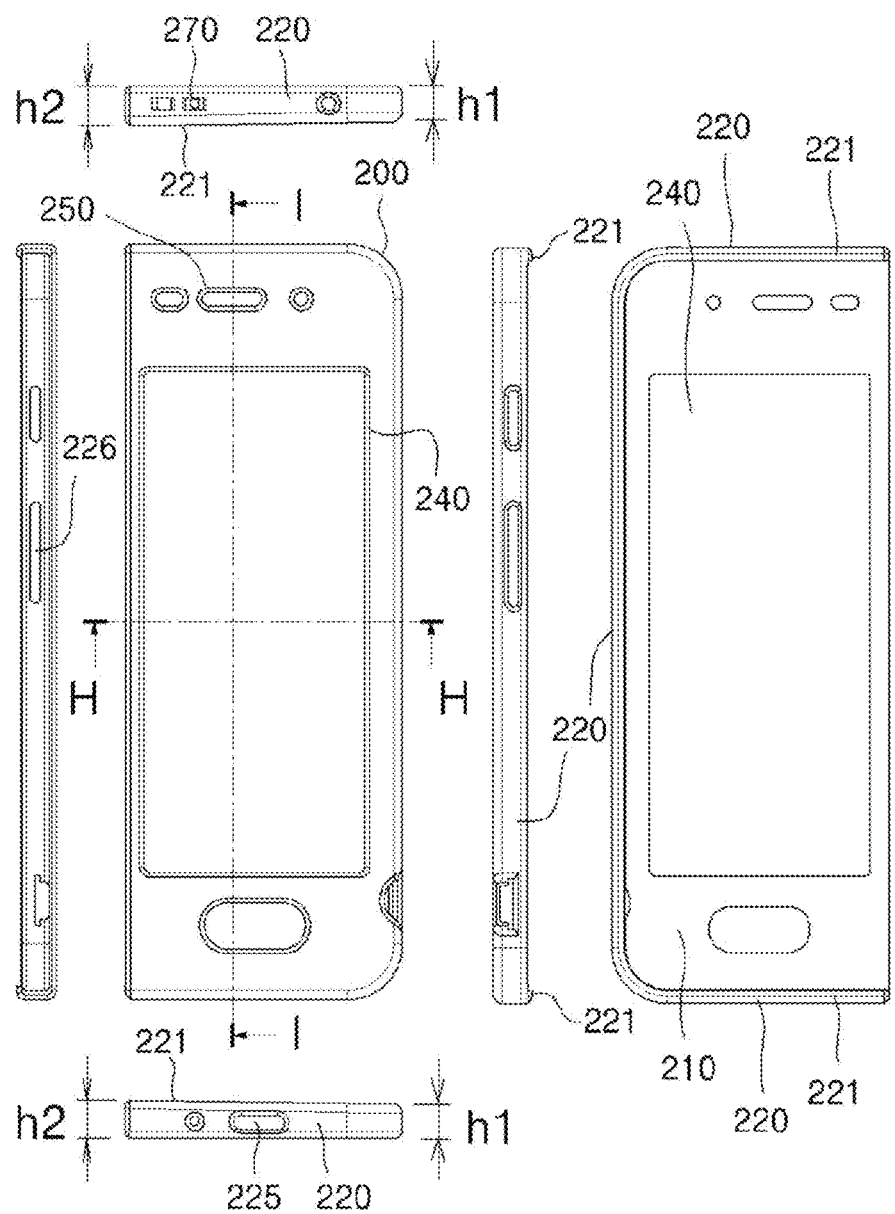
FIG. 13 are a front view, a plan view, a left side view, a right side view, a bottom view, and a rear view illustrating the first protective case of FIG. 7.
Figure 14:
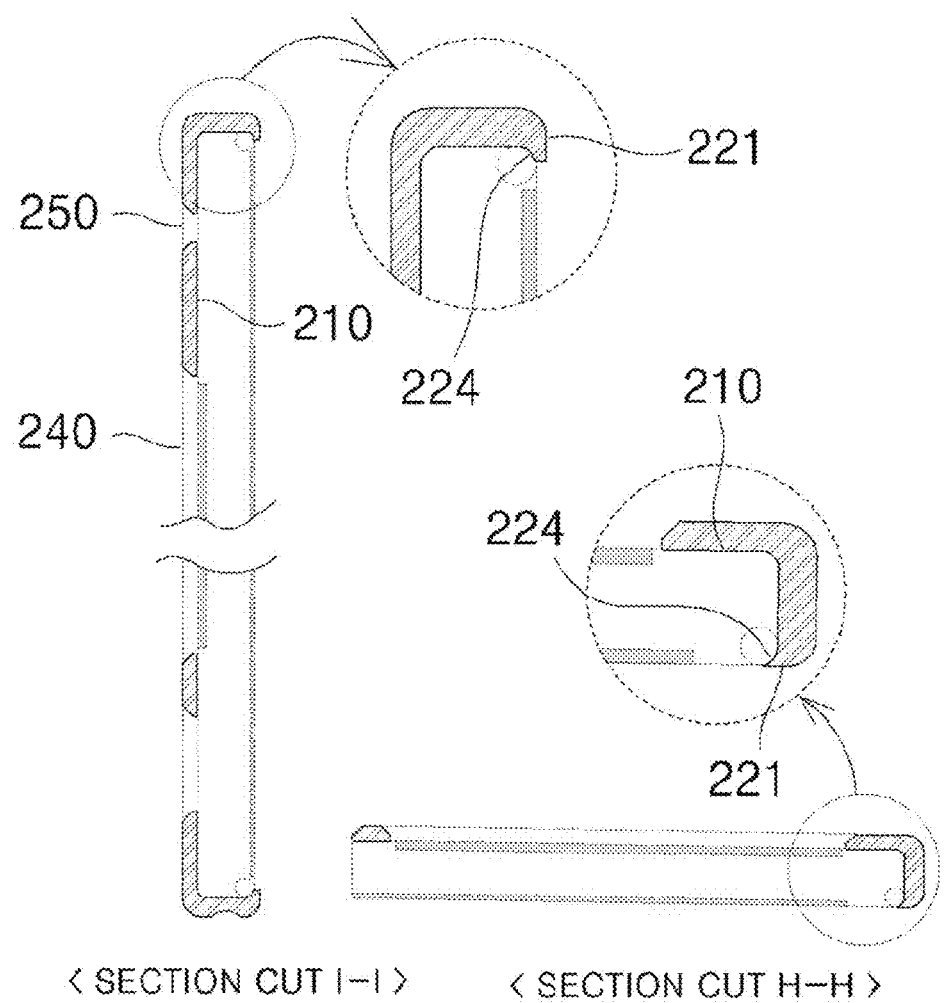
FIG. 14 is a cross-sectional view and a partial detail view taken along lines H-H and I-I of FIG. 13.
Figure 15:
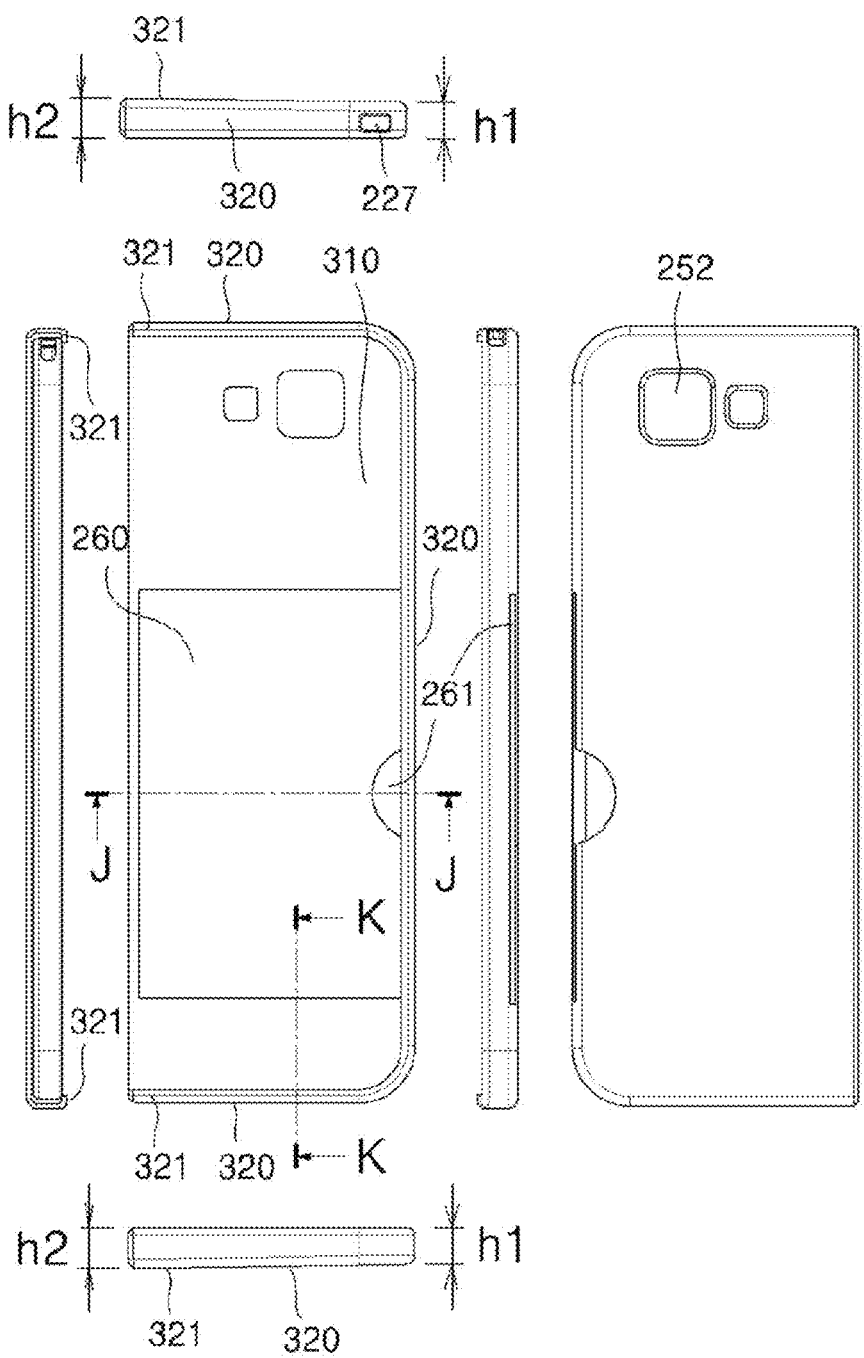
FIG. 15 is a conceptual view illustrating the second protective case of FIG. 7.
Figure 16:
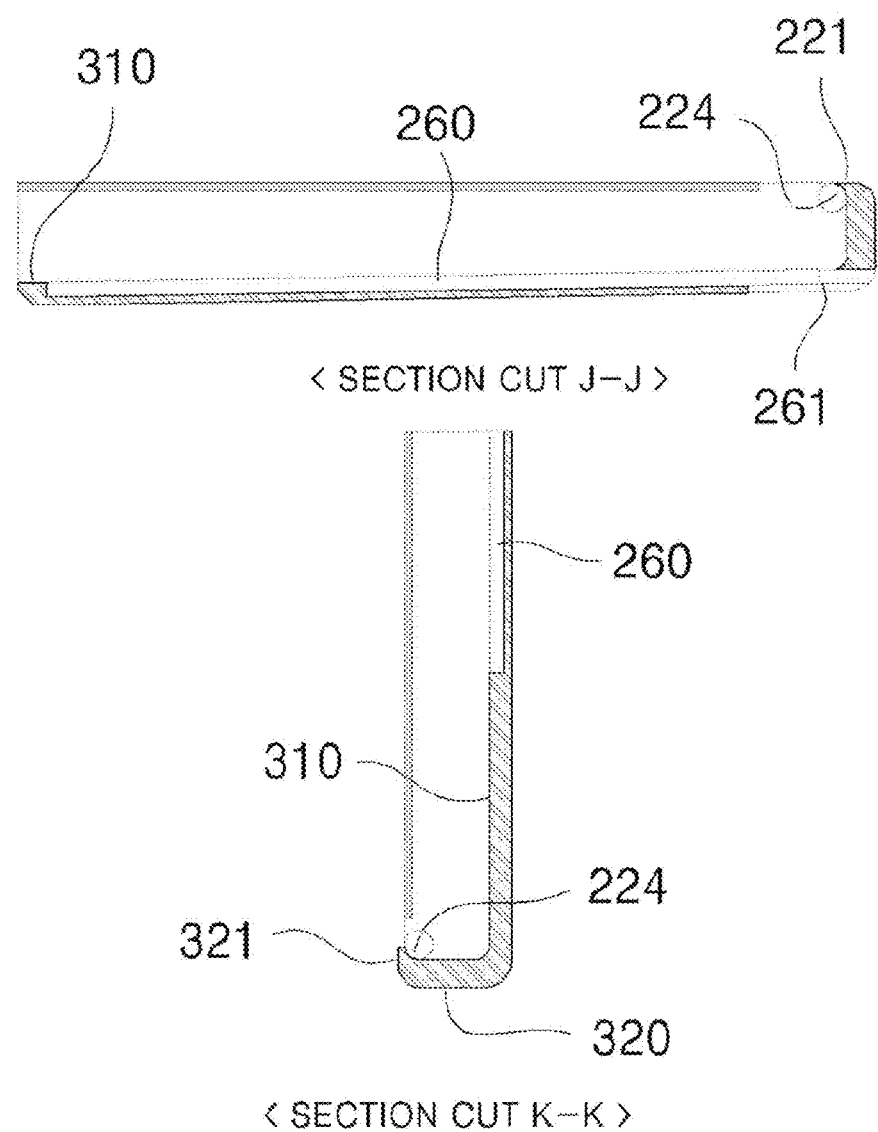
FIG. 16 is a cross-sectional view taken along lines J-J and K-K of FIG. 15.
Figure 17:
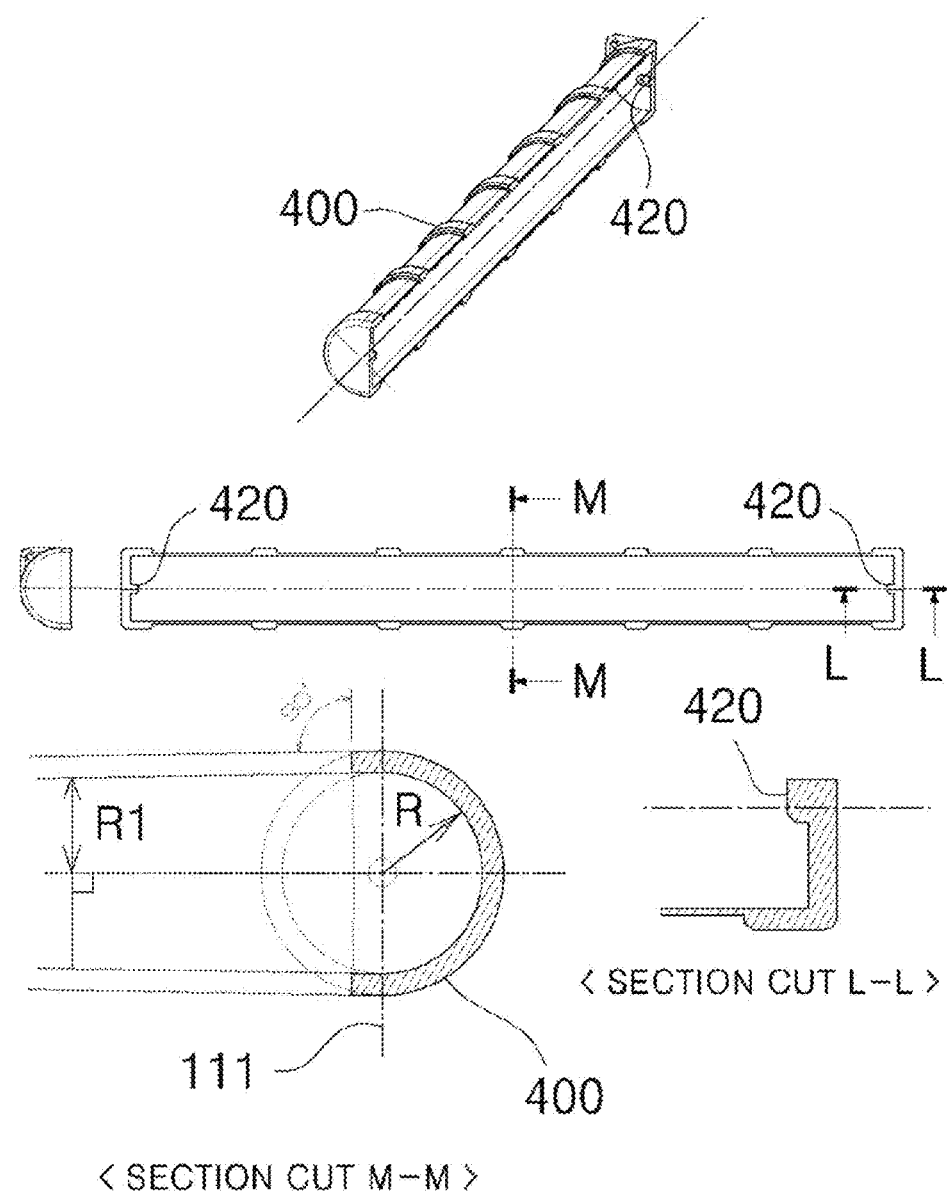
FIG. 17 are a conceptual view illustrating the edge cover of FIG. 7 and a cross-sectional view taken along lines L-L and M-M.
Figure 18:
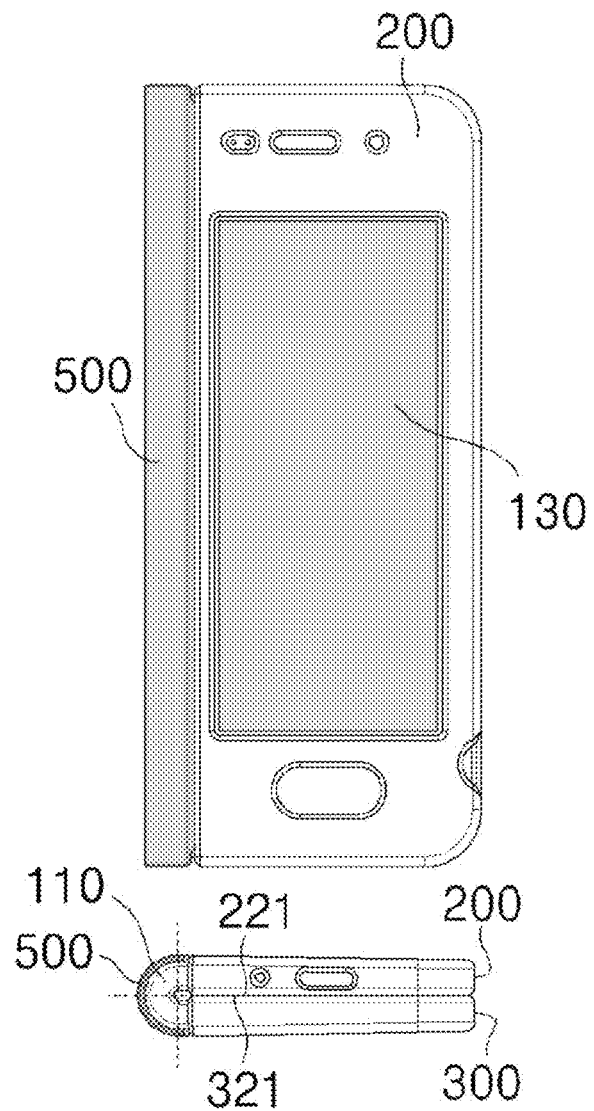
FIG. 18 is a view illustrating a first protective case, a second protective case, and a connection plate applied to the image display apparatus of FIG. 1 according to an embodiment of the present invention.
Figure 19:
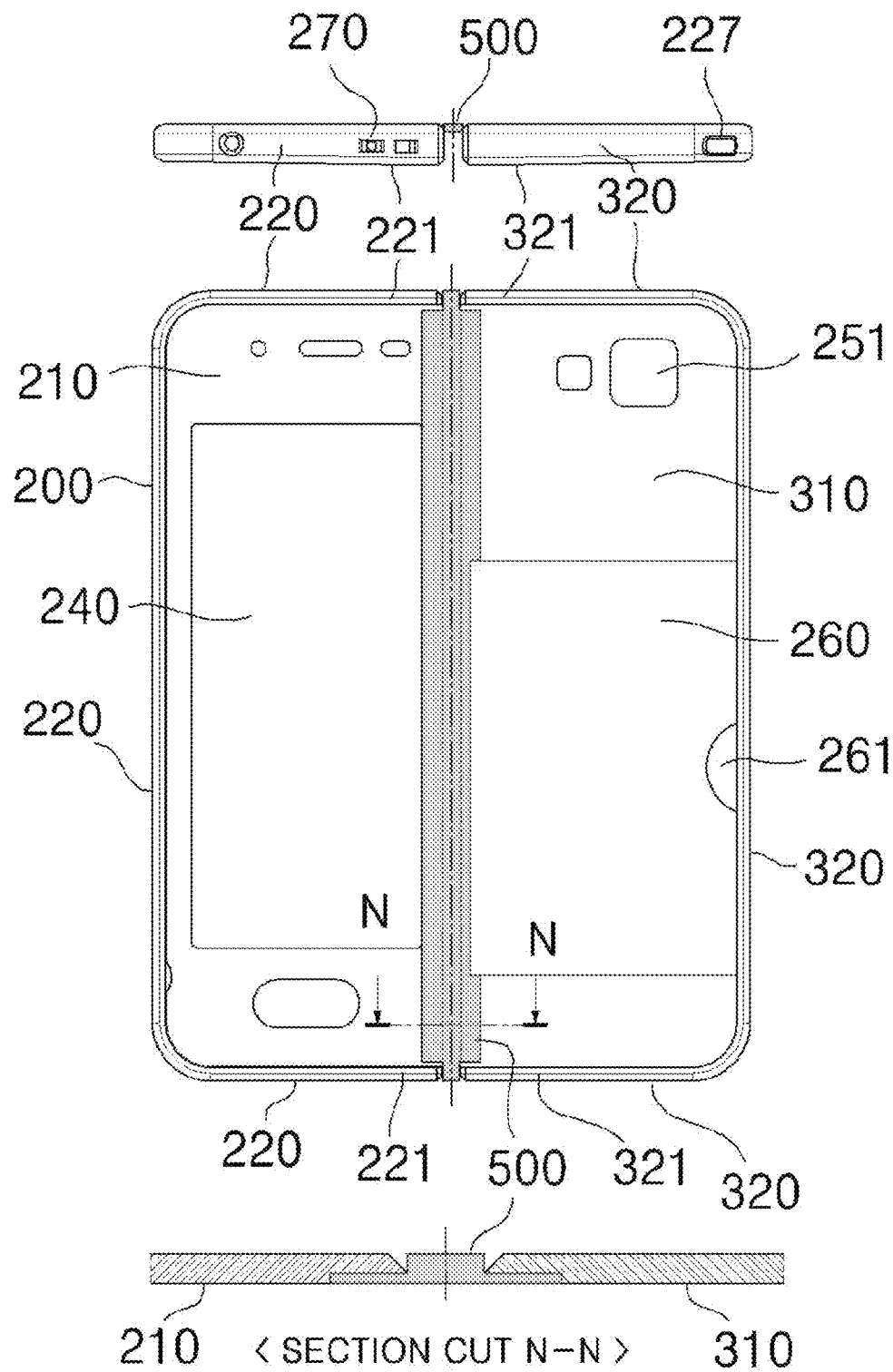
FIG. 19 are a conceptual view illustrating an unfolded state of FIG. 18 and a cross-sectional view taken along line N-N.
Figure 20:
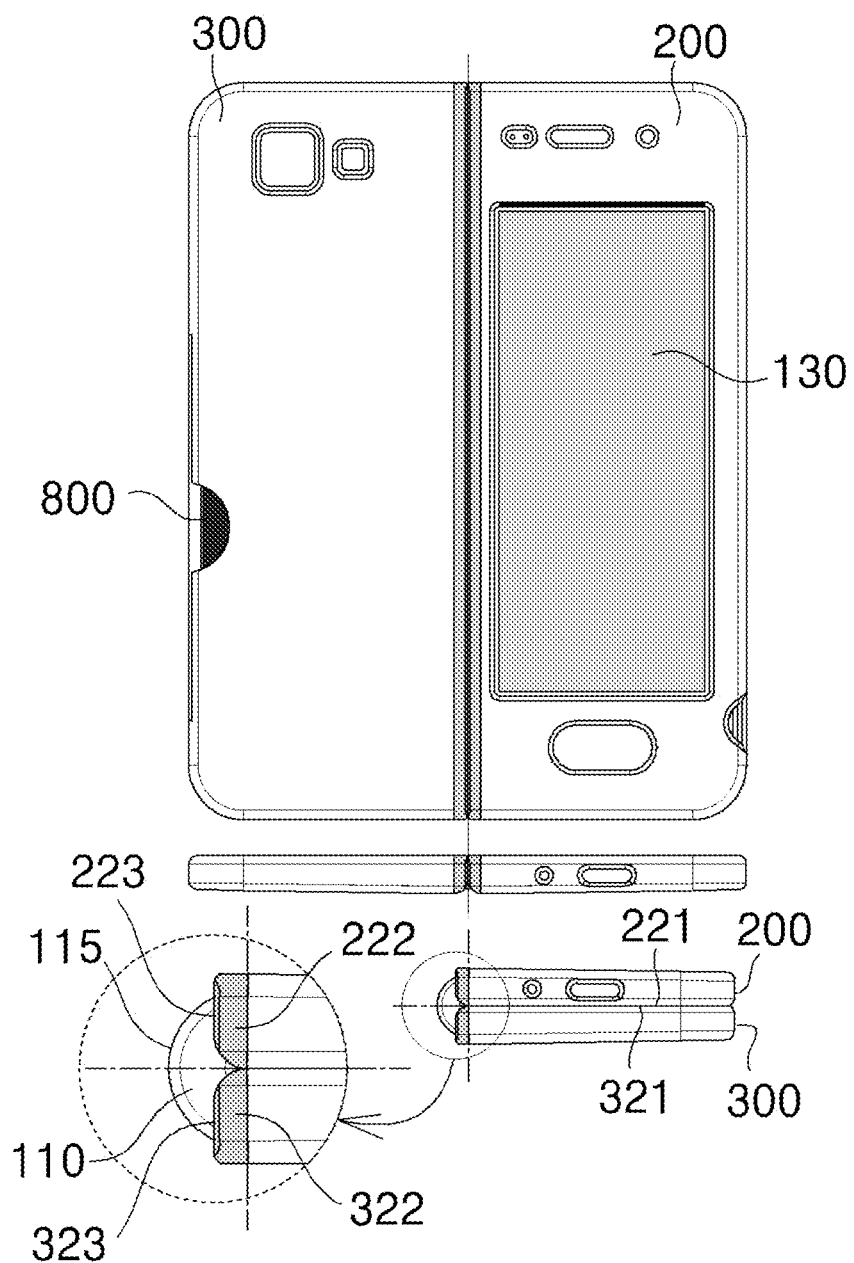
FIG. 20 is a view illustrating a first protective case and a second protective case in which a backward bending prevention shape is reflected in the image display apparatus of FIG. 1.
Figure 21:
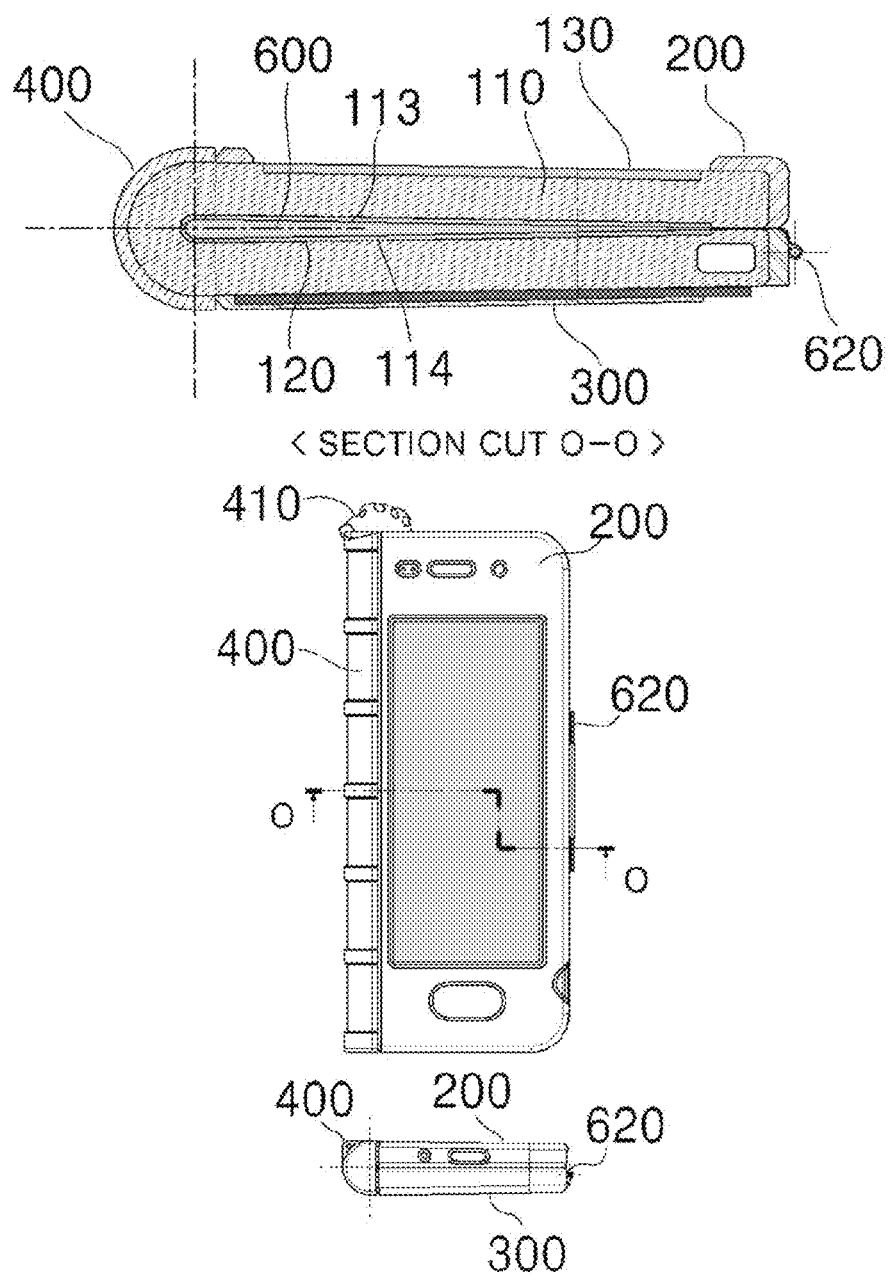
FIG. 21 are a view illustrating a folded state when a folding space insert is applied and a cross-sectional view taken along line O-O.
Figure 22:
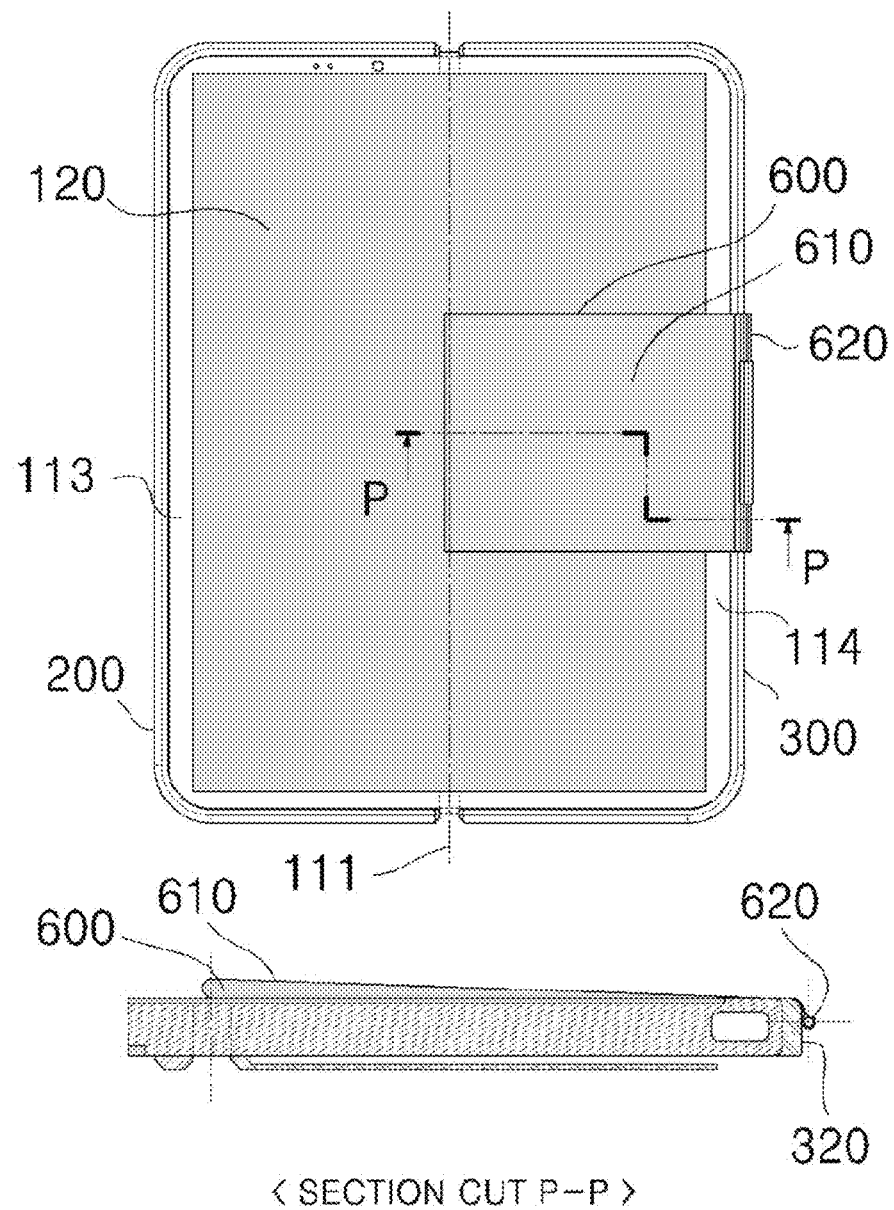
FIG. 22 are a plan view illustrating an unfolded state of FIG. 21 and a cross-sectional view taken along line P-P.
Figure 23:
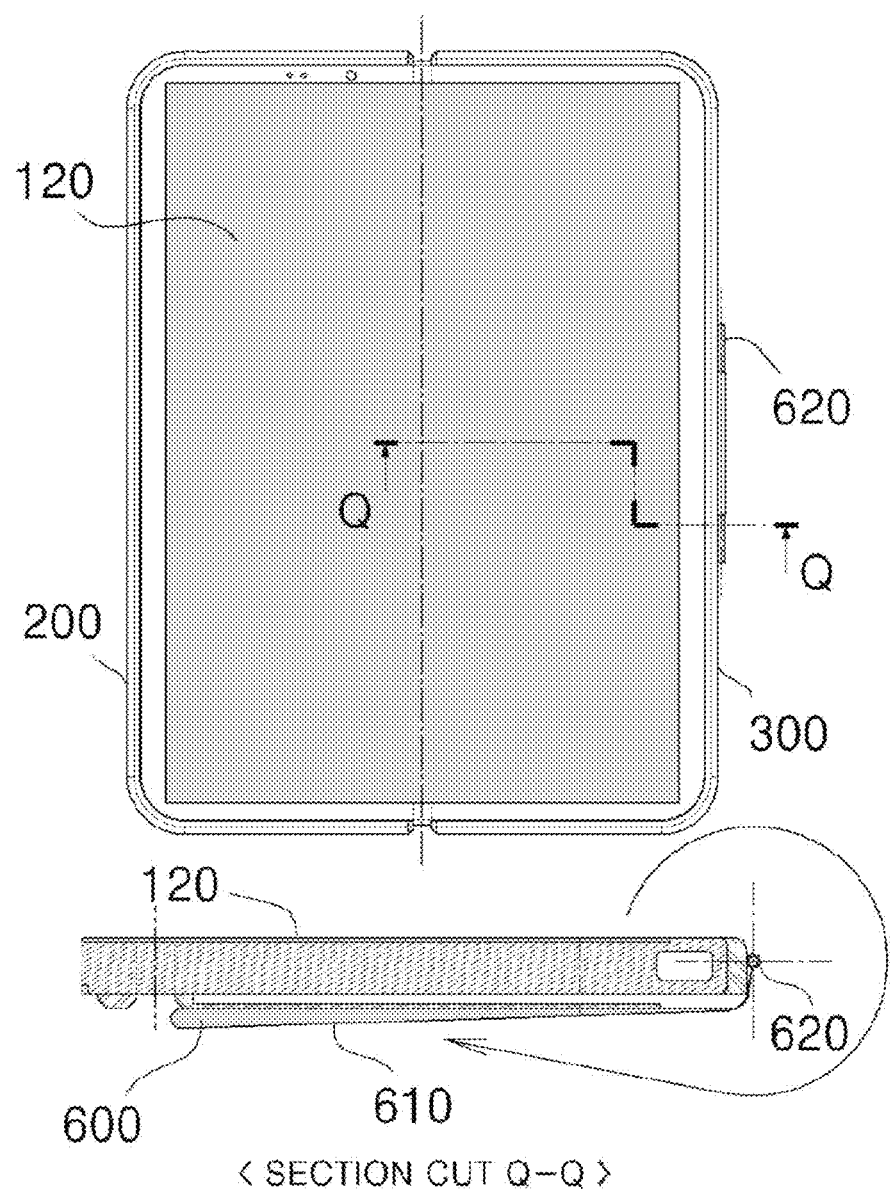
FIG. 23 are a plan view illustrating a free end of a folding space insert rotated in an unfolded state of FIG. 22 and a cross-sectional view taken along line Q-Q.
Figure 24:
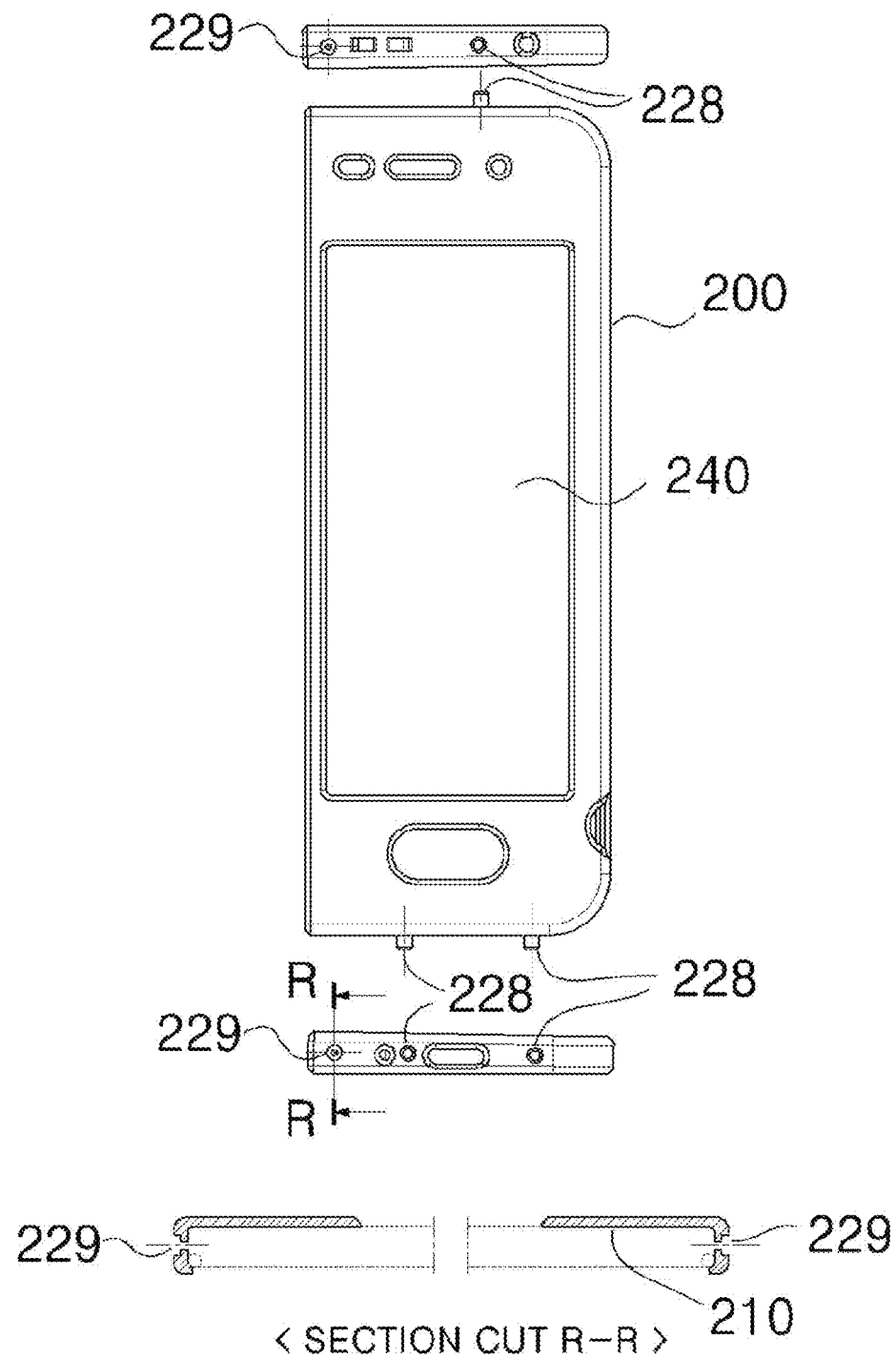
FIG. 24 are a conceptual view illustrating a cradle latching fixture and a protective case fixing through-hole additionally applied to the first protective case of FIG. 7 and a cross-sectional view taken along line R-R.

FIG. 7 is a view illustrating a first protective case, a second protective case and an edge cover applied to the image display apparatus of FIG. 1 according to an embodiment of the present invention. FIG. 8 is a cross-sectional view taken along lines C-C and D-D of FIG. 7. FIG. 9 is an exploded perspective view of FIG. 7. FIG. 10 is a perspective view illustrating a fully flat unfolded state of FIG. 7. FIG. 11 is a plan view of FIG. 10. FIG. 12 is a cross-sectional view taken along lines E-E, F-F, and G-G of FIG. 11. FIG. 13 are a front view, a plan view, a left side view, a right side view, a bottom view, and a rear view illustrating the first protective case of FIG. 7. FIG. 14 is a cross-sectional view and a partial detail view taken along lines H-H and I-I of FIG. 13. FIG. 15 is a conceptual view illustrating the second protective case of FIG. 7. FIG. 16 is a cross-sectional view taken along lines J-J and K-K of FIG. 15. FIG. 17 are a conceptual view illustrating the edge cover of FIG. 7 and a cross-sectional view taken along lines L-L and M-M. FIG. 18 is a view illustrating a first protective case, a second protective case, and a connection plate applied to the image display apparatus of FIG. 1 according to an embodiment of the present invention. FIG. 19 are a conceptual view illustrating an unfolded state of FIG. 18 and a cross-sectional view taken along line N-N. FIG. 20 is a view illustrating a first protective case and a second protective case in which a backward bending prevention shape is reflected in the image display apparatus of FIG. 1. FIG. 21 are a view illustrating a folded state when a folding space insert is applied and a cross-sectional view taken along line O-O. FIG. 22 are a plan view illustrating an unfolded state of FIG. 21 and a cross-sectional view taken along line P-P. FIG. 23 are a plan view illustrating a free end of a folding space insert rotated in an unfolded state of FIG. 22 and a cross-sectional view taken along line Q-Q. FIG. 24 are a conceptual view illustrating a cradle latching fixture and a protective case fixing through-hole additionally applied to the first protective case of FIG. 7 and a cross-sectional view taken along line R-R.

FIGS. 7 to 24 show that the protective case for the foldable image display apparatus proposed by the present applicant is applied to the infolding image display apparatus of FIG. 1.

As shown in FIGS. 7, 9, 10, 11, 13, 15 and 17, a protective case for a foldable image display apparatus according to a first embodiment of the present invention includes a first protective case 200 having a first fixing surface 210 supported while surrounding a first folding outer surface 113 at a certain distance away from a folding axis 111 of a foldable body 110 and a first folding space protruding circumferential surface 220 having a first folding space inclined surface 221 protruding from the first fixing surface 210 to a folding space gap 140 deviating from a first folding inner surface 113 while a screen display surface of a flexible display apparatus 120 is maintained in an exposed state while surrounding a foldable body outer circumferential surface 118 except the folding axis 111 of the foldable body 110 and a second protective case 300 having a second fixing surface 310 supported while surrounding a second folding outer surface 117 at a certain distance away from the folding axis 111 and a second folding space protruding circumferential surface 320 having a second folding space inclined surface 321 protruding from the second fixing surface 310 to the folding space gap 140 deviating from a second folding inner surface 114 while the screen display surface of the flexible display apparatus 120 is maintained in an exposed state while surrounding the foldable body outer circumferential surface 118 except the folding axis 111 of the foldable body 110.

Unlike a related-art protective case for a plate type smart phone, which has a closed circumferential shape of a continuous rectangular shape without a break, as shown in FIGS. 7, 9, 10 and 11, the first protective case 200 and the second protective case 300 according to the first embodiment are configured such that the first protective case 200 and the second protective case 300 are separated from each other at the folding axis 111 required to change in length when the foldable body 110 is folded and unfolded. Due to this separation result, a first folding space protruding circumferential surface 220 and a second folding space protruding circumferential surface 320 surrounding the foldable body outer circumferential surface 118 are not formed around the folding axis 111 of the first protective case 200 and the second protective case 300, and the foldable body outer circumferential surface 118 is opened at the folding axis 111.

As shown in FIGS. 12, 13, 15 and 16, the protruding height of the first folding space protruding circumferential surface 220 and the second folding space protruding circumferential surface 320 is lowered away from the folding axis 111. The first folding space protruding circumferential surface 220 and the second folding space protruding circumferential surface 320 in the folded state make contact with the first folding space inclined surface 221 and the second folding space inclined surface 321, thereby partially or entirely occupying the space gap 140 and closing the space gap 140.

In the folded state, since the first folding space protruding circumferential surface 220 and the second folding space protruding circumferential surface 320 make contact with the first folding space inclined surface 221 and the second folding space inclined surface 321 to occupy part or all of the folding space gap 140 along the folding axis 111 and close the folding space gap 140 formed at both ends of the folding axis 111, foreign substances can be prevented from introducing into the folding space gap 140 and external damage such as stabbing and bursting of the inner circumferential surface 112 can be prevented when the foldable body 110 is repeatedly folded and unfolded.

As shown in FIGS. 10 to 12, the first folding space inclined surface 221 and the second folding space inclined surface 321 protrude from the screen display surface of the flexible display apparatus 120 when the foldable body 110 is unfolded.

As shown in FIG. 15, since the height h2 is larger than the height h1 (h2>h1), it can be seen from that the protruding heights of the first folding space protruding circumferential surface 220 and the second folding space protruding circumferential surface 320 are lowered away from the folding axis 111. This can be confirmed by the T1 dimension larger than the T2 dimension (T1>T2) as shown in FIG. 12.

As shown in FIGS. 7 and 10, when the foldable body 110 is folded, foreign substances can be prevented from flowing into the folding space gap 140 due to close contact between the first folding space inclined surface 221 and the second folding space inclined surface 321. In addition, when an external force is applied from the first folding outer surface 116 or the second folding outer surface 117 of the foldable body 110 to the folding space gap 140, the external force can be dispersed by the first folding space inclined surface 221 and the second folding space inclined surface 321 which is in close contact, thereby obtaining an effect of suppressing breakage of the hinge portion.

As shown in FIG. 10, the first protective case 200 and the second protective case 300 applied to the first embodiment of the present invention do not interfere with cameras or sensors applied to the bezel portion, and the limitation of the application does not occur even if the width of the bezel is reduced.

Although the first protective case 200 and the second protective case 300 according to the first embodiment of the present invention are applied to the folding image display apparatus of FIG. 1, the outer circumferential surface 115 of the foldable body 110 cannot be protected from damage such as external shock including drop or stabbing.

In order to overcome this limitation, according to the first embodiment of the present invention, as shown in FIGS. 7, 9 and 10, an edge cover 400 selectively applied to and removed from the folding axis 111 by a user is applied.

The edge cover 400 has a tunnel-shaped circumferential surface that can cover the outer circumferential surface 115 not covered by the first protective case 200 and the second protective case 300 when the foldable body 110 is folded, and has a wall surface that can cover both ends of the folding axis 111 of the foldable body 110. The edge cover 400 is applied by a user in the folded state, and is automatically separated from the folding axis 111 when the folded state is changed.

Latching protrusions 420 are formed at both end portions of the folding axis 111 of the edge cover 400 such that the edge cover 400 applied in the folded state of the foldable body 110 is latched and held at the inner circumferential surface 112 without being separated from the folding axis 111.

As shown in FIGS. 11 and 12, the edge cover 400 is formed of a contractible material or has a foldable structure such that the edge cover 400 detached from the folding axis 111 can be minimized and maintained.

In order to prevent the edge cover 400 detached from the folding axis 111 from being lost, a loss preventing string connecting hole for connection with a loss preventing string 410 having one end thereof connected to the edge cover 400 is formed at one of the second protective case 300 or the protective case 300.

As shown in FIGS. 7, 8, 9, 12, 13, 14, 15, 16 and 24, the first protective case 200 or the second protective case 300 applied to the first embodiment of the present invention 300 has the characteristics described below.

A bezel latching protrusion 224 fixed around the edge portions of the first folding inner surface 113 and the second folding inner surface 114 is formed on the inner circumference of the protruding end portions of the first folding space inclined surface 221 and the second folding space inclined surface 321.

The first protective case 200 and the second protective case 300 press against the foldable body outer circumferential surface 118 of the foldable body 110 except a portion of the folding axis 111 using the shape of the bezel latching protrusion 224.

However, since the first protective case 200 and the second protective case 300 have a structure in which the folding axis 111 is opened, the end portion of the folding axis 111 of the first protective case 200 and the second protective case 300 may be separated from the foldable body outer circumferential surface 118. Accordingly, an adhesive may be considered to apply the first protective case 200 and the second protective case 300 to the foldable body 110.

When the adhesive is applied, the fixing limitation of the first protective case 200 and the second protective case 300 may be solved to some extent, but complete fixation is difficult. When the first protective case 200 or the second protective case 300 is replaced, there are limitations in that the adhesive needs to be removed and the adhesive application area of the foldable body 110 may be damaged when the adhesive is removed.

In order to overcome such a limitation, it is necessary to apply a fixation shape in which the first protective case 200 and the second protective case 300 are latched to the foldable body outer circumferential surface 118 or the folding outer surfaces 116 and 117 together with the bezel latching protrusion 224.

To this end, as shown in FIGS. 1 and 24, a protective case fixing through-hole 229 is formed at the end portion of the first folding space protruding circumferential surface 220 and the second folding space protruding circumferential surface 320 which are located at the side of the folding axis 111 such that the first protective case 200 and the second protective case 300 can be latched or screwed to the protective case fixture 190 formed on the foldable body outer circumferential surface 118 to fix the first protective case 200 and the second protective case 300.

A protective case fixing screw 900 to be screwed to the protective case fixture 190 of the foldable body 110 is applied to the protective case fixing through-hole 229.

It is also possible to consider a method in which the protective case fixing screw 900 and the protective case fixing through-hole 229 are combined into one shape and fixed to the protective case fixture 190 in a fitting manner instead of screw coupling. This is the same concept as the protective case fixing through-hole 229.

A connection opening 225 formed to be penetrated or opened for connection to an external device of the foldable image display apparatus, a button opening 226 formed to be penetrated or opened for the physical button operation of the foldable image display apparatus or a touch pen outlet 227 for storing the touch pen is formed on the first folding space protruding circumferential surface 220 or the second folding space protruding circumferential surface 320.

As shown in FIG. 24, at least one cradle latching fixture 228 is formed on the first folding space protruding circumferential surface 220 or the second folding space protruding circumferential surface 320 such that the foldable image display apparatus to which the first protective case 200 and the second protective case 300 are applied can be selectively fixed to or released from a latching portion of a cradle having the folding and unfolding function of the foldable body 110.

As shown in FIG. 7, in the folded state in which the first protective case 200, the second protective case 300, and the edge cover 400 which are components of the first embodiment of the present invention are applied to the foldable body 110, it is difficult for the cradle having the folding and unfolding function of the first protective case 110 to separately receive the first protective case 200 and the second protective case 300.

For this, when a user mounts the foldable image display apparatus on the cradle having the folding and unfolding function of the foldable body 110 in a folded state, a reference shape for a user to separate and mount the first protective case 200 and the second protective case 300 is required. To this end, at least one cradle latching fixture 228 is formed on the first folding space protruding circumferential surface 220 and the second folding space protruding circumferential surface 320.

Although not shown in the drawings of the first embodiment of the present invention, an edge bumper protruding from the circumferential wall surface may be formed at the edges of the circumferential wall surface of the first folding space protruding circumferential surface 220 or the second folding space protruding circumferential surface 320 to absorb a drop impact.

Also, although not shown in the drawings of the first embodiment of the present invention, a finger latching shape may be formed in order to prevent finger slip during a user's unfolding operation. The finger latching shape may be formed on the parallel circumferential wall surfaces of the first folding space protruding circumferential surface 220 or a second folding space protruding circumferential surface 220 located at the opposite side of the folding axis 111.

As shown in FIG. 1, for convenience of a user, an outer display 130 may be provided on any one of the folding outer surfaces 116 and 117 separately from the flexible display apparatus 120 applied to the folding inner surfaces 113 and 114.

As shown in FIGS. 7, 8, 9, 12, 13, and 14, a display through window or a transmission window 240 for transmitting the screen display surface of the outer display 130 applied to one of the first display surface 116 and the second folding outer surface 117 is formed on one of the first fixing surface of the first protective case 200 or the second fixing surface of the second protective case 300.

When the display through window or the transmission window 240 forms a transmitting shape, a separate protective film for protecting the screen display surface may be applied to the display through window or the transmission window 240. When the first protective case 200 or the second protective case 300 is formed of transparent material, it is possible to view the screen display surface using the transparent characteristic without the transmitting shape.

As shown in FIGS. 13 and 15, the first through-hole 250 for exposing a proximity sensor, a front camera, a home button, a microphone or a talking speaker applied to one of the first folding outer surface 116 or the second folding outer surface 117 and a rear camera exposure hole 252 for exposing a rear camera 180 applied to one of the first folding outer surface 116 or the second folding outer surface 117 are formed on one of the first fixing surface 210 and the second fixing surface 310.

As shown in FIGS. 7, 8, 9, 15 and 16, a card storage space 260 which has one side thereof opened toward the first folding outer surface 116 or the second folding outer surface 117 to store a plate type of a card 800 is formed inside the first fixing surface 210 of the first protective case 200 or the second fixing surface 310 of the second protective case 300. Also, a recess shape in which a portion of the first fixing surface 210 or the second fixing surface 310 has an outlet, or a card outlet shape 261 for application of a card discharge tray is formed.

The first protective case 200 or the second protective case 300 applied to the first embodiment of the present invention shown in FIGS. 7, 8, 9, 12, 13, 14, 15, 16, and 24 has been described as above.

FIG. 18 shows a second embodiment of the present invention in which the first protective case 200 and the second protective case 300 are applied to the infolding image display apparatus of FIG. 1.

As shown in FIG. 18, a protective case for a foldable image display apparatus according to a second embodiment of the present invention includes a first protective case 200 having a first fixing surface 210 supported while surrounding a first folding outer surface 113 at a certain distance away from a folding axis 111 of a foldable body 110 and a first folding space protruding circumferential surface 220 having a first folding space inclined surface 221 protruding from the first fixing surface 210 to a folding space gap 140 deviating from a first folding inner surface 113 while a screen display surface of a flexible display apparatus 120 is maintained in an exposed state while surrounding a foldable body outer circumferential surface 118 except the folding axis 111 of the foldable body 110 and a second protective case 300 having a second fixing surface 310 supported while surrounding a second folding outer surface 117 at a certain distance away from the folding axis 111 and a second folding space protruding circumferential surface 320 having a second folding space inclined surface 321 protruding from the second fixing surface 310 to the folding space gap 140 deviating from a second folding inner surface 114 while the screen display surface of the flexible display apparatus 120 is maintained in an exposed state while surrounding the foldable body outer circumferential surface 118 except the folding axis 111 of the foldable body 110.

The first protective case 200 and the second protective case 300 separated from each other based on the folding axis 111 are connected by a connection plate 500 covering the outer circumferential surface 115 of the foldable body 110, and the connection plate 500 is formed of a material which is foldable and flexible.

As shown in FIG. 19, the first protective case 200 and the second protective case 300 of the second embodiment have the same features as the first protective case 200 and the second protective case 300 mentioned in the first embodiment and a separate description thereof will be omitted.

FIG. 20 shows a third embodiment of the present invention in which the first protective case 200 and the second protective case 300 are applied to the infolding image display apparatus of FIG. 1.

As shown in FIG. 20, a protective case for a foldable image display apparatus according to a third embodiment of the present invention includes a first protective case 200 having a first fixing surface 210 supported while surrounding a first folding outer surface 113 at a certain distance away from a folding axis 111 of a foldable body 110 and a first folding space protruding circumferential surface 220 having a first folding space inclined surface 221 protruding from the first fixing surface 210 to a folding space gap 140 deviating from a first folding inner surface 113 while a screen display surface of a flexible display apparatus 120 is maintained in an exposed state while surrounding a foldable body outer circumferential surface 118 except the folding axis 111 of the foldable body 110 and a second protective case 300 having a second fixing surface 310 supported while surrounding a second folding outer surface 117 at a certain distance away from the folding axis 111 and a second folding space protruding circumferential surface 320 having a second folding space inclined surface 321 protruding from the second fixing surface 310 to the folding space gap 140 deviating from a second folding inner surface 114 while the screen display surface of the flexible display apparatus 120 is maintained in an exposed state while surrounding the foldable body outer circumferential surface 118 except the folding axis 111 of the foldable body 110.

As shown in FIG. 20, backward bending prevention shapes 222 and 322 are formed at the end of the first folding space protruding circumferential surface 220 of the first protective case 200 or the second folding space protruding circumferential surface 320 of the second protective case 300 located at the side of the folding axis 111, and extend from the folding axis 111 toward the inner circumferential surface 112 to cover the semicircular circumferential surface of the foldable body 110 by less than half of the thickness of the foldable body 110, and backward bending prevention vertical surfaces 223 and 323 are formed at end portions of the inner circumferential surface 112 of the backward bending prevention shapes 222 and 322 to face and make contact with each other by locating an end portion of the vertical surface at the folding axis 111 when the foldable body 110 is unfolded.

When the first protective case 200 in which the backward bending prevention shape 222 is formed and the second protective case 300 in which the backward bending prevention shape 322 is formed are applied to the foldable body 110 as shown in FIG. 20, the first folding outer surface 116, all of the second folding outer surface 117 and the outer circumferential surface 115 changed into the unfolded state can be covered without the connection plate 500 applied to the second embodiment when the foldable body 110 is unfolded.

When the foldable body is unfolded 110, the backward bending prevention surface 223 of the first protective case 200 and the backward bending prevention vertical surface 323 of the second protective case 300 are located at the side of the folding axis 111, and make contact with and support each other. Accordingly, although a user confuses the folding direction and applies a rotation force in a backward direction, the foldable body 110 is not rotated in the reverse direction.

Thus, it possible to fundamentally protect the hinge structure which may be damaged in the reverse rotation.

As shown in FIG. 20, the first protective case 200 and the second protective case 300 of the third embodiment have the same features as the first protective case 200 and the second protective case 300 mentioned in the first embodiment and a separate description thereof will be omitted.

As shown in FIGS. 7 to 20, in the first to third embodiments, the first protective case 200 and the second protective case 300 in which the first folding space protruding circumferential surface 220 and the second folding space protruding circumferential surface 320 surrounding The foldable body outer circumferential surface 118 are applied to the foldable body 110, and when the foldable body 110 is folded, a method for supporting an external force of the folding space gap 140 located at the screen of the display apparatus 120 is not considered.

A folding space insert disclosed in the accessory of foldable image display apparatus (Korean Patent Application. No. 10-2018-0139604) filed by the present applicant is applied by a user to a folding space gap 140 formed at a display screen of a flexible display apparatus 120 in the folded state of the foldable body 110, thereby occupying a part of the folding space gap 140 and supporting an external force, and is disposed to be moved out of the screen display surface by a user when the foldable body 110 is unfolded.

Such a folding space insert does not protect the outer circumferential surface 115 formed in the folded state of the foldable body 110, and cannot also protect the foldable body outer circumferential surface 118 having elastic material characteristics.

Proposed is a fourth embodiment in which when the foldable body 110 is folded, the outer circumferential surface 115 of the foldable body 110 and the foldable body outer circumferential surface 118 having elastic material characteristics are protected and a load supporting capability of the folding space gap 140 formed at the side of the screen display surface of the flexible display apparatus 120 can be obtained.

As shown in FIGS. 21 to 23, a protective case for a foldable image display apparatus according to a fourth embodiment of the present invention includes a first protective case 200 having a first fixing surface 210 supported while surrounding a first folding outer surface 113 at a certain distance away from a folding axis 111 of a foldable body 110 and a first folding space protruding circumferential surface 220 having a first folding space inclined surface 221 protruding from the first fixing surface 210 to a folding space gap 140 deviating from a first folding inner surface 113 while a screen display surface of a flexible display apparatus 120 is maintained in an exposed state while surrounding a foldable body outer circumferential surface 118 except the folding axis 111 of the foldable body 110 and a second protective case 300 having a second fixing surface 310 supported while surrounding a second folding outer surface 117 at a certain distance away from the folding axis 111 and a second folding space protruding circumferential surface 320 having a second folding space inclined surface 321 protruding from the second fixing surface 310 to the folding space gap 140 deviating from a second folding inner surface 114 while the screen display surface of the flexible display apparatus 120 is maintained in an exposed state while surrounding the foldable body outer circumferential surface 118 except the folding axis 111 of the foldable body 110.

A folding space insert 600 is formed to have one end thereof connected and fixed to the circumferential wall surface of the first folding space protruding circumferential surface 220 or the second folding space protruding circumferential surface 320 by a folding space insertion fixture 620 and the opposite free end thereof located in the folding space gap 140 by a user when the foldable body 110 is folded, one surface thereof being supported by the screen display surface of the flexible display apparatus 120 that is a first folding inner surface and the screen display surface of the flexible display apparatus 120 that is a second folding inner surface which form the folding space gap 140, and is unfolded and maintained in a state where one surface thereof is supported by the screen display surface of the flexible display apparatus 120 or is moved out of the screen display surface by a user when the foldable body 110 is unfolded.

The folding space insert 600 has an insert contact surface 610 that is a contact surface which reflects the inclination of a first folding inner surface 113 and a second folding inner surface 114 so as to make close contact with the first folding inner surface 113 and the second folding inner surface 114 forming the folding space gap 140.

The free end portion of the folding space insert 600 may have any one of embellishment shapes (hearts, clovers, cloud, animals, and symbols), character shapes (figures, flags, firm names, and creations) or perforated shapes (center or part).

The insert contact surface 610 is covered with a cloth or a microfiber material so as to remove the fingerprint and touch residue remaining on the folding inner surfaces 113 and 114 forming the folding space gap 140.

Figure 25:
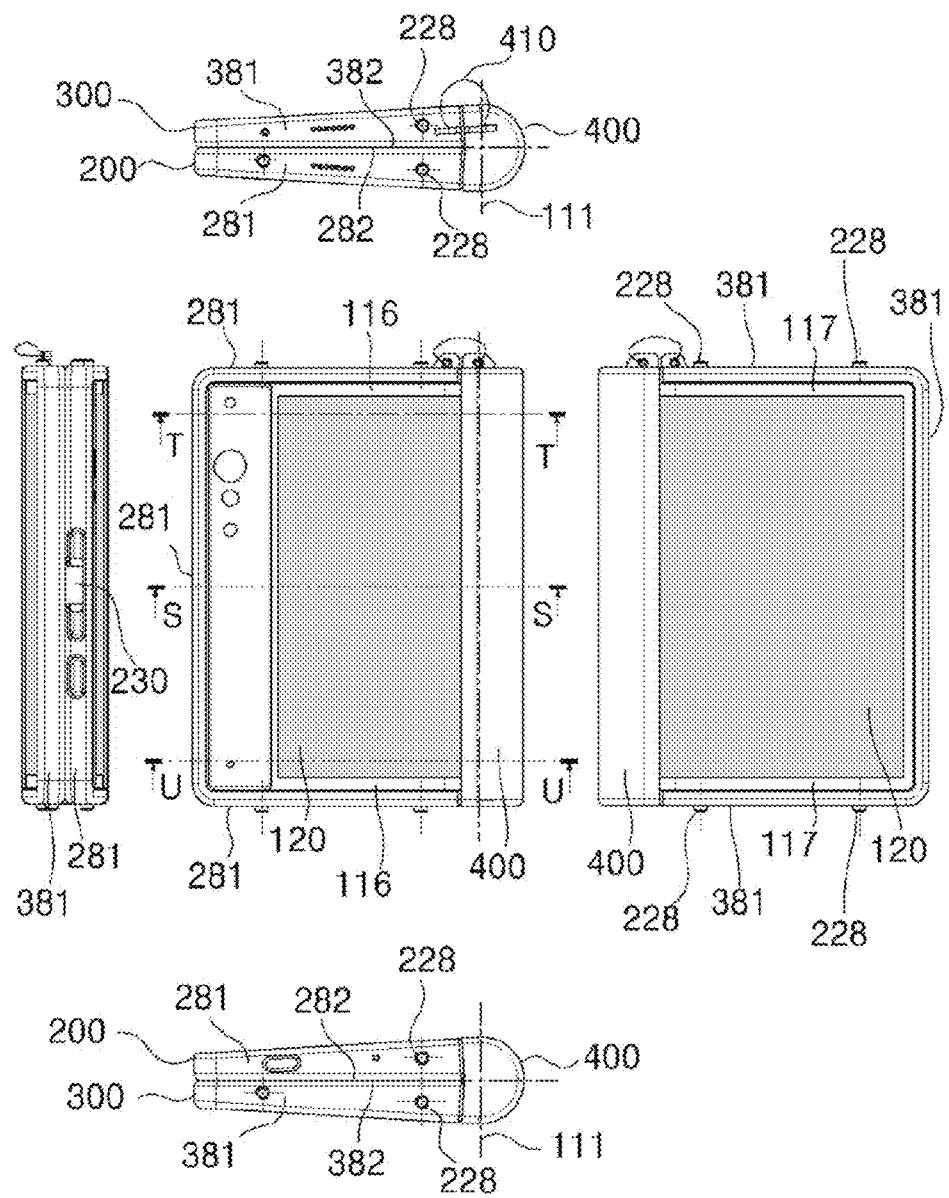
FIG. 25 is a view illustrating a first protective case, a second protective case and an edge cover applied to the image display apparatus of FIG. 3 according to an embodiment of the present invention.
Figure 26:
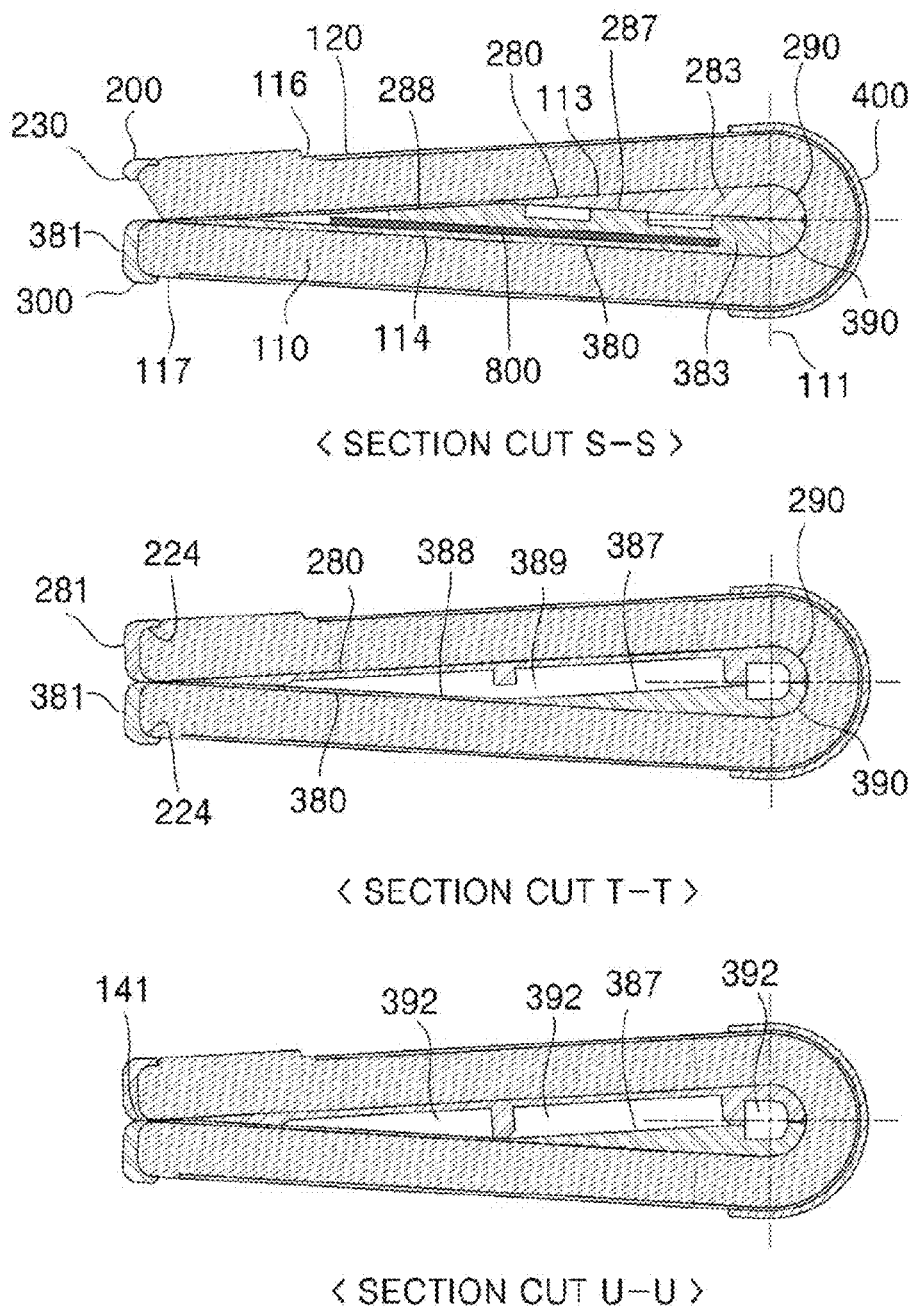
FIG. 26 is a cross-sectional taken along lines S-S, t-T and U-U of FIG. 25.
Figure 27:
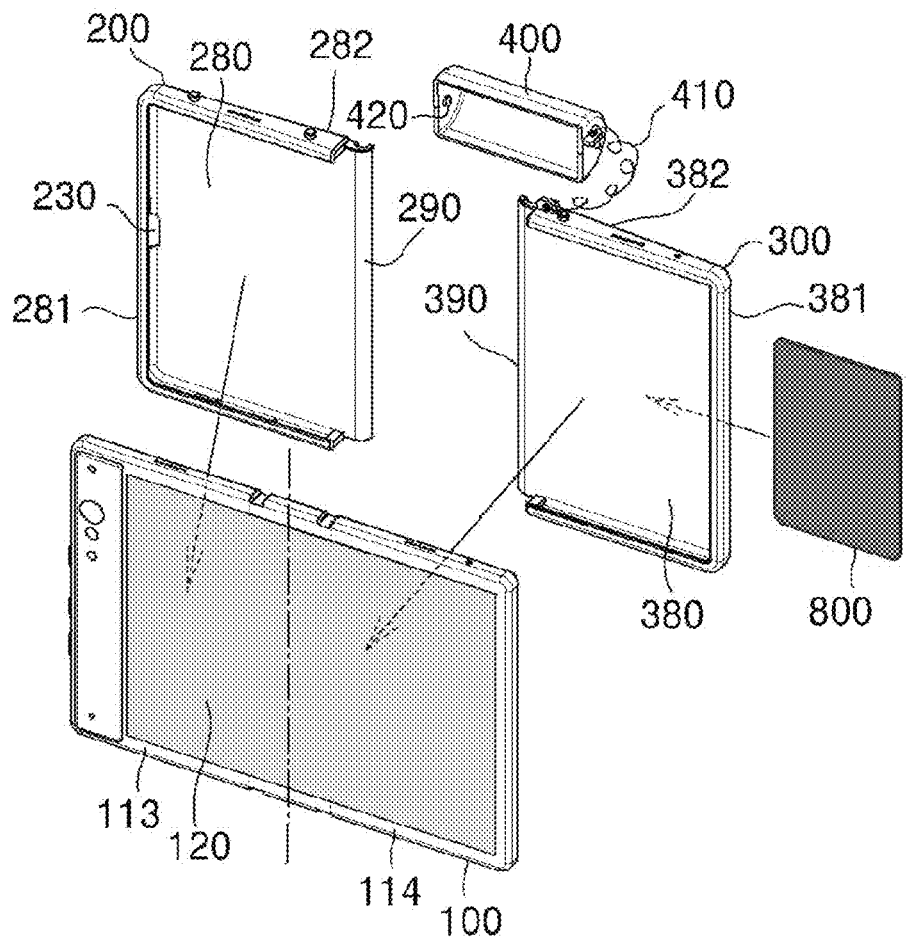
FIG. 27 is an exploded perspective view of FIG. 26.
Figure 28:
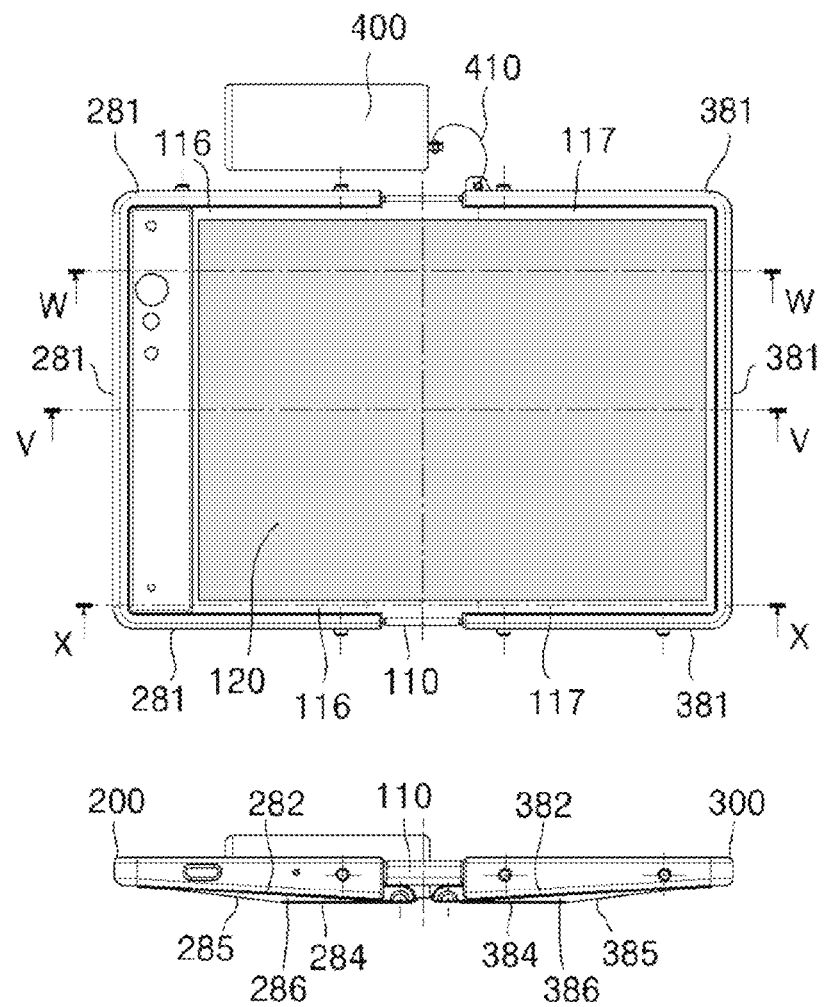
FIG. 28 are a plan view and a front view illustrating a fully flat unfolded state of FIG. 25.
Figure 29:
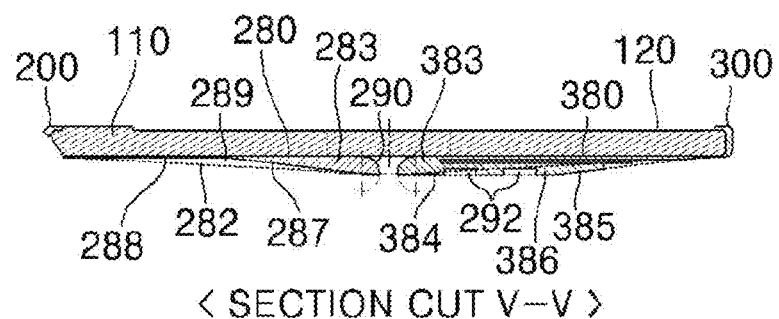
FIG. 29 is a cross-sectional view taken along lines V-V, W-W and X-X of FIG. 28.
Figure 29:
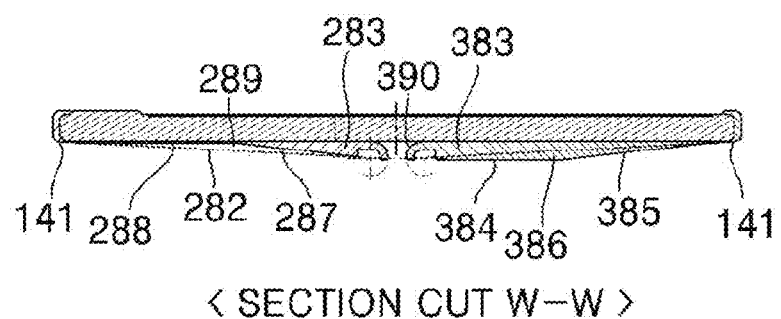
Figure 29:
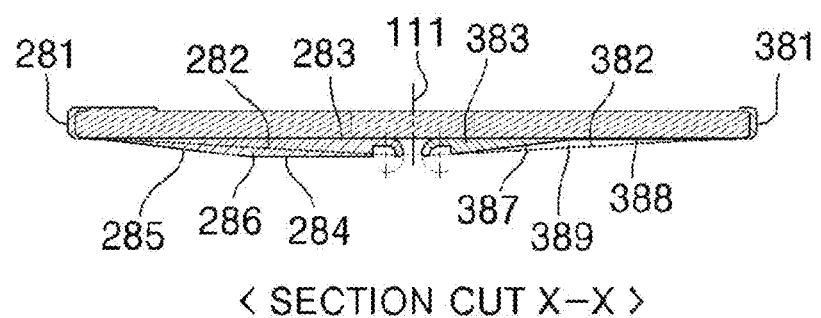
Figure 30:
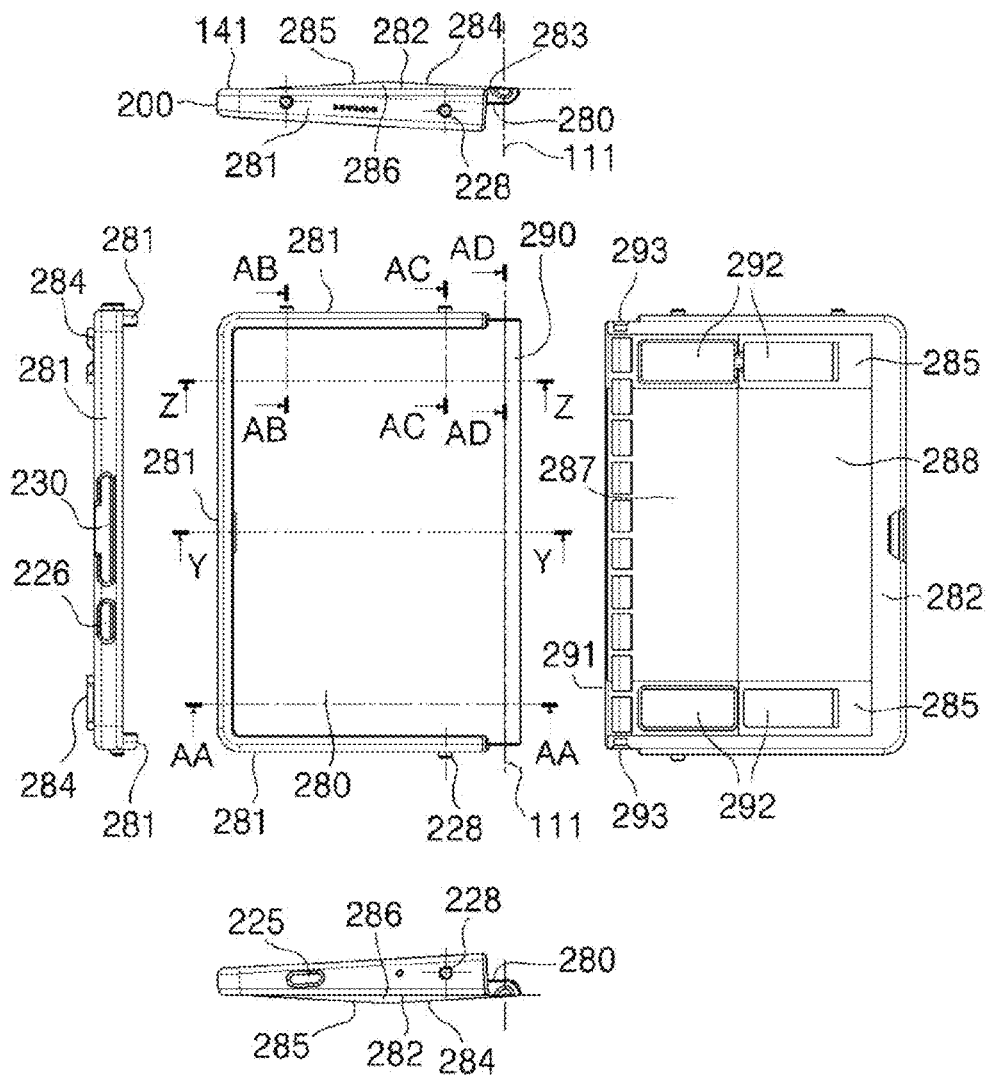
FIG. 30 are a front view, a plan view, a left side view, a bottom view, and a rear view of the first protective case of FIG. 25.
Figure 31:
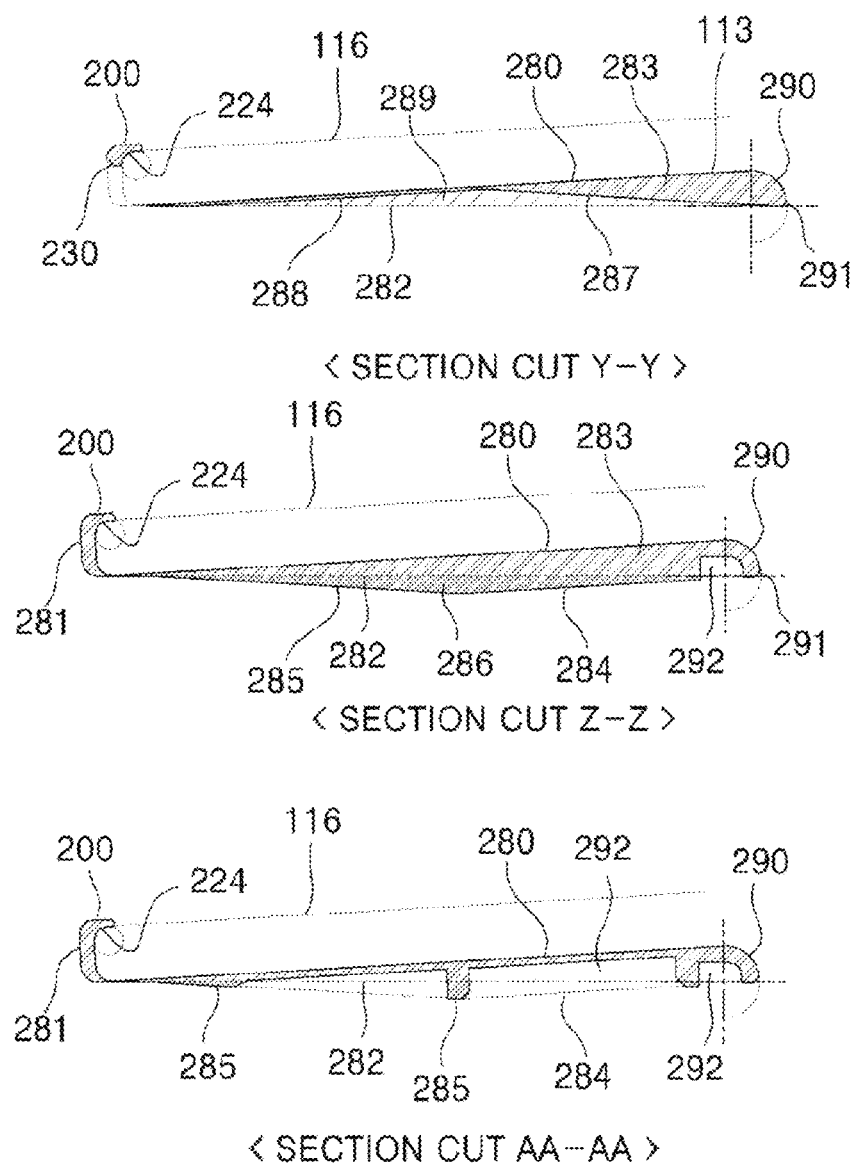
FIG. 31 is a cross-sectional view taken along lines Y-Y, Z-Z and AA-AA of FIG. 30.
Figure 32:
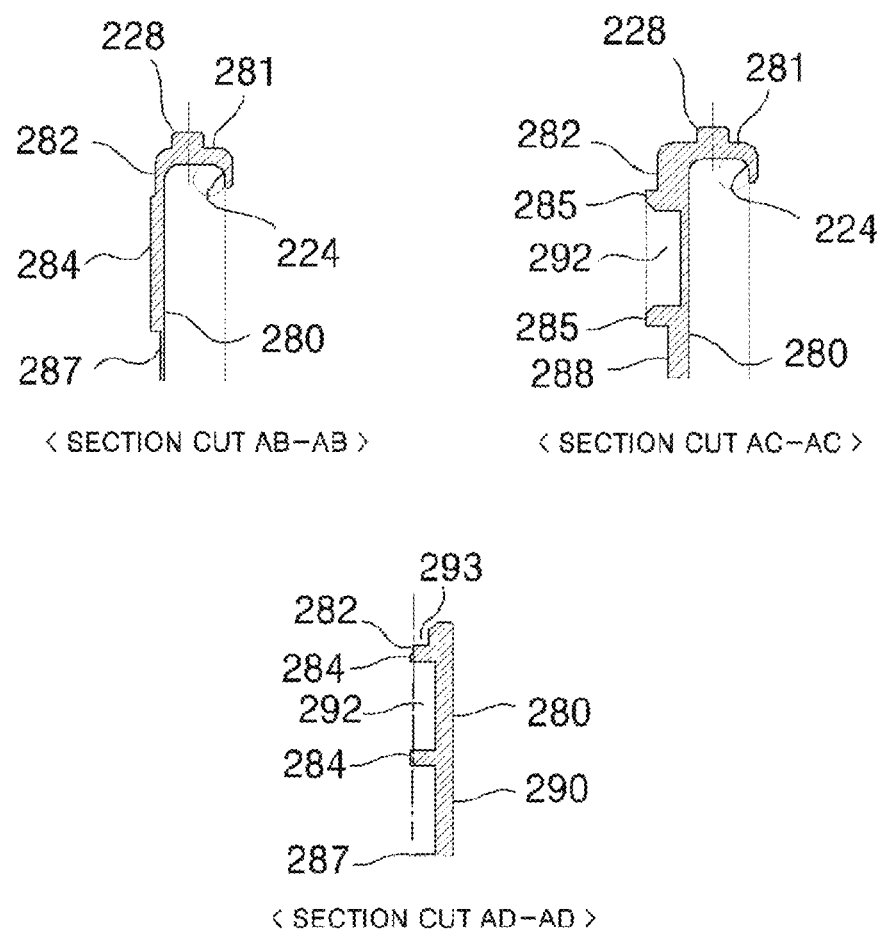
FIG. 32 is a cross-sectional view taken along lines AB-AB, AC-AC and AD-AD of FIG. 30.
Figure 33:
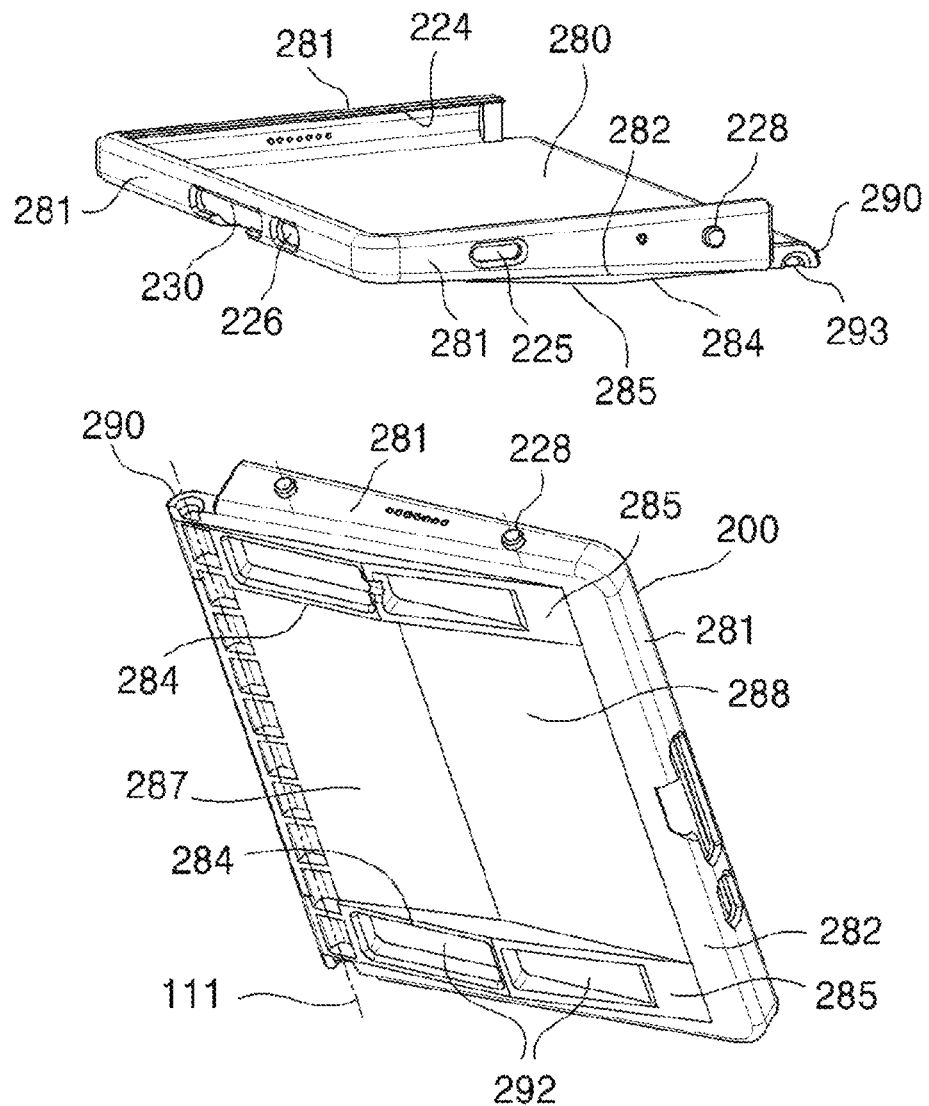
FIG. 33 is a perspective view illustrating the first protective case of FIG. 25.
Figure 34:
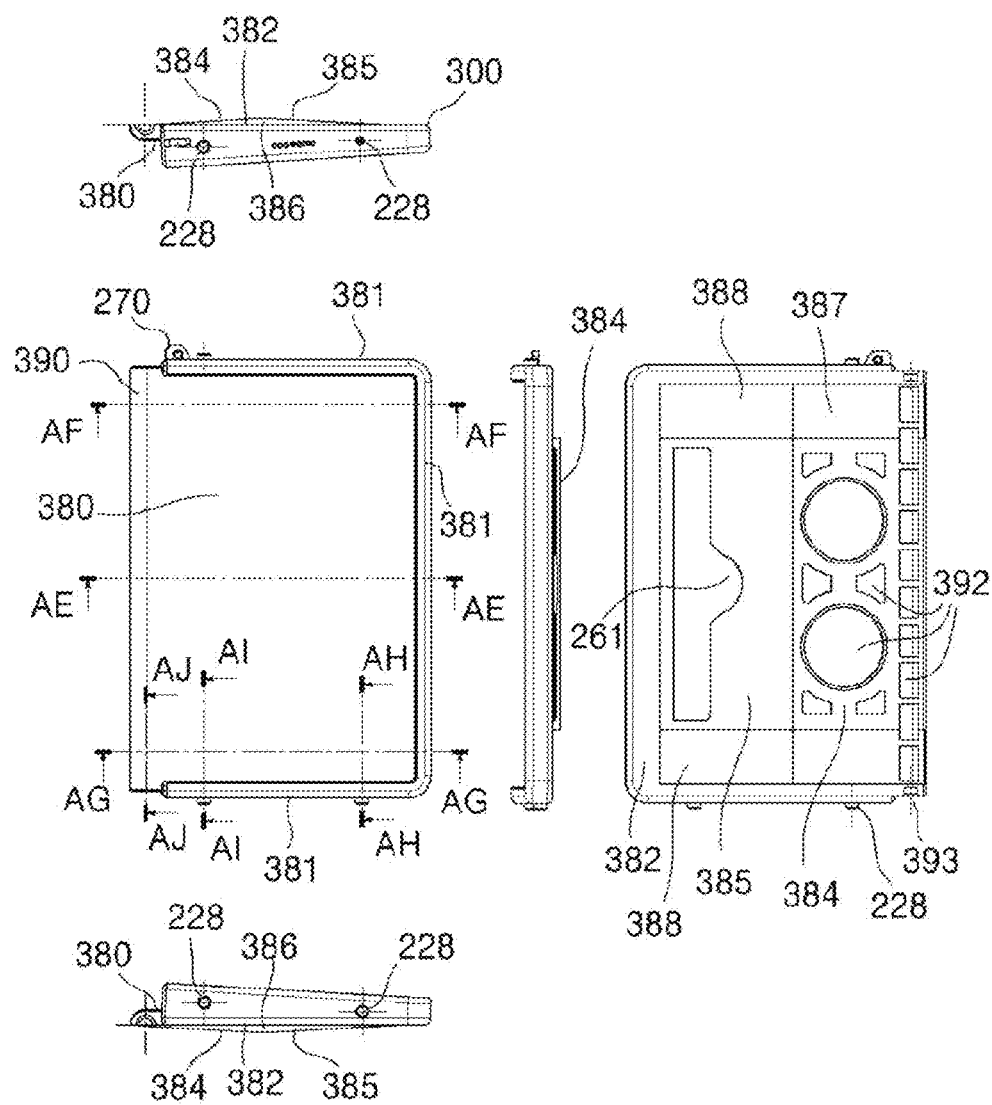
FIG. 34 are a front view, a plan view, a right side view, a bottom view and a rear view of the second protective case of FIG. 25.
Figure 35:
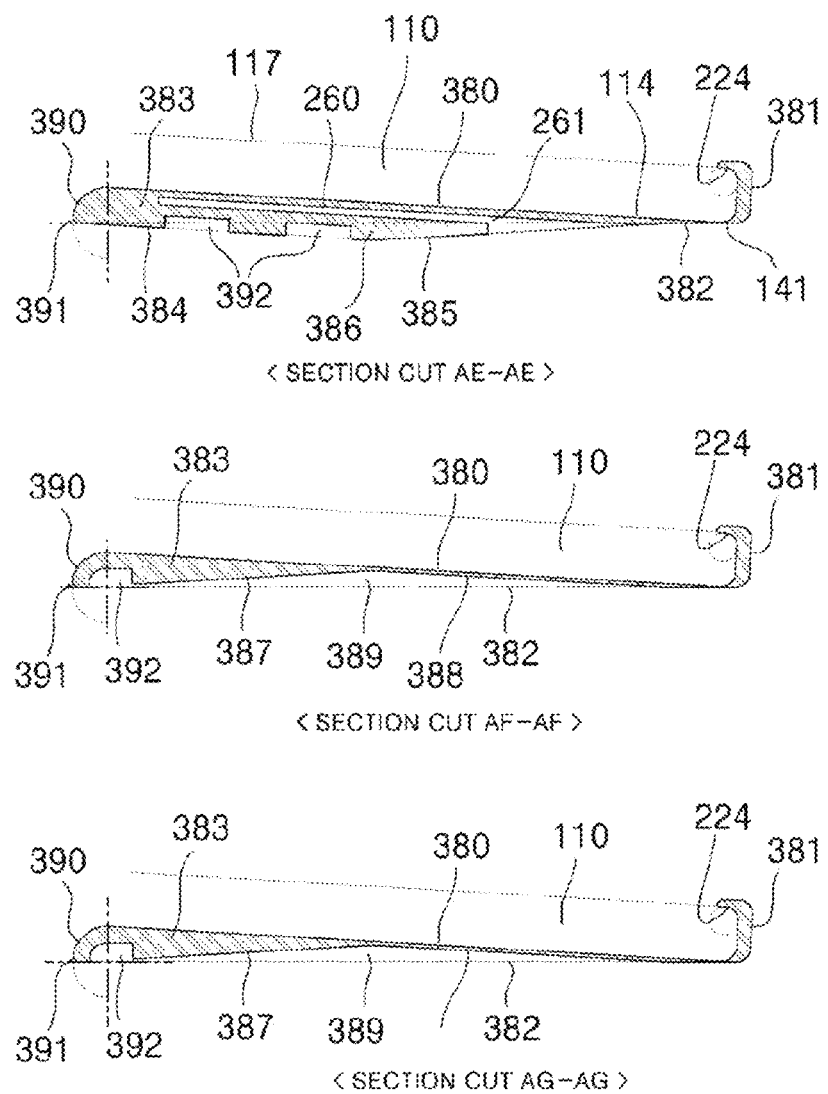
FIG. 35 is a cross-sectional view taken along lines AE-AE, AF-AF and AG-AG of FIG. 34.
Figure 36:
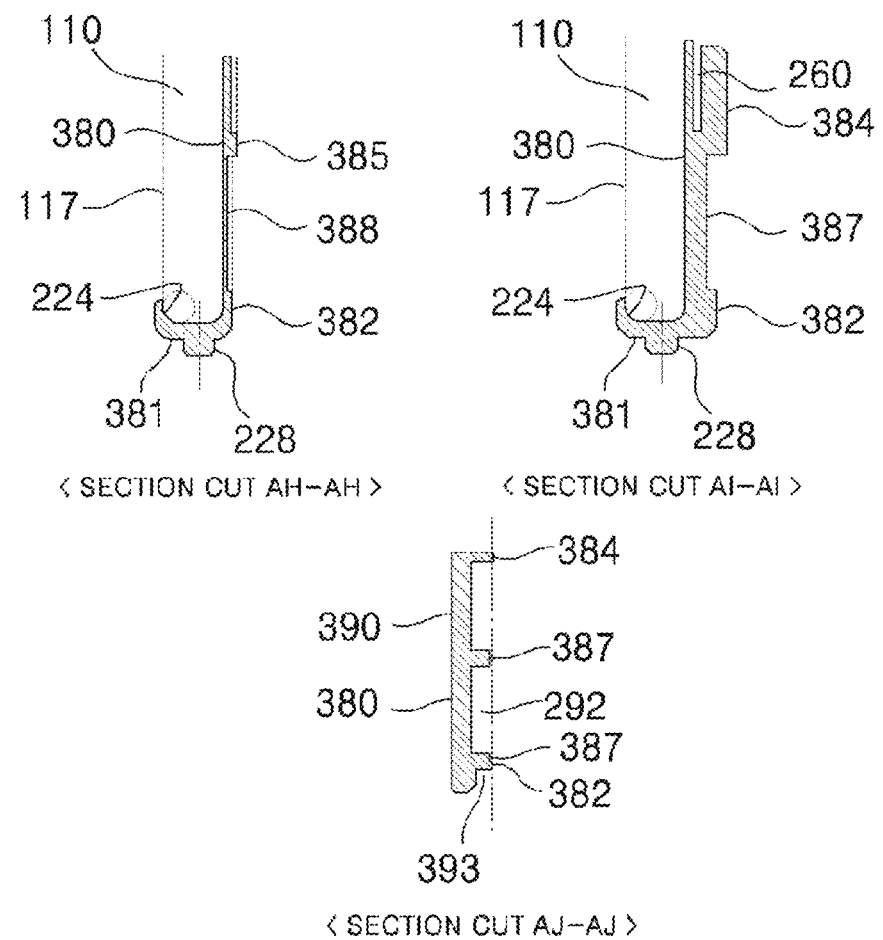
FIG. 36 is a cross-sectional view taken along lines AH-AH, AI-AI and AJ-AJ of FIG. 34.
Figure 37:
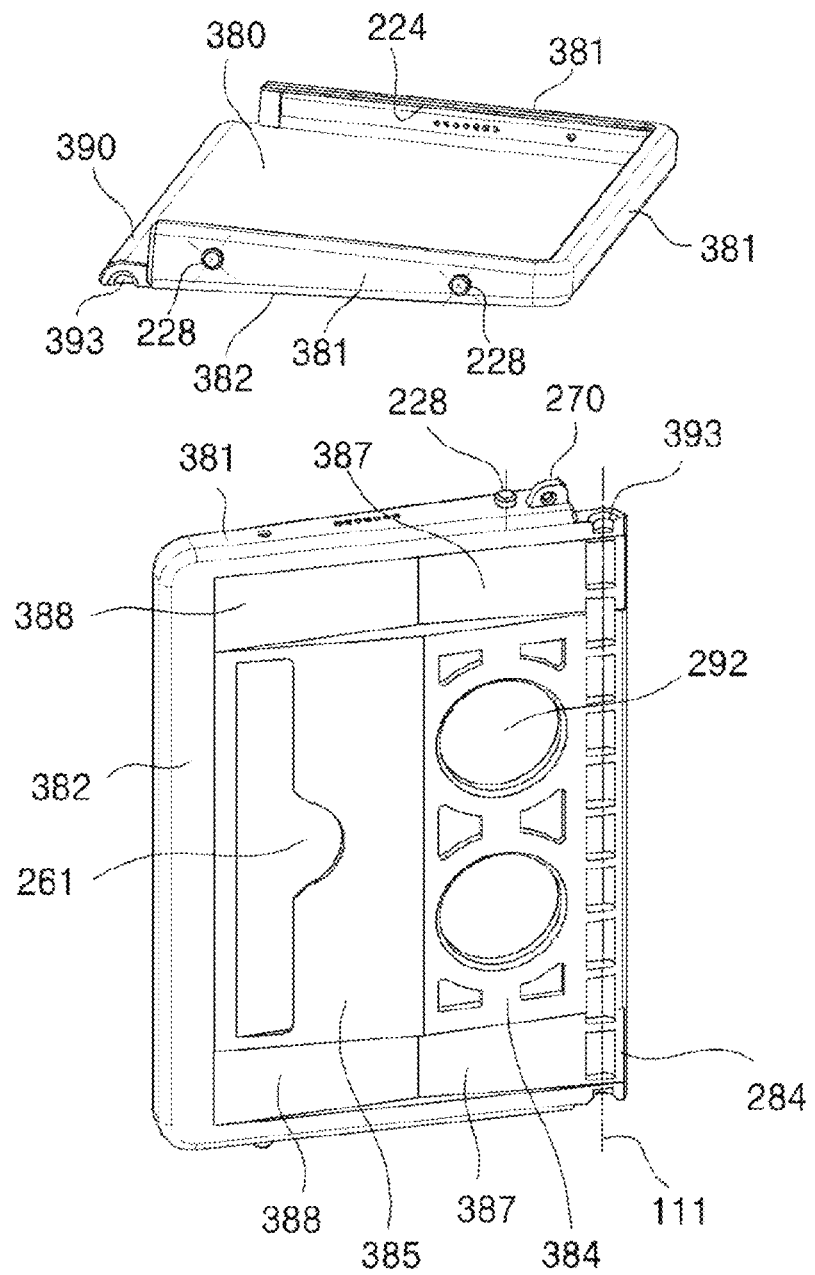
FIG. 37 is a perspective view illustrating the second protective case of FIG. 34.
Figure 38:
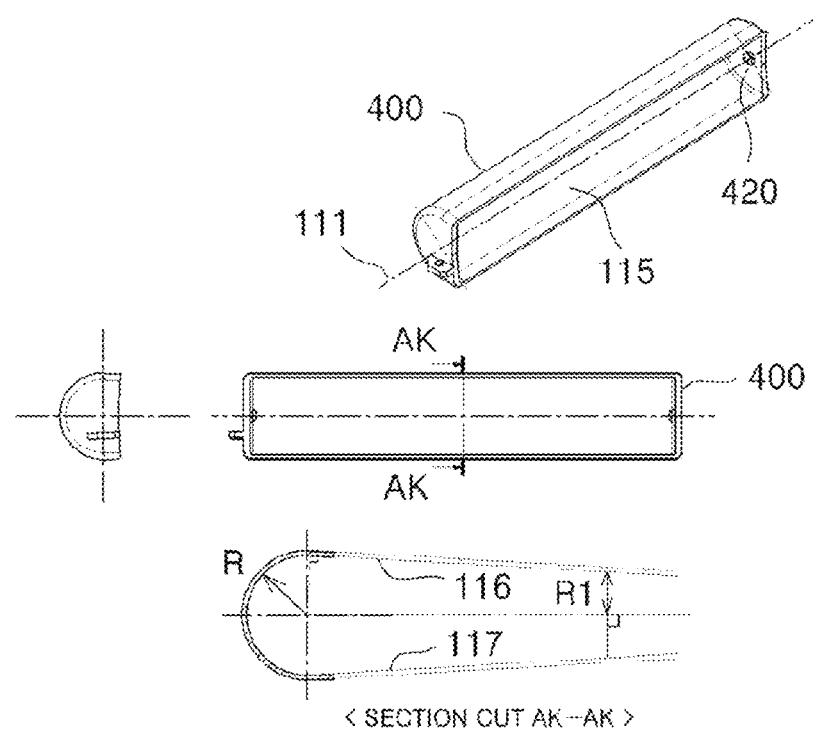
FIG. 38 are a conceptual view illustrating the edge cover of FIG. 25 and a cross-sectional view taken along line AK-AK.
Figure 39:
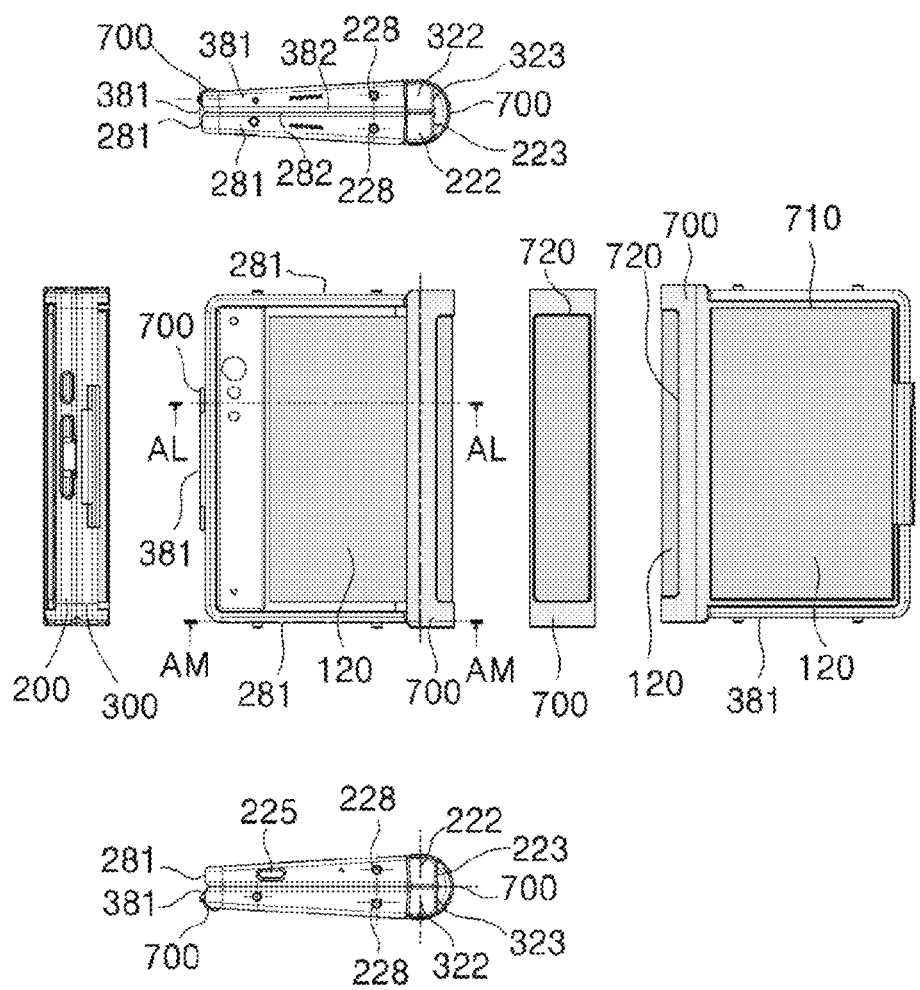
FIG. 39 a view illustrating a first protective case, a second protective case and a rotating cover applied to the image display apparatus of FIG. 3 according to an embodiment of the present invention.
Figure 40:
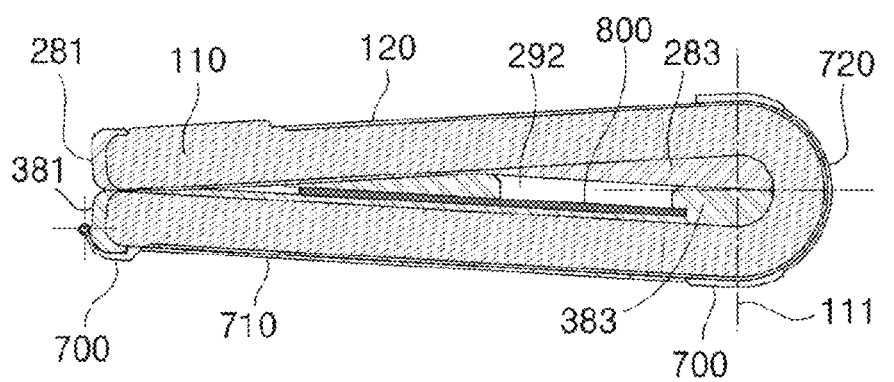
FIG. 40 is a cross-sectional view taken along lines AL-AL and AM-AM of FIG. 39.
Figure 40:
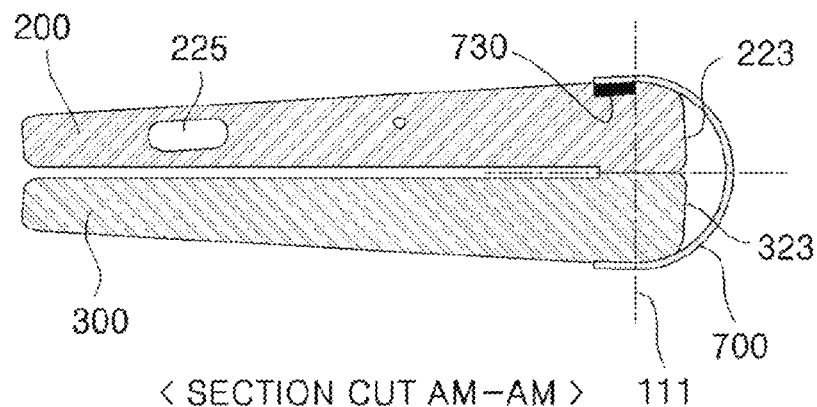
Figure 41:
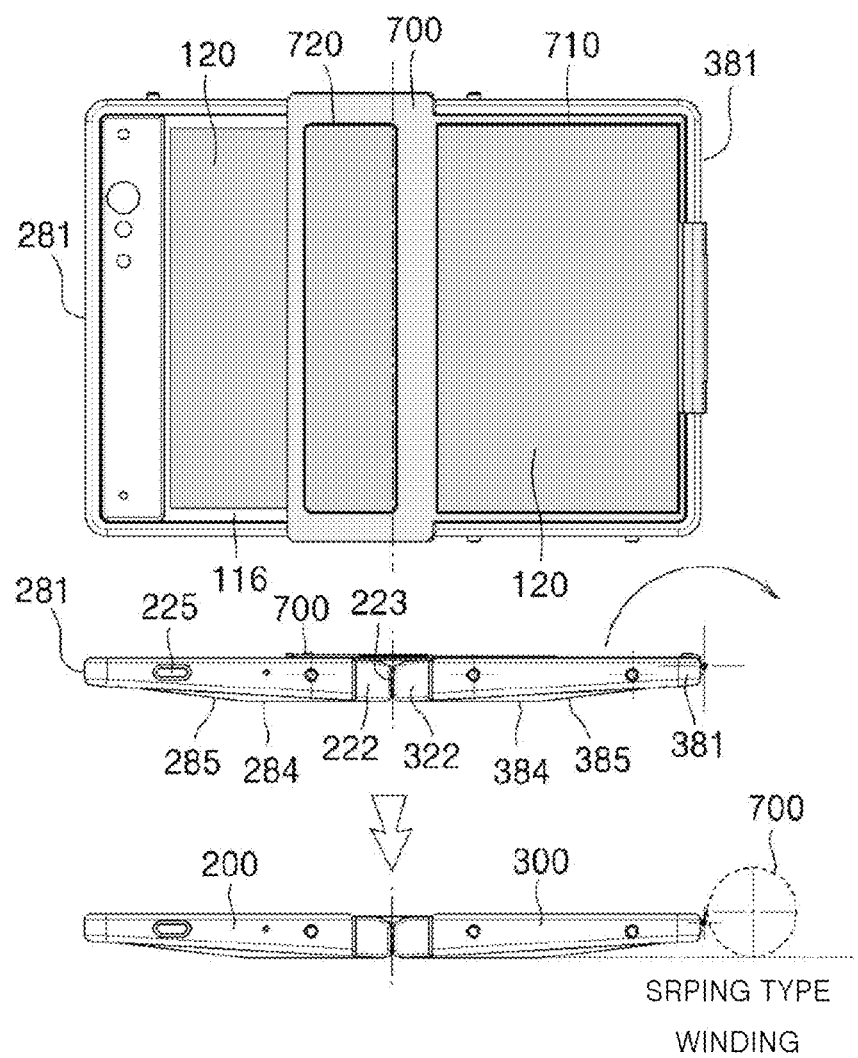
FIG. 41 is a conceptual view illustrating an arrangement state on the screen display surface of the rotating cover in an unfolded state of FIG. 39 and an arrangement state after rotation.
Figure 42:
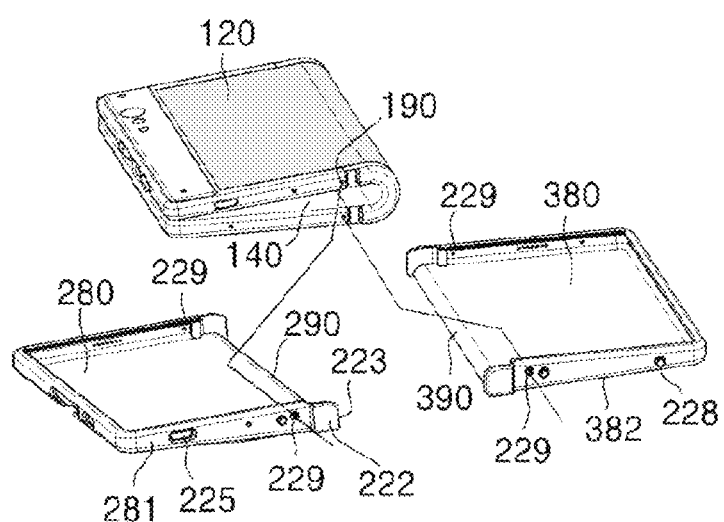
FIG. 42 is a conceptual view in which a first protective case and a second protective case, to which a cradle latching fixture and a protective case fixing through-hole are reflected, are fixed to an outfolding image display apparatus.
Figure 43:
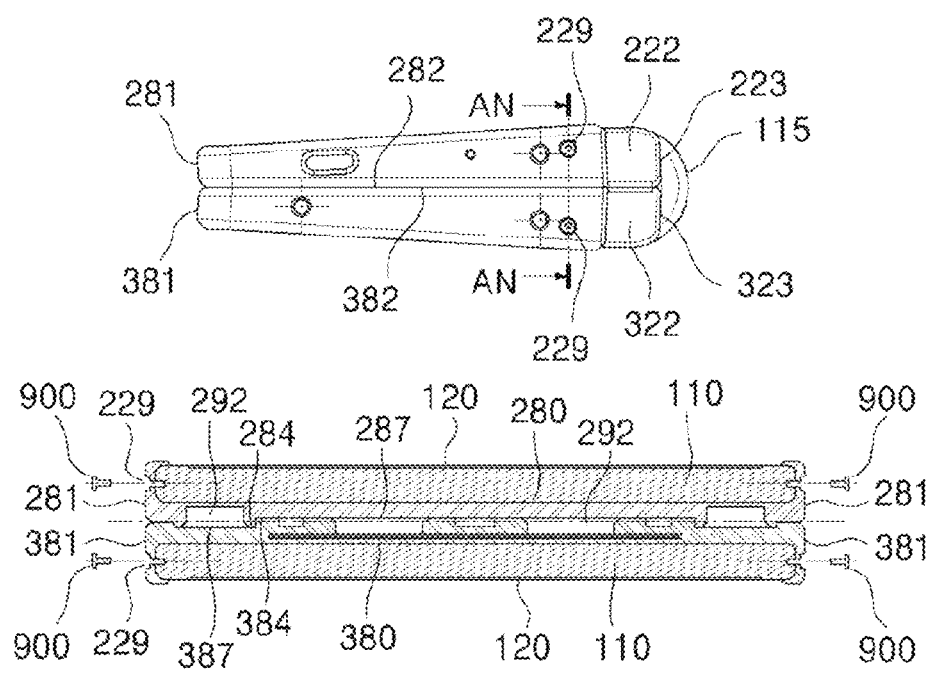
FIG. 43 are a rear view illustrating a folded state with respect to the application state of FIG. 42 and a cross-sectional view taken along line AN-AN.

FIG. 25 is a view illustrating a first protective case, a second protective case and an edge cover applied to the image display apparatus of FIG. 3 according to an embodiment of the present invention. FIG. 26 is a cross-sectional taken along lines S-S, t-T and U-U of FIG. 25. FIG. 27 is an exploded perspective view of FIG. 26. FIG. 28 are a plan view and a front view illustrating a fully flat unfolded state of FIG. 25. FIG. 29 is a cross-sectional view taken along lines V-V, W-W and X-X of FIG. 28. FIG. 30 are a front view, a plan view, a left side view, a bottom view, and a rear view of the first protective case of FIG. 25. FIG. 31 is a cross-sectional view taken along lines Y-Y, Z-Z and AA-AA of FIG. 30. FIG. 32 is a cross-sectional view taken along lines AB-AB, AC-AC and AD-AD of FIG. 30. FIG. 33 is a perspective view illustrating the first protective case of FIG. 25. FIG. 34 are a front view, a plan view, a right side view, a bottom view and a rear view of the second protective case of FIG. 25. FIG. 35 is a cross-sectional view taken along lines AE-AE, AF-AF and AG-AG of FIG. 34. FIG. 36 is a cross-sectional view taken along lines AH-AH, AI-AI and AJ-AJ of FIG. 34. FIG. 37 is a perspective view illustrating the second protective case of FIG. 34. FIG. 38 are a conceptual view illustrating the edge cover of FIG. 25 and a cross-sectional view taken along line AK-AK. FIG. 39 a view illustrating a first protective case, a second protective case and a rotating cover applied to the image display apparatus of FIG. 3 according to an embodiment of the present invention. FIG. 40 is a cross-sectional view taken along lines AL-AL and AM-AM of FIG. 39. FIG. 41 is a conceptual view illustrating an arrangement state on the screen display surface of the rotating cover in an unfolded state of FIG. 39 and an arrangement state after rotation. FIG. 42 is a conceptual view in which a first protective case and a second protective case, to which a cradle latching fixture and a protective case fixing through-hole are reflected, are fixed to an outfolding image display apparatus. FIG. 43 are a rear view illustrating a folded state with respect to the application state of FIG. 42 and a cross-sectional view taken along line AN-AN.

FIG. 25 to FIG. 43 show that the protective case of the present invention is applied to the outfolding image display apparatus of FIG. 3.

As shown in FIGS. 25 to 29, a protective case for a foldable image display apparatus according to a fifth embodiment of the present invention includes a first protective case 200 having a third fixing surface 280 supported while surrounding a first folding inner surface 113 at a certain distance away from a folding axis 111 of a foldable body 110, a first protective case circumferential wall surface 281 surrounding a foldable body outer circumferential surface 118 of the foldable body 110 except the folding axis 111 along an edge line of a first folding outer surface 116 and the third fixing surface 280 while a screen display surface of a flexible display apparatus 120 is maintained in an exposed state, and a first folding space protrusion 283 formed with a third folding space inclined surface 282 protruding from the third fixing surface 280 to a folding space gap 140 deviating from the first folding inner surface 113, and a second protective case 300 having a fourth fixing surface 380 supported while surrounding a second folding inner surface 114 at a certain distance away from the folding axis 111 of the foldable body 110, a second protective case circumferential wall surface 381 surrounding the foldable body outer circumferential surface 118 of the foldable body 110 except the folding axis 111 along an edge line of a second folding outer surface 117 and the fourth fixing surface 380 while the screen display surface of the flexible display apparatus 120 is maintained in an exposed state, and a second folding space protrusion 383 formed with a fourth folding space inclined surface 382 protruding from the fourth fixing surface 380 to the folding space gap 140 deviating from the second folding inner surface 114.

Unlike a related-art protective case for a plate type smart phone, which has a closed circumferential shape of a continuous rectangular shape without a break, as shown in FIGS. 25, 27, 28, 30, 33, 34 and 37, the first protective case 200 and the second protective case 300 according to the fifth embodiment are configured such that the first protective case 200 and the second protective case 300 are separated from each other at the folding axis 111 required to change in length when the foldable body 110 is folded and unfolded. Due to this separation result, a first protective case circumferential wall surface 281 and a second protective case circumferential wall surface 381 surrounding the foldable body outer circumferential surface 118 are not formed around the folding axis 111 of the first protective case 200 and the second protective case 300, and the foldable body outer circumferential surface 118 is opened at the folding axis 111.

As shown in FIGS. 25, 26, 29, 31 and 35, the protruding height of the first folding space protrusion 283 and the second folding space protrusion 383 is lowered away from the folding axis 111 of the foldable body 110. The first folding space protrusion 283 and the second folding space protrusion 383 in the folded state make contact with a third folding space inclined surface 282 and a fourth folding space inclined surface 382, thereby partially or entirely occupying the space gap 140 along the folding axis 111 and closing the space gap 140, and the third folding space inclined surface 282 and the fourth folding space inclined surface 382 are maintained in downwardly protruding inclination state of a V-shape based on the folding axis 111.

In the folded state, since the first folding space protrusion 283 and the second folding space protrusion 383 make contact with The third folding space inclined surface 282 and the fourth folding space inclined surface 382 to occupy part or all of the folding space gap 140 along the folding axis 111 and close the folding space gap 140 formed at both ends of the folding axis 111, foreign substances can be prevented from introducing into the folding space gap 140 and external damage such as stabbing and bursting of the inner circumferential surface 112 can be prevented when the foldable body 110 is repeatedly folded and unfolded.

In addition, the inner circumferential surface 112 that is changed into a flat state in the unfolded state is maintained in a floating state away from the bottom without making direct contact with the bottom surface, and contamination and damage due to foreign substances on a desk can be prevented when used in the flat unfolded state.

As shown in FIGS. 26 and 28 to 37, a first unfolding protrusion 286 in which a first unfolding support surface 284 protrudes from the first folding space protrusion 283 to the inner circumferential surface 112 or the second folding inner surface 114 deviating from the third folding space inclined surface 282 while being parallel to the first folding inner surface 113 and a second unfolding support surface 285 is formed by connecting a protruding end of the first unfolding support surface 284 and a certain portion of the third folding space inclined surface 282 at the side of a folding space gap vertex 141 is formed in a certain area of the first folding space protrusion 283, and a first folding recess 289 in which a first folding support surface 287 is recessed from the first folding space protrusion 283 to the inner circumferential surface 112 or the first folding inner surface 113 deviating from the third folding space inclined surface 282 while being parallel to the second folding inner surface 114 and a second folding support surface 288 is formed by connecting a recessed end of the first unfolding support surface 284 and a certain portion of the third folding space inclined surface 282 at the side of the folding space gap vertex 141 is formed in a certain area of the first folding space protrusion 283 where the first unfolding protrusion 286 is not formed.

Also, a second unfolding protrusion 386 in which a third unfolding support surface 384 protrudes from the second folding space protrusion 383 to the inner circumferential surface 112 or the first folding inner surface 113 deviating from the fourth folding space inclined surface 382 while being parallel to the second folding inner surface 114 and a fourth unfolding support surface 385 is formed by connecting a protruding end of the third unfolding support surface 384 and a certain portion of the fourth folding space inclined surface 382 at the side of the folding space gap vertex 141 is formed in a certain area of the second folding space protrusion 383, and a second folding recess 389 in which a third folding support surface 387 is recessed from the second folding space protrusion 383 to the inner circumferential surface 112 or the second folding inner surface 114 deviating from the fourth folding space inclined surface 382 while being parallel to the first folding inner surface 113 and a fourth folding support surface 388 is formed by connecting a recessed end of the third unfolding support surface 387 and a certain portion of the fourth folding space inclined surface 382 at the side of the folding space gap vertex 141 is formed in a certain area of the second folding space protrusion 383 where the second unfolding protrusion 386 is not formed.

When the foldable body 110 is folded, the first unfolding protrusion 286 is accommodated in a recessed area of the second folding recess 389 and the second unfolding protrusion 386 is accommodated in a recessed area of the first folding recess 289, and when the foldable body 110 is unfolded, the first unfolding support surface 284 and the third unfolding support surface 384 maintain the same plane.

When the foldable body 110 is folded, the first unfolding protrusion 286 is closely accommodated in the recessed area of the second folding recess 389, and the second unfolding protrusion 386 is closely held in the recessed area of the first folding recess 289. Accordingly, the folding space gap 140 is filled without an empty space and the flexible the display apparatus 120, the hinge components, and the foldable body 110 itself can be prevented from being damaged even if an external force is applied from the first folding outer surface 116 or the second folding outer surface 117 toward the folding space gap 140.

In addition, since the folded space gap 140 is occupied without any empty space, and supported parts are separated upon change into the unfolded state and the first unfolding support surface 284 and the third unfolding support surface 384 forming a reference surface in a plane placement state maintain the same plane, it is possible to prevent seesaw movement which may occur in the unfolded state of FIG. 6 during a user's touch operation.

As shown in FIGS. 26, 29, 30, 31, 33, 34, 35, and 37, folding support circumferential surfaces 290 and 390 capable of supporting the inner circumferential surface 112 of the folding space gap 140 are formed at ends of the third fixing surface 280 and the fourth fixing surface 380 located at the side of the folding axis 111 of the foldable body 110.

In addition, a damage preventing shape 291 or 391 including a chamfer or a curved surface for preventing injury of a finger or damage of the inner circumferential surface is formed at the edge portions where the folding support circumferential surface 290 and the third folding space inclined surface 282, and the folding support circumferential surface 390 and the fourth folding space inclined surface 382 intersect.

Since the folding support circumferential surface 290 and the folding support circumferential surface 390 formed at the ends of the third fixing surface 280 and the fourth fixing surface 380 located at the side of the folding axis 111 are closely supported by the inner circumferential of the folding space gap 140 and close the empty space and support an external force applied to the hinge portion, the folding support circumferential surface 290 and the folding support circumferential surface 390 perform the same function as the free end of the folding space insert 600 applied to the previously described fourth embodiment.

As shown in FIGS. 25, 27 and 38, an edge cover 400 is applied to the protective case for the foldable image display apparatus according to the fifth embodiment. The edge cover 400 has a tunnel-shaped circumferential surface capable of covering the outer circumferential surface not covered by the first protective case 200 and the second protective case 300 when the foldable body 110 is folded and a bezel circumferential surface of the foldable body 110 or a wall surface capable of covering both ends of the folding axis 111, and the edge cover 400 is automatically separated from the folding axis 111 when the foldable body 110 is unfolded.

Latching protrusions 420 are formed on both surfaces the end of the folding axis 111 of the edge cover 400 such that the edge cover 400 applied in the folded state of the foldable body 110 is latched and held at the inner circumferential surface 112 or the first protective case 200 and the second protective case 300 without being separated from the folding axis 111.

As shown in FIGS. 30, 32, 33, 34, 36 and 37, an edge cover latching portion 293 is recessed at a vertical surface portion of the end of the folding axis 111 of the first protective case 200 such that the latching protrusion 420 of the edge cover 400 is latched and fixed to the end of the folding axis 111 of the first protective case 200, and an edge cover latching portion 393 in accordance with the edge cover latching portion 293 is also recessed at a vertical surface portion of the end of the folding axis 111 of the second protective case 300.

In addition, the edge cover 400 is formed of a contractible material or has a foldable structure like the edge cover 400 of the first embodiment such that the edge cover 400 detached from the folding axis 111 can be minimized and maintained.

In order to prevent the edge cover 400 detached from the folding axis 111 from being lost, a loss preventing string connecting hole for connection with a loss preventing string 410 having one end thereof connected to the edge cover 400 is formed at one of the second protective case 300 or the protective case 300.

As shown in FIGS. 26, 31, 32, 35 and 36, a bezel latching protrusion 224 fixed around the edge portion of the first folding outer surface 116 or the second folding outer surface 117 of the foldable body 110 is formed on the first protective case circumferential wall surface 281 and the second protective case circumferential wall surface 381.

Although not shown in the drawings of the fifth embodiment, an edge bumper protruding from the circumferential wall surface may be formed at the edges of the first protective case circumferential wall surface 281 and the second protective case circumferential wall surface 381 to absorb a drop impact.

As shown in FIGS. 25, 26, 27, 30, 31, and 33, a finger latching shape may be formed in order to prevent finger slip during a user's unfolding operation. The finger latching shape may be formed on the circumferential wall surface parallel to the folding axis 111 of the first protective case circumferential wall surface 281 or the second protective case circumferential wall surface 381.

Although not shown in the drawings of the fifth embodiment, a rear camera exposure hole 252 for exposing a rear camera 180 applied to one of the first folding inner surface 113 or the second folding inner surface 214 are formed on one of the third fixing surface 280 and the fourth fixing surface 380, and the same concept as in FIG. 15 of the first embodiment is applied A first through-hole 250 for exposing a microphone or a talking speaker applied to The foldable body outer circumferential surface 118 of the foldable body 110, a button opening 226 for exposing a physical button, a connection opening 225 formed to be penetrated or opened for connection of the foldable image display apparatus to an external device, or a touch pen outlet 227 for accommodating a touch pen is formed on the first protective case circumferential wall surface 281 and the second protective case circumferential wall surface 381.

As shown in FIGS. 25, 27, 30, a cradle latching fixture 228 is formed on the first protective case circumferential wall surface 281 and the first protective case circumferential wall surface 381 such that the foldable image display apparatus to which the first protective case 200 and the second protective case 300 are applied can be selectively fixed to or released from a latching portion of a cradle having the folding and unfolding function of the foldable body 110.

As shown in FIG. 25, in the folded state in which the first protective case 200, the second protective case 300, and the edge cover 400 which are components of the fifth embodiment of the present invention are applied to the foldable body 110, it is difficult for the cradle having the folding and unfolding function of the first protective case 110 to separately receive the first protective case 200 and the second protective case 300.

For this, when a user mounts the foldable image display apparatus on the cradle having the folding and unfolding function of the foldable body 110 in a folded state, a reference shape for a user to separate and mount the first protective case 200 and the second protective case 300 is required. To this end, at least one cradle latching fixture 228 is formed on the first folding space protruding circumferential surface 220 and the second folding space protruding circumferential surface 320.

As shown in FIGS. 26, 27, and 34 to 37, a card storage space 260 is formed at one of the first unfolding protrusion 286 or the second unfolding protrusions 386 to store a plate type of card.

A card storage space 260 may be formed at one of the first folding space protrusion 283 or the second folding space protrusion 383 to store the card 800 of a plate type when the first unfolding protrusion 286 and the second unfolding protrusion 386 are not formed at the first protective case 200 and the second protective case 300, and the illustration thereof will be omitted.

Although not shown in the drawings of the fifth embodiment, an auxiliary battery may be applied to one of the first folding space protrusion 283 including the first unfolding protrusion 286 and the second folding space protrusion 383 including the second unfolding protrusion 386.

As shown in FIGS. 30 and 34, a weight reduction open space 292 or 392 is formed at one of the first folding space protrusion 283 including the first unfolding protrusion 286 and the second folding space protrusion 383 including the second unfolding protrusion 386, and a cover plate covering the weight reduction open spaces 292 and 392 is applied to improve the exterior (not shown).

FIGS. 39, 40 and 41 show a sixth embodiment of the present invention in which a first protective case 200, a second protective case 300, and a rotating cover 700 are applied to the outfolding image display apparatus of FIG. 3.

As shown in FIGS. 39 to 41, like the fifth embodiment, a protective case for a foldable image display apparatus according to a sixth embodiment of the present invention includes a first protective case 200 having a third fixing surface 280 supported while surrounding a first folding inner surface 113 at a certain distance away from a folding axis 111 of a foldable body 110, a first protective case circumferential wall surface 281 surrounding a foldable body outer circumferential surface 118 of the foldable body 110 except the folding axis 111 along an edge line of a first folding outer surface 116 and the third fixing surface 280 while a screen display surface of a flexible display apparatus 120 is maintained in an exposed state, and a first folding space protrusion 283 formed with a third folding space inclined surface 282 protruding from the third fixing surface 280 to a folding space gap 140 deviating from the first folding inner surface 113, and a second protective case 300 having a fourth fixing surface 380 supported while surrounding a second folding inner surface 114 at a certain distance away from the folding axis 111 of the foldable body 110, a second protective case circumferential wall surface 381 surrounding the foldable body outer circumferential surface 118 of the foldable body 110 except the folding axis 111 along an edge line of a second folding outer surface 117 and the fourth fixing surface 380 while the screen display surface of the flexible display apparatus 120 is maintained in an exposed state, and a second folding space protrusion 383 formed with a fourth folding space inclined surface 382 protruding from the fourth fixing surface 380 to the folding space gap 140 deviating from the second folding inner surface 114.

Similarly to the fifth embodiment, a first unfolding protrusion 286 in which a first unfolding support surface 284 protrudes from the first folding space protrusion 283 to the inner circumferential surface 112 or the second folding inner surface 114 deviating from the third folding space inclined surface 282 while being parallel to the first folding inner surface 113 and a second unfolding support surface 285 is formed by connecting a protruding end of the first unfolding support surface 284 and a certain portion of the third folding space inclined surface 282 at the side of a folding space gap vertex 141 is formed in a certain area of the first folding space protrusion 283, and a first folding recess 289 in which a first folding support surface 287 is recessed from the first folding space protrusion 283 to the inner circumferential surface 112 or the first folding inner surface 113 deviating from the third folding space inclined surface 282 while being parallel to the second folding inner surface 114 and a second folding support surface 288 is formed by connecting a recessed end of the first unfolding support surface 284 and a certain portion of the third folding space inclined surface 282 at the side of the folding space gap vertex 141 is formed in a certain area of the first folding space protrusion 283 where the first unfolding protrusion 286 is not formed.

Also, a second unfolding protrusion 386 in which a third unfolding support surface 384 protrudes from the second folding space protrusion 383 to the inner circumferential surface 112 or the first folding inner surface 113 deviating from the fourth folding space inclined surface 382 while being parallel to the second folding inner surface 114 and a fourth unfolding support surface 385 is formed by connecting a protruding end of the third unfolding support surface 384 and a certain portion of the fourth folding space inclined surface 382 at the side of the folding space gap vertex 141 is formed in a certain area of the second folding space protrusion 383, and a second folding recess 389 in which a third folding support surface 387 is recessed from the second folding space protrusion 383 to the inner circumferential surface 112 or the second folding inner surface 114 deviating from the fourth folding space inclined surface 382 while being parallel to the first folding inner surface 113 and a fourth folding support surface 388 is formed by connecting a recessed end of the third unfolding support surface 387 and a certain portion of the fourth folding space inclined surface 382 at the side of the folding space gap vertex 141 is formed in a certain area of the second folding space protrusion 383 where the second unfolding protrusion 386 is not formed.

When the foldable body 110 is folded, the first unfolding protrusion 286 is accommodated in a recessed area of the second folding recess 389 and the second unfolding protrusion 386 is accommodated in a recessed area of the first folding recess 289, and when the foldable body 110 is unfolded, the first unfolding support surface 284 and the third unfolding support surface 384 maintain the same plane.

As shown in FIGS. 39 to 41, backward bending prevention shapes 222 and 322 are formed at the end of the first protective case circumferential wall surface 281 and the second protective case circumferential wall surface 381 located at the side of the folding axis 111, and extend from the folding axis 111 toward the inner circumferential surface 112 to cover the semicircular circumferential surface of the foldable body 110 by less than half of the thickness of the foldable body 110, and backward bending prevention vertical surfaces 223 and 323 are formed at end portions of the inner circumferential surface 112 of the backward bending prevention shapes 222 and 322 to face and make contact with each other by locating an end portion of the vertical surface at the folding axis 111 when the foldable body 110 is unfolded.

As shown in FIGS. 39 to 41, a rotating cover 700 for covering one of the flat portions of the display apparatus 120 and the outer circumferential surface 115 is applied to a certain portion of the first protective case circumferential wall surface 281 or the second protective case circumferential wall surface 381 opposite to the folding axis 111, has a foldable plate shape that covers the flexible display apparatus 120 by allowing one end thereof to be fixed or rotatable and the opposite free end thereof to be rotated or folded to the folding axis 111, and covers any one of plane of the flexible display apparatus 120 and the outer circumferential surface 115 when the foldable body 110 is folded.

When the rotating cover 700 has a transparent material characteristic for transmitting the screen display surface of the flexible display apparatus 120 or has an opaque material characteristic, the rotating cover 700 includes a first transmission window 710 that transmits the screen display surface of the flexible display apparatus 120 when the foldable body 110 is folded, or a second transmission window 720 that transmits a portion of the outer circumferential surface 115 of the flexible display apparatus 120 when the foldable body 110 is folded.

A magnet, a Velcro or a latching shape 730 is applied to an end portion of the folding axis 111 of the rotating cover 700 such that the rotating cover 700 covering the outer circumferential surface 115 of the flexible display apparatus 120 is not separated from the outer circumferential surface 115 when the foldable body 110 is folded. Also, related components may be applied to the corresponding part of the first protective case 200 or the second protective case 300 which is the counterpart.

FIGS. 42 and 43 shows a seventh embodiment of the present invention in which a first protective case 200 and a second protective case 300 are applied to the outfolding image display apparatus of FIG. 3. In this embodiment, a protective case fixing through-hole 229 is additionally applied to the first protective case 200 and the second protective case 300 of the fifth and sixth embodiments.

As described in the fifth embodiment, the first protective case 200 and the second protective case 300 is maintained while pressing against the foldable body outer circumferential surface 118 of the foldable body 110 except a portion of the folding axis 111 using the shape of a bezel locking step 224, which is the same as the fifth embodiment.

However, in both of the fifth and sixth embodiments, since the first protective case 200 and the second protective case 300 have a structure in which the folding axis 111 is opened, the end portion of the folding axis 111 of the first protective case 200 and the second protective case 300 may be separated from the foldable body outer circumferential surface 118. Accordingly, an adhesive may be considered to apply the first protective case 200 and the second protective case 300 to the foldable body 110.

When the adhesive is applied, the fixing limitation of the first protective case 200 and the second protective case 300 may be solved to some extent, but complete fixation is difficult. When the first protective case 200 or the second protective case 300 is replaced, there are limitations in that the adhesive needs to be removed and the adhesive application area of the foldable body 110 may be damaged when the adhesive is removed.

In order to overcome such a limitation, a seventh embodiment is proposed in which the first protective case 200 and the second protective case 300 are latched and fixed to the foldable body outer circumferential surface 118 or the folding inner surfaces 113 and 114 together with the bezel latching protrusion 224.

As shown in FIGS. 1 and 24, in the seventh embodiment, a protective case fixing through-hole 229 is formed at the end portion of the first protective case circumferential wall surface 281 and the second protective case circumferential wall surface 381 which are located at the side of the folding axis 111 such that the first protective case 200 and the second protective case 300 can be latched or screwed to the protective case fixture 190 formed on the foldable body outer circumferential surface 118 to fix the first protective case 200 and the second protective case 300.

A protective case fixing screw 900 to be screwed to the protective case fixture 190 of the foldable body 110 is applied to the protective case fixing through-hole 229.

It is also possible to consider a method in which the protective case fixing screw 900 and the protective case fixing through-hole 229 are combined into one shape and fixed to the protective case fixture 190 in a fitting manner instead of screw coupling. This is the same concept as the protective case fixing through-hole 229.

A part of the shapes of the first protective case 200 and the second protective case 300 of the fifth embodiment proposed by the present applicant may be applied to the foldable body 110 of the outfolding image display of FIG. 3. Hereinafter, an eighth embodiment of the present invention will be described below.

Figure 44:
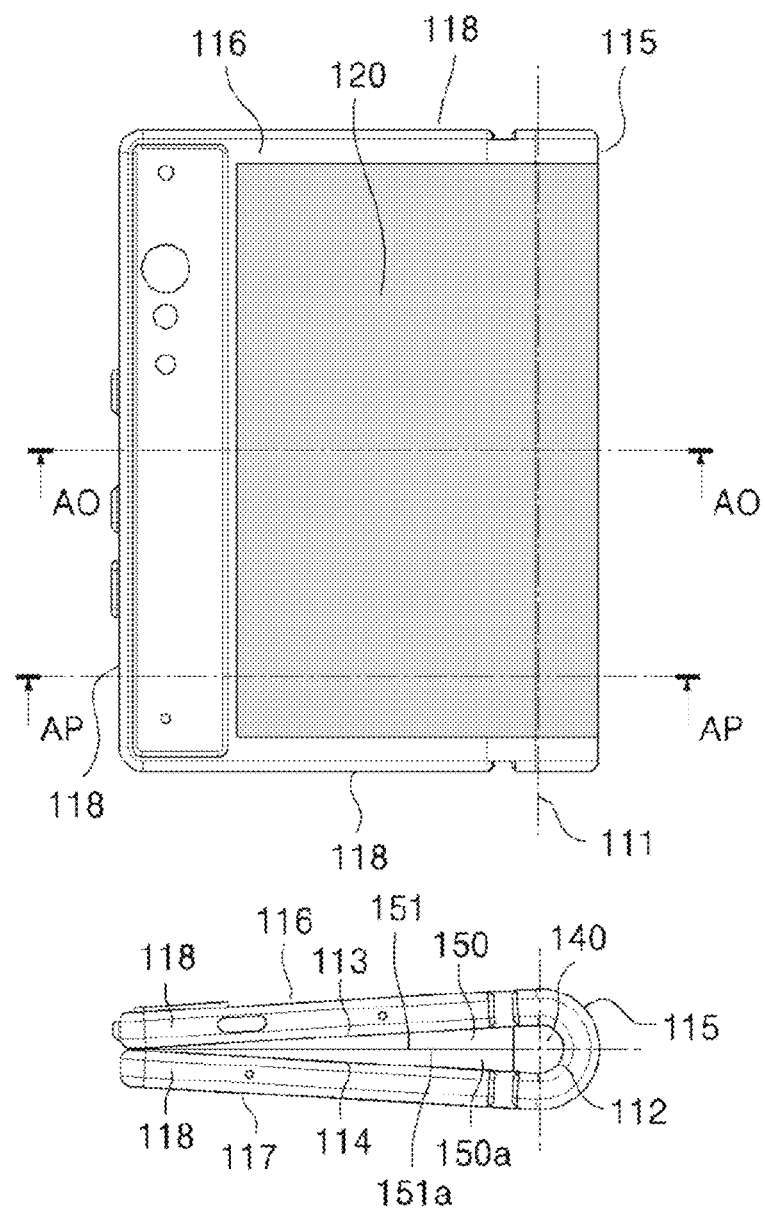
FIG. 44 are a front view and a rear view in which a shape related to a folding space gap of the first protective case and the second protective case of FIG. 25 is reflected on a foldable body in the outfolding image display apparatus of FIG. 3.
Figure 45:
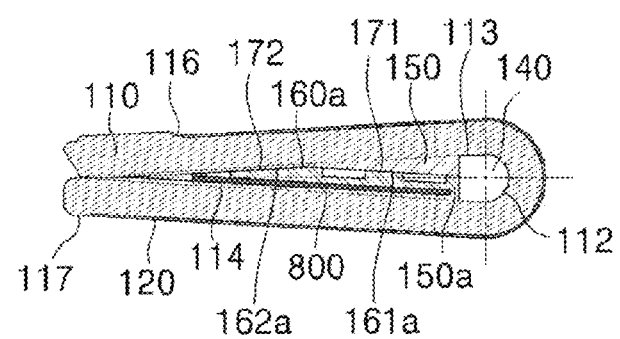
FIG. 45 is a cross-sectional view taken along lines AO-AO and AP-AP of FIG. 44.
Figure 45:
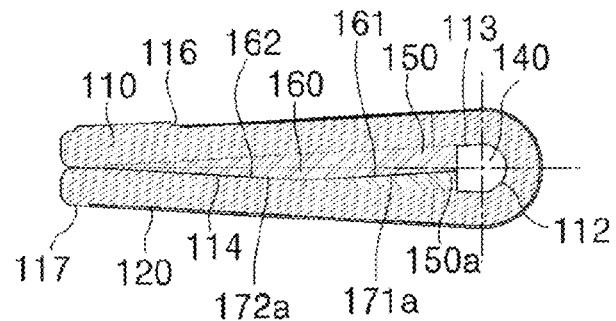
Figure 46:
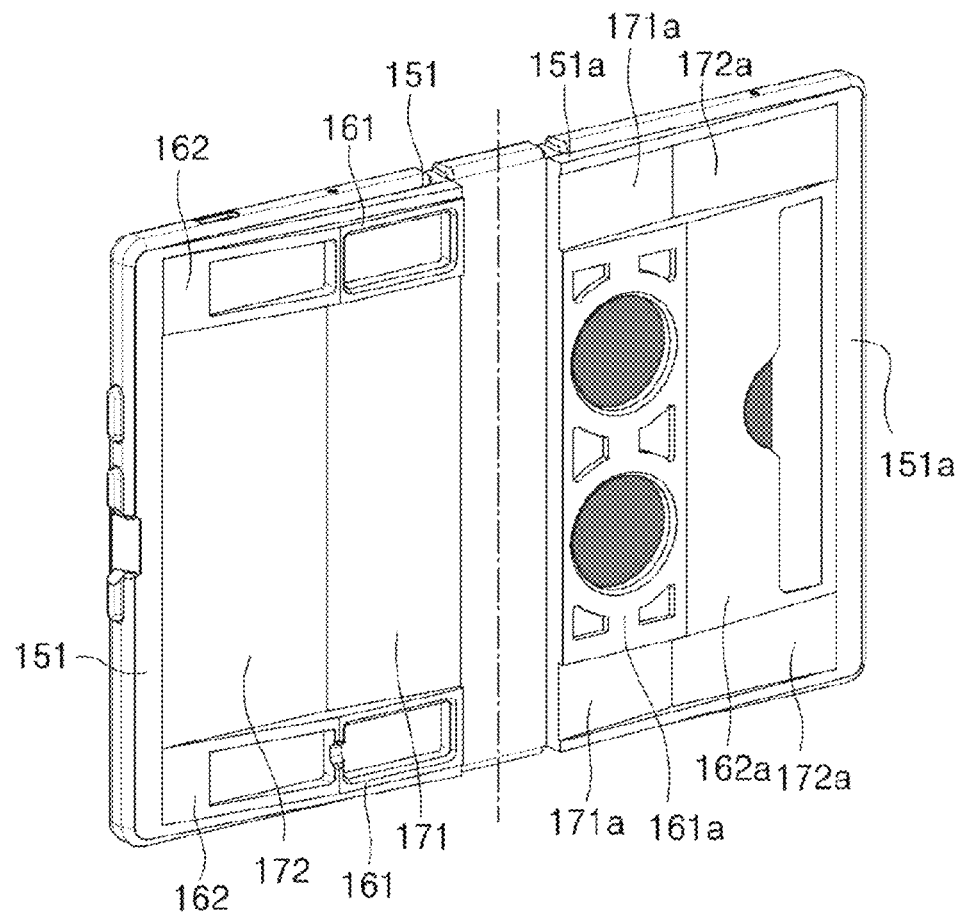
FIG. 46 is a rear perspective view illustrating an unfolded state of FIG. 44.

FIG. 44 are a front view and a rear view in which a shape related to a folding space gap of the first protective case and the second protective case of FIG. 25 is reflected on a foldable body in the outfolding image display apparatus of FIG. 3, and FIG. 45 is a cross-sectional view taken along lines AO-AO and AP-AP of FIG. 44. FIG. 46 is a rear perspective view illustrating an unfolded state of FIG. 44.

As shown in FIGS. 44 to 46, in the eighth embodiment of the present invention, a foldable image display apparatus includes a foldable body 110 having a folding axis 111 that becomes a folding reference in a folded state, first folding inner surface 113 and second folding inner surface 114 extending from both ends of an inner circumferential surface 112 and facing each other and first folding outer surface 116 and second folding outer surface 117 extending from both ends of an outer circumferential surface 115 and facing each other, and a single flexible display apparatus 120 applied to the first folding outer surface 116 and second folding outer surface 117, and a folding space gap 140 of a cone shape which is formed by the first folding inner surface 113, the second folding inner surface 114, the inner circumferential surface 112 and is gradually narrowed from the folding axis 111 to the opposite side thereof is formed along the folding axis 111.

The foldable body 110 includes a first folding space protrusion 150 where a first folding space inclined surface 151 protruding from the first folding inner surface 113 toward the folding space gap 140 deviating from the first folding inner surface 113 at a certain distance away from the folding axis 111 is formed, and a second folding space protrusion 150a where a second folding space inclined surface 151a protruding from the second folding inner surface 114 toward the folding space gap 140 deviating from the second folding inner surface 114 at a certain distance away from the folding axis 111 is formed.

The protruding height of the first folding space protrusion 150 and the second folding space protrusion 150a is lowered away from the folding axis 111 of the foldable body 110. In a folded state, the first folding space protrusion 150 and the second folding space protrusion 150a make contact with a first folding space inclined surface 151 and a second folding space inclined surface 151a, thereby partially or entirely occupying the folding space gap 140 along the folding axis 111 and filling an empty space, and in an unfolded state, the first folding space inclined surface 151 and the second folding space inclined surface 151a are maintained in downwardly protruding inclination state of a V-shape based on the folding axis 111.

A first unfolding protrusion 160 in which a first unfolding support surface 161 protrudes from the first folding space protrusion 150 to the inner circumferential surface 112 or the second folding inner surface 114 deviating from the first folding space inclined surface 151 while being parallel to the first folding inner surface 113 and a second unfolding support surface 162 is formed by connecting a protruding end of the first unfolding support surface 161 and a certain portion of the first folding space inclined surface 151 at the side of a folding space gap vertex 141 is formed in a certain area of the first folding space protrusion 150, and a first folding recess 170 in which a first folding support surface 171 is recessed from the first folding space protrusion 150 to the inner circumferential surface 112 or the first folding inner surface 113 deviating from the first folding space inclined surface 151 while being parallel to the second folding inner surface 114 and a second folding support surface 172 is formed by connecting a recessed end of the first unfolding support surface 161 and a certain portion of the first folding space inclined surface 151 at the side of the folding space gap vertex 141 is formed in a certain area of the first folding space protrusion 150 where the first unfolding protrusion 160 is not formed.

A second unfolding protrusion 386 in which a third unfolding support surface 161a protrudes from the second folding space protrusion 150a to the inner circumferential surface 112 or the first folding inner surface 113 deviating from the second folding space inclined surface 151a while being parallel to the second folding inner surface 114 and a fourth unfolding support surface 162a is formed by connecting a protruding end of the third unfolding support surface 161a and a certain portion of the second folding space inclined surface 151a at the side of the folding space gap vertex 141 is formed in a certain area of the second folding space protrusion 150a, and a second folding recess 170a in which a third folding support surface 171a is recessed from the second folding space protrusion 150a to the inner circumferential surface 112 or the second folding inner surface 114 deviating from the second folding space inclined surface 151a while being parallel to the first folding inner surface 113 and a fourth folding support surface 172a is formed by connecting a recessed end of the third unfolding support surface 171a and a certain portion of the second folding space inclined surface 151a at the side of the folding space gap vertex 141 is formed in a certain area of the second folding space protrusion 150a where the second unfolding protrusion 160a is not formed.

When the foldable body 110 is folded, the first unfolding protrusion 160 is accommodated in a recessed area of the second folding recess 170a and the second unfolding protrusion 160a is closely accommodated in a recessed area of the first folding recess 170, and when the foldable body 110 is unfolded, the first unfolding support surface 161 and the third unfolding support surface 161a maintain the same plane.

A weight reduction open space and a cover plate for covering the weight reduction open space are formed at one of the first folding space protrusion 150 including the first unfolding protrusion 160 and the second folding space protrusion 150a including the second unfolding protrusion 160a.

As described above, the embodiments of the present invention have the following advantages.

First, although an external force is applied to the hinge portion in the folded state of the foldable image display apparatus in which the folding space gap of the cone shape is formed along the folding axis, the protective case supports and disperses the external force. Accordingly, it is possible to reduce the possibility of damage of hinge components, absorb the drop impact and prevent the damage of the circumferential surface of the hinge.

Second, when the circumferential portion of the protective case is folded, without interfering with the camera and sensor applied to the bezel portion, the cone-shaped folding space gap formed on the inner side of the folding is closed. Accordingly, it is possible to prevent introduction of the foreign substances into the folding space gap, which may cause scratching or notching of the display screen.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A protective case for a foldable image display apparatus comprising a foldable body having a folding axis that becomes a folding reference in a folded state, first folding inner surface and second folding inner surface extending from both ends of an inner circumferential surface and facing each other when the foldable image display apparatus is in a fully folded state, the first folding inner surface and second folding inner surface being on a substantially flat plane when the foldable image display apparatus is in a fully unfolded state, and first folding outer surface and second folding outer surface extending from both ends of an outer circumferential surface and facing each other; and
   a single flexible display apparatus applied to the first folding inner surface and the second folding inner surface,
   the protective case in which a folding space gap of a cone shape formed by the first folding inner surface, the second folding inner surface, and the inner circumferential surface is formed and the folding space gap is gradually narrowed away from the folding axis in a folding state is formed along the folding axis, the protective case comprising:
   a first protective case having:
      a first fixing surface supported while surrounding a first folding outer surface at a certain distance away from the folding axis of the foldable body; and
      a first folding space protruding circumferential surface having a first folding space inclined surface protruding from the first fixing surface to the folding space gap deviating from the first folding inner surface while a screen display surface of the flexible display apparatus is maintained in an exposed state while surrounding an outer circumferential surface except the folding axis of the foldable body; and
   a second protective case having:
      a second fixing surface supported while surrounding a second folding outer surface at a certain distance away from the folding axis; and
      a second folding space protruding circumferential surface having a second folding space inclined surface protruding from the second fixing surface to the folding space gap deviating from the second folding inner surface while the screen display surface of the flexible display apparatus is maintained in an exposed state while surrounding the foldable body outer circumferential surface except the folding axis of the foldable body, wherein the first folding space inclined surface is a straight linear surface and inclined relative to the first folding inner surface when the foldable image display apparatus is in the fully unfolded state so that a distance between the first folding space inclined surface and the first folding inner surface decreases as a distance from the folding axis increases, the second folding space inclined surface is a straight linear surface and inclined relative to the second folding inner surface when the foldable image display apparatus is in the fully unfolded state so that a distance between the second folding space inclined surface and the second folding inner surface decreases as a distance from the folding axis increases, the first folding space inclined surface and the second folding space inclined surface make a direct contact to each other when the foldable image display apparatus is in the folded state, and the first folding space inclined surface and the second folding space inclined surface protrude out of the screen display surface of the foldable image display apparatus in the fully unfolded state.

2. The protective case of claim 1, further comprising an edge cover having a tunnel-shaped circumferential surface capable of covering the outer circumferential surface not covered by the first protective case and the second protective case when the foldable body is folded and a wall surface capable of covering both ends of the folding axis of the foldable body, wherein the edge cover is separated from the folding axis when the foldable body is unfolded.

3. The protective case of claim 1, wherein the first protective case and the second protective case separated from each other based on the folding axis are connected by a connection plate covering the outer circumferential surface of the foldable body, and the connection plate is formed of a material which is foldable and flexible.

4. The protective case of claim 1, wherein a folding space insert is formed to have one end thereof connected and fixed to the circumferential wall surface of the first folding space protruding circumferential surface or the second folding space protruding circumferential surface and the opposite free end thereof located in the folding space gap by a user when the foldable body is folded, one surface thereof being supported by a first folding inner surface and a second folding inner surface which form the folding space gap, and is unfolded and maintained in a state where one surface thereof is supported by the screen display surface of the flexible display apparatus or is moved out of the screen display surface by a user when the foldable body is unfolded.

5. The protective case of claim 1, wherein backward bending prevention shapes are formed at the end of the first folding space protruding circumferential surface of the first protective case or the second folding space protruding circumferential surface of the second protective case located at the side of the folding axis, and extend from the folding axis toward the inner circumferential surface to cover the semicircular circumferential surface of the foldable body by less than half of the thickness of the foldable body, and backward bending prevention vertical surfaces are formed at end portions of the inner circumferential surface of the backward bending prevention shapes to face and make contact with each other by locating an end portion of the vertical surface at the folding axis when the foldable body is unfolded.

6. The protective case of claim 1, wherein a bezel latching protrusion fixed around the edge portions of the first folding inner surface and the second folding inner surface is formed on the inner circumference of the protruding end portions of the first folding space inclined surface and the second folding space inclined surface.

7. The protective case of claim 1, wherein a protective case fixing through-hole is formed at the end portion of the first folding space protruding circumferential surface and the second folding space protruding circumferential surface which are located at the side of the folding axis such that the first protective case and the second protective case is latched or screwed to the protective case fixture formed on the foldable body outer circumferential surface to fix the first protective case and the second protective case.

8. The protective case of claim 1, wherein a display through window or a transmission window for transmitting the screen display surface of the outer display applied to one of the first display surface and the second folding outer surface is formed on one of the first fixing surface or the second fixing surface.

9. The protective case of claim 4, wherein the folding space insert has an insert contact surface that is a contact surface which reflects the inclination of a first folding inner surface and a second folding inner surface so as to make close contact with the first folding inner surface and the second folding inner surface forming the folding space gap.

\* \* \* \* \*